United States Patent
Kino et al.

(10) Patent No.: US 6,782,403 B1
(45) Date of Patent: Aug. 24, 2004

(54) INTER-APPLICATION DATA TRANSMITTING SYSTEM AND METHOD

(75) Inventors: Shigenori Kino, Tokyo (JP); Kazuhiro Koike, Tokyo (JP); Yasuyuki Mochizuki, Tokyo (JP); Takehisa Mizuguchi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 818 days.

(21) Appl. No.: 09/717,289

(22) Filed: Nov. 22, 2000

(30) Foreign Application Priority Data

Nov. 26, 1999 (JP) .......................................... 11-336445
Feb. 22, 2000 (JP) ...................................... 2000-044847

(51) Int. Cl.[7] .............................................. G06F 17/30
(52) U.S. Cl. ...................... 707/203; 707/10; 707/104.1; 707/201; 709/202; 709/223; 715/503; 715/511
(58) Field of Search .............................. 707/2, 3, 7, 10, 707/102, 104.1, 203; 709/232, 301, 202, 203, 201, 223; 715/503, 509, 511

(56) References Cited

U.S. PATENT DOCUMENTS

| | | | |
|---|---|---|---|
| 5,583,655 A * 12/1996 | Tsukamoto et al. | ......... | 358/400 |
| 5,748,894 A * 5/1998 | Ishizaki et al. | ............. | 709/202 |
| 5,953,730 A * 9/1999 | Schawer | ...................... | 715/503 |
| 6,188,428 B1 * 2/2001 | Koz et al. | .................... | 725/115 |
| 6,195,677 B1 * 2/2001 | Utsumi | ........................ | 709/201 |
| 6,523,696 B1 * 2/2003 | Saito et al. | .................. | 709/223 |
| 6,549,918 B1 * 4/2003 | Probert et al. | ............... | 707/203 |
| 6,615,258 B1 * 9/2003 | Barry et al. | ................. | 709/223 |

OTHER PUBLICATIONS

Han, Tae–Man et al., "A service Interworking Unit for Accommodating Multimedia Communication with Quality of Service between ATM and Internet", Proceedings of the International Workshop on Parallel Processing, Aug. 21–24, 2000, pp. 493–497.*

Im, Choongjae et al., "Real time Delivery and Control Mechanism of Multimedia Service Between ATM Network and Internet", International Conference on Information, communication and Signal Processing ICICS '97, Sep. 9–12, 1997, pp. 1682–1685.*

The Foundation for the Cross Worlds Solution (CrossWorlds homepage) pp. 1/2, 2/2, 1/3 and 3/3 (Aug. 26, 1999).

Kawamura et al, Technical Report of IEICE A198–47 (Nov. 1998).

High–Tech Software Dictionary, p. 514, Ohm Press (English Translation).

* cited by examiner

*Primary Examiner*—Shahid Alam
(74) *Attorney, Agent, or Firm*—Birch, Stewart, Kolasch & Birch, LLP

(57) ABSTRACT

An inter-application data transmitting system having an application intermediary unit which mediates data to be transmitted between a network and one of multiple business applications for exchanging the data among the multiple applications interconnected over the network without changing the business application even if the access procedures, data formats, and communication protocols of the multiple applications are different from each other. The application intermediary unit is provided with an access procedure control unit for controlling an access procedure, a data format conversion unit for converting a data format, and a communication control unit for controlling communication between the multiple business applications having different communication protocols. The application intermediary unit further includes an application control unit for controlling those elements.

30 Claims, 52 Drawing Sheets

Fig. 3

| PROCESSING REQUEST STATUS | DATA AREA | DATA VALUE |
|---|---|---|
| NEW ORDER GENERATION | BUSINESS PARTNER | B COMPANY |
| | ORDER STATE | 0 (NEW) |
| UPDATE VERIFICATION | BUSINESS PARTNER | B COMPANY |
| | ORDER STATUS | 1 (WAIT FOR RESPONSE) |
| | DEADLINE | 19990928 |

Fig. 4

| PROCESSING REQUEST STATUS | DATA AREA | |
|---|---|---|
| NEW ORDER GENERATION | CUSTOMER NAME | "TERMINAL CONTROL SECTION, INTERNET PROJECT PROMOTION DEPT. Y BRANCH, X TRADING COMPANY, A COMPANY'S CUSTOMER" |
| | CUSTOMER ID | 9384-0283 |
| | ORDER DATA | 19980910302105 |
| | ADDRESS | "...FUJIMIGAOKA, SETAGAYA-KU, TOKYO" |
| | TELEPHONE | "03-1234-5678" |
| | ORDER ITEM | CLASSIFICATION NO. 0320 PC REPAIRS |
| | RESPONSE DUE | 19980915 |
| | DEADLINE | 19980930 |
| | ORDER STATUS | 10 (REQUEST FOR CHANGING DEADLINE) |
| UPDATE VERIFICATION OF DATA | | |

Fig. 5

| CONTROL CONDITION | CONTROL ITEM |
|---|---|
| PROCESSING == "UPDATE VERIFICATION OF DATA" | OrderID = OpenNameService(Name);<br>CloseNameService();<br>Open(OrderID);<br>Diff(Get(OrderID),FormerValues);<br>Close(OrderID); |
| PROCESSING == "NEW ORDER GENERATION" | NewOrder = CreateNameService(Name);<br>CloseNameService();<br>Open(NewOrder);<br>Put(NewOrder,CustomerInfo);<br>Put(NewOrder,DateInfo);<br>Close(NewOrder); |

Fig. 6

| BEFORE DATA (CONVERSION) | AFTER DATA (CONVERSION) |
|---|---|
| Order ID == "yyyymmddxxxxxx" | Date = "dd/mm/yyyy", Order ID = "xxxxxx" |
| CustomerID == "kkkk-yyyy-uuuu" | CustomerID = "kkkkyyyyuuuu" |
| Length(CUSTOMER NAME)>18 | CUSTOMER NAME = First18Chara (CUSTOMER NAME) |

Fig. 7

| BEFORE DATA (INVERSION) | AFTER DATA (INVERSION) |
|---|---|
| Date = "dd/mm/yyyy", Order ID = "xxxxx" | Date="yyyy.mm.dd" OrderID="00xxxxxx" |
| CustomerID == "kkkkyyyyuuuu" | CustomerID = "yyyyuuuu" CompanyID = "kkkk" |
| Length(CustomerName)>12 | CustomerName = First12Chara(CustomerName) |

Fig. 8

| COMMUNICATING PARTNER (COMPANY) | COMMUNICATION CONTROL RULE |
|---|---|
| B | COMMUNICATION PROTOCOL TCP/IP, B COMPANY IP ADDRESS, COMMUNICATION PORT NUMBER 1022 |
| C | COMMUNICATION PROTOCOL HTTP, C COMPANY IP ADDRESS, |
| D | COMMUNICATION PROTOCOL TCP/IP, D COMPANY IP ADDRESS, COMMUNICATION PORT NUMBER 3022 |

Fig. 17

| DATA TAG | DETAILS |
|---|---|
| CustomerName | "INTERNET, Y BRANCH, X TRADING CO., A COMPANY'S CUSTOMER" |
| CustomerID | 93840283 |
| RequestOrder | 302105 |
| RequestDate | 09/10/99 |

```
<?XML version="1.0"?>
<RevisedOrder>
  <Request>
    <CustomerName>INTERNET, Y BRANCH, X TRADING CO., A COMPANY'S CUSTOMER</CustomerName>
    <CustomerID> 93840283 </CustomerID>
<RequestOrder>0729047</RequestOrder>
    <RequestDate>09/10/99</RequestDate>
  </Request>
</RevisedOrder>
```

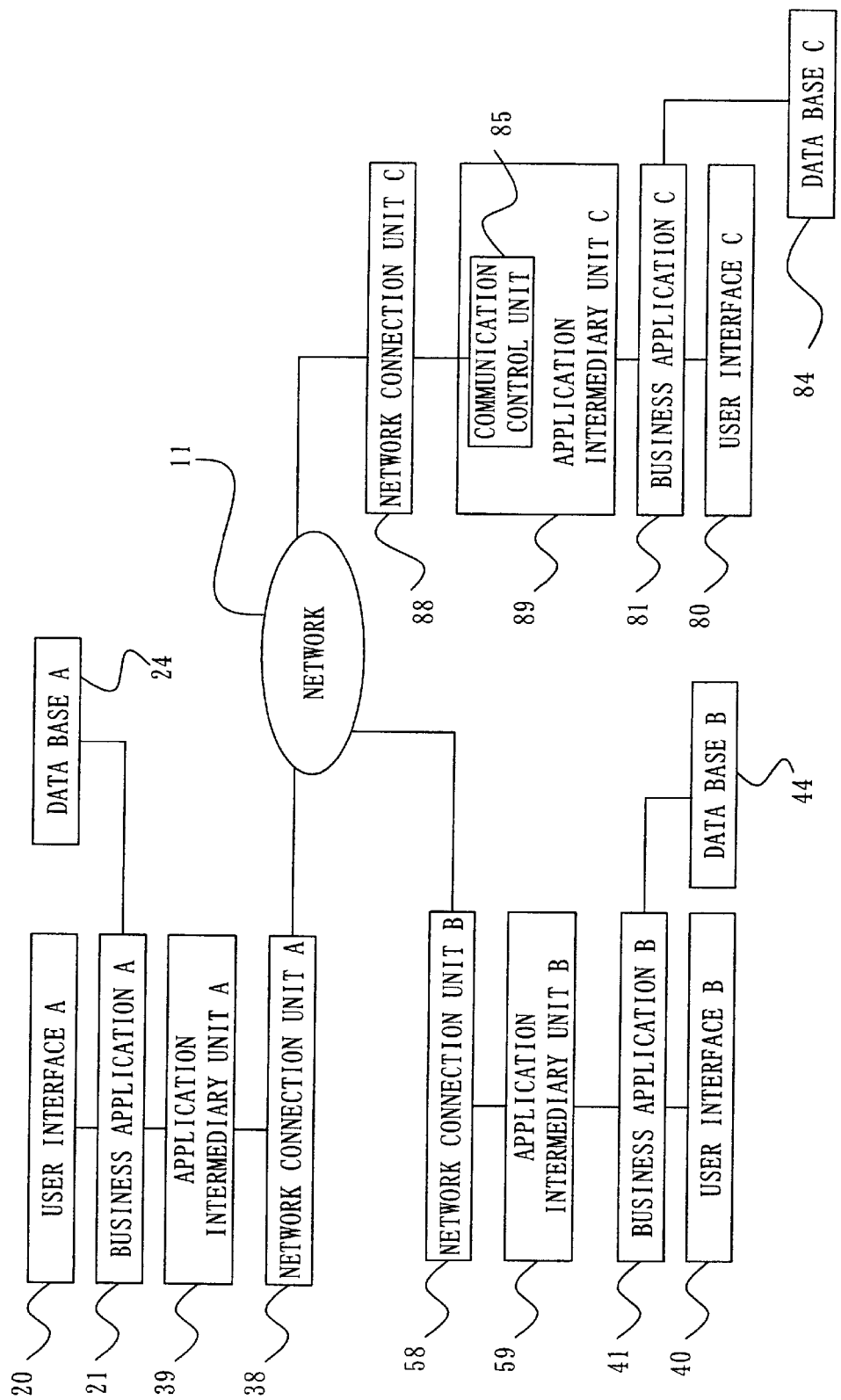

Fig. 20

| PROCESSING REQUEST STATUS | DATA AREA | DATA VALUE |
|---|---|---|
| NEW ORDER GENERATION | BUSINESS PARTNER | C COMPANY |
| | ORDER STATUS | 0 (NEW) |
| UPDATE VERIFICATION | BUSINESS PARTNER | C COMPANY |
| | ORDER STATUS | 20 (REQUEST FOR REPORT) |

Fig. 21

| PROCESSING REQUEST STATUS | DATA AREA | |
|---|---|---|
| NEW ORDER GENERATION | CUSTOMER NAME | "COMMET HANBAI" |
| | CUSTOMER ID | 9214-0312 |
| | ORDER DATA | 1998091030201 |
| | ADDRESS | "...KOENJI, SUGINAMI-KU, TOKYO" |
| | TELEPHONE | "03-8088-3623" |
| | ORDER ITEM | CLASSIFICATION NO. 0320 PC REPAIRS |
| | RESPONSE DUE | 19980914 |
| | DEADLINE | 19981015 |
| | ⋮ | ⋮ |
| UPDATE VERIFICATION OF DATA (REQUEST FOR REPORT) | (NONE) | |

Fig. 22

| COMMUNICATING PARTNER (COMPANY) | COMMUNICATION CONTROL RULE |
|---|---|
| B | COMMUNICATION PROTOCOL TCP/IP, B COMPANY IP ADDRESS, COMMUNICATION PORT NUMBER 1022 |

Fig. 23

| COMMUNICATING PARTNER (COMPANY) | COMMUNICATION CONTROL RULE |
|---|---|
| C | COMMUNICATION PROTOCOL HTTP, C COMPANY IP ADDRESS, |

Fig. 24

| COMMUNICATING PARTNER (COMPANY) | COMMUNICATION CONTROL RULE |
|---|---|
| B | COMMUNICATION PROTOCOL TCP/IP, B COMPANY IP ADDRESS, COMMUNICATION PORT NUMBER 1022<br>DATA PRIORITY CLASS A<br>ALLOWED TIME FOR COMMUNICATION:EVERY 3 MINUTES(0:00 HOUR-7:00 HOURS)<br>EVERY 1 MINUTE(7:00 HOURS-0:00 HOUR) |

Fig. 25

| COMMUNICATING PARTNER (COMPANY) | COMMUNICATION CONTROL RULE |
|---|---|
| C | COMMUNICATION PROTOCOL TCP/IP, C COMPANY IP ADDRESS, COMMUNICATION PORT NUMBER 1022 DATA PRIORITY CLASS B |

Fig. 26

| COMMUNICATING PARTNER (COMPANY) | COMMUNICATION CONTROL RULE |
|---|---|
| B | COMMUNICATION PROTOCOL TCP/IP, B COMPANY IP ADDRESS, COMMUNICATION PORT NUMBER 1022 CRYPTOGRAPHIC SYSTEM SecPat1 AUTHENTICATION SYSTEM ID1, AUTHENTICATOR Location ``/Nisho/form |

Fig. 27

| COMMUNICATING PARTNER (COMPANY) | COMMUNICATION CONTROL RULE |
|---|---|
| C | COMMUNICATION PROTOCOL TCP/IP, C COMPANY IP ADDRESS, COMMUNICATION PORT NUMBER 2022 DATA PRIORITY CLASS B, Login NAME "AtoG", Password "AtoGPass" CRYPTOGRAPHIC SYSTEM SecPat2  COMMON CRYPTOGRAPHIC KEY CommonKey |

Fig. 30

| COMMUNICATING PARTNER (COMPANY) | COMMUNICATION CONTROL RULE |
|---|---|
| B | COMMUNICATION PROTOCOL, MOBILE AGENT SYSTEM(JavaRMI), B COMPANY IP ADDRESS, CRYPTOGRAPHIC SYSTEM SecPat2, AUTHENTICATION SYSTEM ID2, AUTHENTICATOR Location /Nisho/form |

Fig. 41

```
439 ─ If (sourcestat=="CLOSE") {
        if (true) {
            func1(); }}           ── 444
440 ─ else if (sourcestat=="HOLD") {
        if (event=="CLOSED") {
            func2(); }}           ── 445
441 ─ else if (sourcestat=="OPEN") {
        if (event=="HOLDED") {
            func3(); }}           ── 446
442 ─ else if (event=="CLOSED") {
            func4(); }}           ── 447
443 ─ else if (sourcestat=="initstate") {
        if (event=="OPENDED") {
            return; }}            ── 448
```

Fig. 48

```
If(sourcestat=="HOLD") {
        if(event=="CLOSED"){//Guard condition should be here
                //Guard condition and Action should be here
        }
}
```

Fig. 49

```
If(sourcestat=="HOLD") {
        if(event=="CLOSED") {//Guard condition should be here
                //Guard condition and Action should be here
                func2();
        }
}
```

INTER-APPLICATION DATA TRANSMITTING SYSTEM AND METHOD

BACKGROUND OF THE INVENTION

1. Field of the Invention

The present invention relates to an inter-application data transmitting system for transmitting data among multiple application systems interconnected over a network, and more particularly, an embodiment of the present invention relates to an inter-application data transmitting system which exchanges data among various types of applications of the business application systems by using the functions of the various types of applications mutually.

2. Description of the Related Art

FIG. 52 of the accompanying drawings shows a block diagram illustrating a conventional architecture of integrated application systems having business applications of different types from each other, which appears in "High-tech Software Dictionary", page 514, Ohm Press (May 1991 issue).

Referring now to FIG. 52, a reference numeral 1 denotes a shared user interface A which is used by a user of a business application A for entering data in order to use the function of the business application A and for receiving an output result from the business application A. The shared user interface A is a type of user interface which is designed for applying commonly to different kinds of business applications. A reference numeral 2 denotes the business application A. A reference numeral 3 denotes a shared communication protocol. The shared communication protocol (3) is used for exchanging commands and data between the shared user interface A (1) and the business application A (2) through a communication channel. The shared communication protocol (3) allows the business application A (2) to communicate with another business application of a different type. A reference numeral 4 denotes a shared API business program A. The shared API business program A (4) is provided with a business program having a data processing function and a shared Application Program Interface (API). The shared Application Program Interface (API) allows the business application A (2) to use the function of another business application (e.g., a business application B of FIG. 52, which will be discussed later in this embodiment), as a communicating partner. In other words, with reference to FIG. 52, the shared API business program A (4) of the business application A (2) and the shared API business program B of the business application B are provided with the same Application Program Interface (API) function. A reference numeral 5 denotes a data base A for storing business data. The business application A (2) is composed of the shared communication protocol (3) and the shared API business program A (4).

The business application A (2) uses a standard data base access language called Structured Query Language (SQL), for example, in order to gain access to the data base A (5). Similarly, reference numeral 6 through reference numeral 10 denote elements of a system relating to the business application B (7). The business application B (7) is provided with the same elements in function as those of the business application A (2). A reference numeral 11 denotes a network which connects the business application A (2) and the business application B (7).

Now, the operation of the above mentioned conventional example is discussed.

In the case of a single use of the business application A (2) alone involving no network connection through the network (11), the user who intends to use the business application A (2) operates the shared user interface A (1) so as to use the function of the shared API business program A (4). The shared user interface A (1) is connected to the shared API business program A (4) through the shared communication protocol (3). When gaining access to the shared API business program A (4) through the shared communication protocol (3), the shared user interface A (1) uses the shared API.

As an example, it is assumed that data is requested to be written into the data base A (5). In that case, the shared API business program A (4) writes the data requested by the shared user interface A (1) into the data base A (5) based on SQL. Then, the written data may be read out from the data base A (5) in a later opportunity by a user who uses the shared user interface A (1). The readout data from the data base A (5) is outputted to the shared user interface A (1) through the shared communication protocol (3). Similarly, the above mentioned operation applies to the single use of the business application B (7). In other words, a user who intends to use the business application B (7) operates the shared user interface B (6) so as to connect with the shared API business program B (9) through the shared common protocol (8), thereby utilizing the function of the shared API business program B (9).

Next, a discussion will be made of the conventional operation in the case that the business application A (2) and the business application B (7) are used in a mutual manner by the users of the business applications A (2) and B (7) over the network.

It is assumed that the user operates the shared user interface A (1) in order to use the function of the business application A (2) and the function of the business application B (7) so as to write data in the data base A (5) and further write the data in the corresponding data area in the data base B (10), so that the data in the data base B (10) has the same meaning as that of the data in the data base A (5).

As aforementioned, in the case of writing data into the data base A (5), the shared user interface A (1) is operated to request the shared API business program A (4) to write the data into the data base A (5) through the shared communication protocol (3).

Now, a description will be made with the data requested to be written into the data base B (10).

Now, it is assumed that a data area or a name (which will be referred to hereinafter as the "data area") corresponding to data written in the data base A (5) is previously known by the business application B (7).

The shared API business program A (4) instructs the shared API business program B (9), by using the shared communication protocol (3) and the shared communication protocol (8), to write the same data as that written into the data base A (5) into the corresponding data area of the data base B (10). In this case, the data is transmitted from the shared communication protocol (8) to the shared API business program B (9) by means of the shared API. In other words, the shared API business program A (4) and the shared API business program B (9) are provided with the same API function. For that reason, the shared API business program A (4) can transmit an instruction to write data into the data base B (10) to the shared API business program B (9) correctly by means of parameters, for example, representing storage position information and the like. The written data in the data base B (10) can be read out in a later opportunity by a user of the shared user interface B (6). The data, being read out from the data base B (10), is outputted to the shared user interface B (6) through the shared communication protocol (8). In other words, the data written into the data base A (5) by the user of the shared user interface A (1) is also written into the data base B (10) so that the user of the shared user interface B (6) can use the data.

As aforementioned, according to the conventional business application system, the following conditions have to be satisfied in order to achieve the mutual use of the functions and data of the two business applications of different types. The conditions include:

1. The business application A (2) and the business application B (7) are to share the communication protocol such as the shared communication protocol (3) and the shared communication protocol (8), thereby allowing the business application A (2) and the business application B (7) to communicate with each other.
2. The API of the shared API business program A (4) to be used for gaining access to the data base A (5) and the API of the shared API business program B (9) to be used for gaining access to the data base B (10) are to be the same, and
3. The data format and the meaning of the value of data to be transmitted to the shared API business program A (4) by means of the shared API and the data format and the meaning of the value of data to be transmitted to the shared API business program B (9) by means of the shared API are to be the same and show no inconsistency in both the business application A (2) and the business application B (7).

In other words, data stored in the data base A (5) and data stored in the data base B (10) are required to be the same in the data format and the meaning of the value of data in both cases when the data is read out from the data base A (5) by the shared API provided in the shared API business program A (4) and when the data is read out from the data base B (10) by the shared API provided in the shared API business program B (9).

4. Conventionally, the data format and the control command to be used in a business application has a strong relation with a user interface. In addition to that, a communication protocol to be used for connecting the user interface with the business application also has a relation with the implementation system of the user interface.

In other words, in the case that a character-based screen terminal is used as the user interface for inputting/outputting data, a communication protocol called Telnet is used as the shared communication protocol, for example. In the case that a browser is used as the user interface, a communication protocol called HTTP (Hyper Text Transfer Protocol) is used, for example, as the shared communication protocol. In order to achieve the mutual use of the business applications, there is a need of using a shared communication protocol by the business applications in communication. Further, there is also a need of matching the data formats as well as the transmission formats of the business applications. For that reason, the implementation system of the user interface is also required to be shared by the business applications.

Those conditions to be satisfied may create the necessity of matching various items of difference between the different types of business applications interconnected over the network for exchanging data with each other, even if the different types of business applications are designed to be used in the same field of business. The items of difference to be matched between the different types of business applications include the communication protocol to be used, the API interface to be used for gaining access to the business application, the data format and the meaning of the value of data to be stored and read out, the user interface and the like. In that respect, the conventional art poses the following problems when two currently operating different types of business applications are connected to exchange data with each other. In the case of any difference required to be matched between the different types of business applications among the above listed items of difference, it causes the user to change the item of difference in one or both of the business application programs. Consequently, it causes the user to spend extra time and cost for the change.

Specifically, in the case of converting the data format of data into a data format depending on the business application of a communicating partner, for example, not only that the business program of the business application is to be changed. Besides, the data format of previously stored data in the business application is also required to be converted into the new data format, if the data is to be exchanged between the business applications. When two business application systems employ different types of API from each other, it is not always possible to establish a one-to-one correspondence in operation between the two systems. For that reason, data may be accessed through a single operation in one of the business application systems, whereas multiple operations may have to be involved in the other business application system for gaining access to the data. This may cause the problem that a system operation for exchanging data among multiple business applications becomes more complicated, or as a matter of fact, impossible.

SUMMARY OF THE INVENTION

The embodiments of the present invention are directed to solving such problems discussed above. It is an object of the embodiments of the present invention to provide an inter-application data transmitting system in which data is exchanged among different types of business applications over the network and the functions of the different types of business applications are used mutually among the different types of business applications over the network. The inter-application data transmitting system is provided with an application intermediary unit which gains access to an existing or currently operating business application through an existing or currently operating interface. The application intermediary unit converts the data format of the data and establishes a correspondence in the meaning of the value of data. Thus, specifically, it is the object of the embodiments of the present invention to achieve the mutual use of data among the different types of business applications over the network and the mutual use of the functions of the different types of business applications without adding any change to an existing business application.

In addition to that, in the mutual use of the data and the functions among different types of multiple, more than two, business applications, the mutually used data, functions and even communication facilities and functions may differ from one another on a unit of communicating pair basis of the different types of multiple business applications. In that respect, it is another object of the embodiments of the present invention to provide an inter-application data transmitting system in which the data, functions and communication facilities can be selected on the unit of communicating pair basis of the different types of multiple business applications.

These and other objects are accomplished by the present invention as hereinafter described in further detail.

According to one aspect of the present invention, an inter-application data transmitting system for exchanging data among a plurality of applications interconnected over a network, each of the plurality of applications storing the data in a predetermined application dependent data format, includes an application intermediary unit for mediating the data to be transmitted between the network and one of the plurality of applications. The application intermediary unit includes, an application control unit for controlling a transmission of the data between the one of the plurality of applications and the application intermediary unit, an access procedure rule memory for storing an access procedure rule which defines a procedure to be used for gaining access to the data stored in the one of the plurality of applications, an access procedure control unit, controlled by the application control unit, for gaining access to the data stored in the one of the plurality of applications in accordance with the access procedure rule stored in the access procedure rule memory, a data format conversion rule memory for storing a data exchange format which is a data format predefined to be used for exchanging the data among the plurality of applications interconnected over the network, and further storing a data format conversion rule to be used for converting at least one of an application dependent data format of the data stored in the one of the plurality of applications which is accessed by the access procedure control unit into the data exchange format and the data exchange format into the application dependent format of the data stored in the one of the plurality of applications, data format conversion unit for converting the data from one data format to another data format based on the data format conversion rule stored in the data format conversion rule memory, a communication control rule memory for storing a communication control rule which defines a communication rule, and a communication control unit for controlling a transmission over the network of converted data in the data exchange format which is converted by the data format conversion unit based on the communication control rule stored in the communication control rule memory.

The application control unit may include a monitoring area table for setting data stored in the one of the plurality of applications which is required to be notified to another one of the plurality of applications as data to be notified, for setting a processing request status which indicates an occurrence of the data to be notified, and for setting a data area of data to be monitored stored in the one of the plurality of applications which is monitored by the application control unit and also setting a data value of the data area in response to the processing request status. The application control unit may detect the processing request status being set in the monitoring area table, and outputs an instruction corresponding to a detected processing request status to the access procedure control unit.

The access procedure rule memory may store the access procedure rule corresponding to the processing request status. The access procedure control unit may detect the access procedure rule corresponding to the processing request status stored in the access procedure rule memory based on the instruction received from the application control unit, and gain access to the data stored in the one of the plurality of applications in accordance with a detected access procedure rule.

The communication control rule memory may store the communication control rule corresponding to each of the plurality of applications interconnected over the network which the one of the plurality of applications exchanges the data with.

The application intermediary unit may further include, an event control unit for receiving an event which requests the application intermediary unit to respond to and for outputting a received event, a state transition rule memory for storing a state transition rule which defines a condition for transition which defines a condition for state transition for changing a state in response to the event and a processing item for the state transition corresponding to the condition for transition, and a state transition control unit for receiving the event from the event control unit, retrieving the state transition rule stored in the state transition rule memory based on a received event, thereby extracting the state transition rule including the condition for transition corresponding to the received event, and executing the processing item of an extracted state transition rule.

The inter-application data transmitting system may further include an application dependent rule generation unit for generating an application dependent rule which defines a rule depending on the one of the plurality of applications.

According to another aspect of the present invention, a method for transmitting data to be exchanged among a plurality of applications interconnected over the network, each of the plurality of applications storing the data in a predetermined application dependent data format, includes the step of mediating the data to be transmitted between the network and one of the plurality of applications. The step of mediating the data to be transmitted between the network and one of the plurality of applications includes the steps of, controlling a transfer of the data stored in the one of the plurality of applications, storing an access procedure rule which defines a procedure to be used for gaining access to the data stored in the one of the plurality of applications, gaining access to the data stored in the one of the plurality of applications controlled in the step of controlling the transfer of the data stored in the one of the applications based on the access procedure rule stored in the step of storing the access procedure rule to the data stored, storing a data exchange format which is a data format predefined to be used for transmitting the data to be exchanged with the plurality of applications, and further storing a data format conversion rule to be used for converting at least one of the application dependent format depending on the one of the plurality of applications into the data exchange format and the data exchange format into the application dependent format depending on the one of the plurality of applications, converting the data in one data format to another data format based on the data format conversion rule stored in the step of storing the data exchange format and the data format conversion rule, storing a communication control rule which defines a communication rule, and controlling a transmission of the data in the data exchange format over the network in accordance with the communication control rule stored in the step of storing the communication control rule.

According to a further aspect of the present invention, a computer readable storage medium having a computer readable program code stored therein for causing data to be exchanged among a plurality of interconnected applications over a network includes a mediate code segment for causing a computer to mediate the data to be transmitted between the network and one of the plurality of applications. The mediate code segment includes, a control code segment for causing the computer to control a transfer of the data stored in the one of the plurality of applications, a storing code segment for causing the computer to store an access procedure rule which defines a procedure to be used for gaining access to the data stored in the one of the plurality of applications, a gaining access code segment for causing the computer to gain access to the data stored in the one of the plurality of applications controlled by the control code segment for causing the computer to control the transfer of the data stored in the one of the applications based on the access procedure rule stored by the storing code segment for causing the computer to store the access procedure rule to the data stored, a storing code segment for causing the computer to store a data exchange format which is a data format predefined to be used for transmitting the data to be exchanged with the plurality of applications, and further store a data format conversion rule to be used for converting at least one of the application dependent format depending on the one of the plurality of applications into the data exchange format and the data exchange format into the application dependent format depending on the one of the plurality of applications in another case, a conversion code segment for causing the computer to convert the data from one data format to another data format based on the data format conversion rule stored by the store code segment for causing the computer to store the data exchange format and the data format conversion rule, a storing code segment for causing the computer to store a communication control rule which defines a communication rule, and a control code segment for causing the computer to control a transmission of the data in the data exchange format over the network in accordance with the communication control rule stored by the storing code segment for causing the computer to store the communication control rule.

Further scope of applicability of the present invention will become apparent from the detailed description given hereinafter. However, it should be understood that the detailed description and specific examples, while indicating preferred embodiments of the invention, are given through illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given through illustration only, and thus are not imitative of the present invention, and wherein:

FIG. 3 shows a diagram of a monitoring area table which is used in the first embodiment and in a second embodiment of the present invention.

FIG. 4 shows a diagram of a transferring data table which is used in the first and second embodiments of the present invention;

FIG. 5 shows a diagram of an access procedure rule;

FIG. 6 shows a diagram of a data format conversion rule;

FIG. 7 shows a diagram of a data format inversion rule;

FIG. 8 shows a diagram of a communication control rule;

FIG. 17 shows a diagram illustrating an example of an XML data format.

FIG. 18 shows a block diagram illustrating an overall network connection view of three business application systems according to the inter-application data transmitting system of the present invention;

FIG. 20 shows a diagram of a monitoring area table provided in the application control unit used in the second embodiment of the present invention;

FIG. 21 shows a diagram of a transferring data table provided in the application control unit used in the second embodiment of the present invention;

FIG. 22 shows a diagram of a communication control rule according to the second embodiment of the present invention;

FIG. 23 shows a diagram of a communication control rule according to the second embodiment of the present invention;

FIG. 24 shows a diagram of a communication control rule according to a third embodiment of the present invention;

FIG. 25 shows a diagram of a communication control rule according to the third embodiment of the present invention;

FIG. 26 shows a diagram of a communication control rule according to a fourth embodiment of the present invention;

FIG. 27 shows a diagram of a communication control rule according to the fourth embodiment of the present invention;

FIG. 30 shows a diagram of a communication control rule according to the sixth embodiment;

FIG. 41 shows a diagram of a state transition rule which is used in the inter-application data transmitting system involving the state transition control;

FIG. 48 shows a diagram of a control rule screen of a state transition rule creation GUI when generating the state transition rule according to a sixteenth embodiment of the present invention;

FIG. 49 shows a diagram of the control rule screen of the state transition rule creation GUI when generating the state transition rule according to the sixteenth embodiment;

DETAILED DESCRIPTION OF THE PREFERRED EMBODIMENTS

Figure 1:
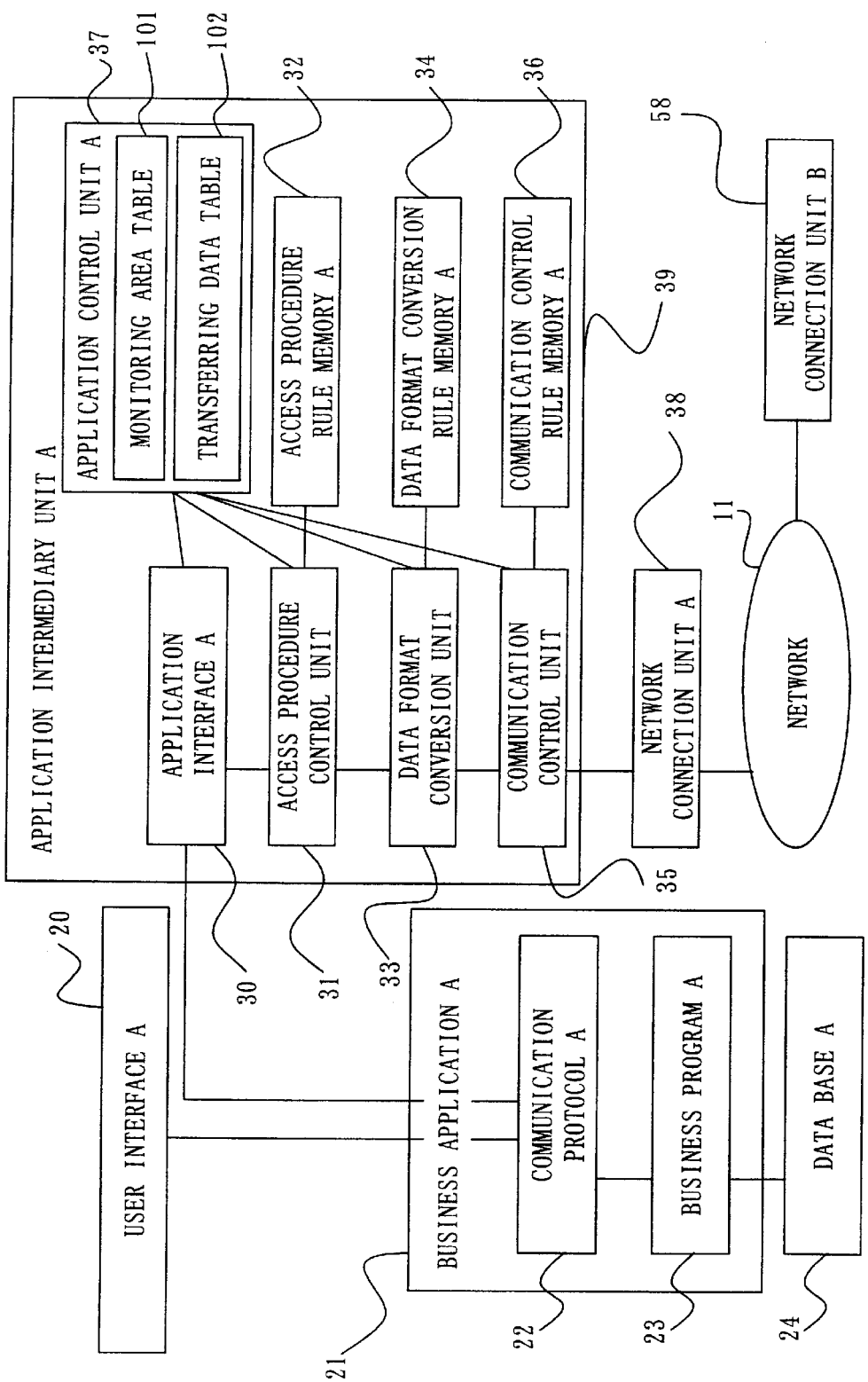
FIG. 1 shows a block diagram of an inter-application data transmitting system according to a first embodiment of the present invention illustrating a basic configuration of a business application system A.

Reference will now be made in detail to the present preferred embodiments of the invention, examples of which are illustrated in the accompanying drawings, wherein like reference numerals indicate like elements throughout the several views.

Embodiment 1

Figure 2:
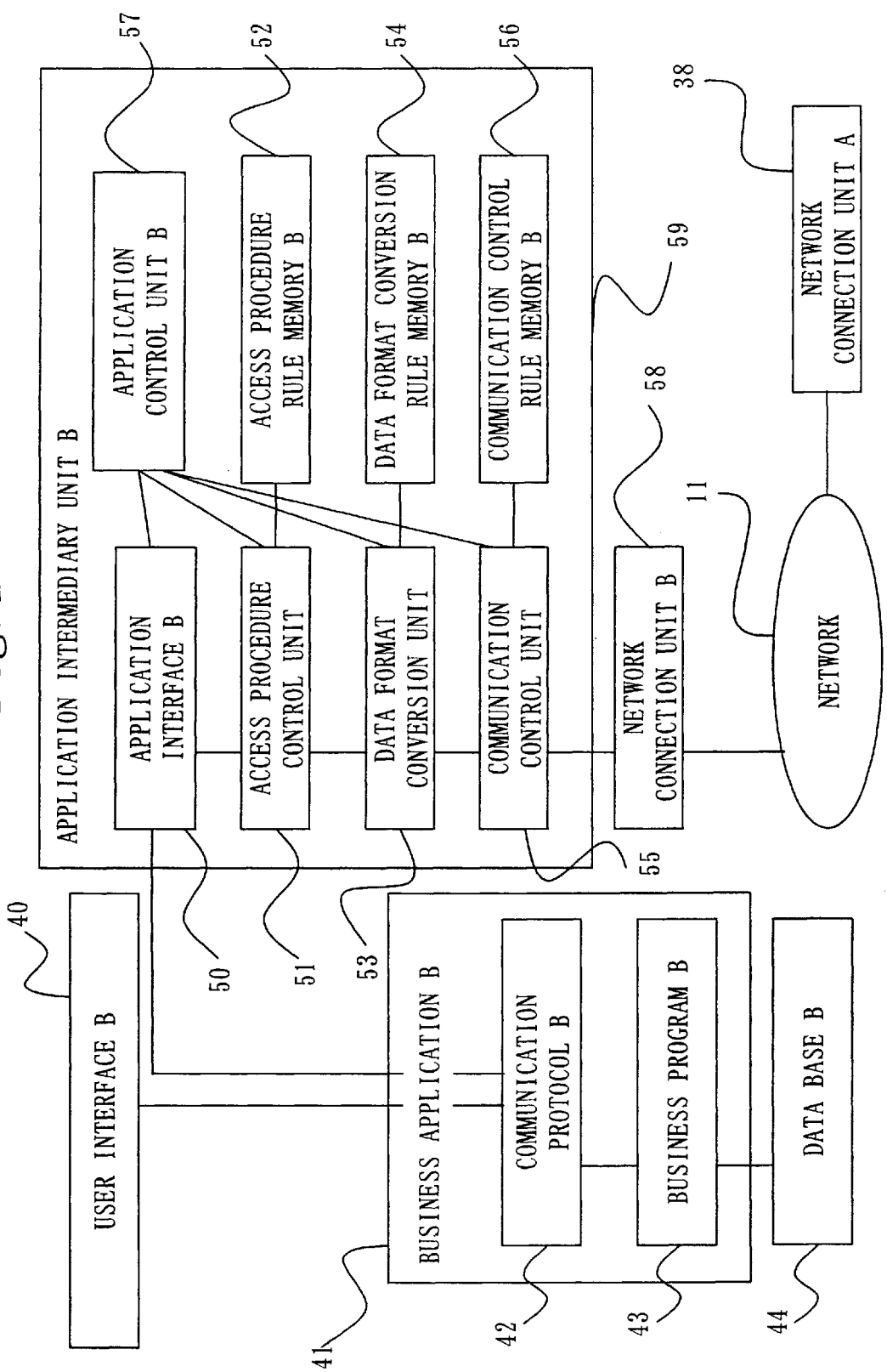
FIG. 2 shows a block diagram of the inter-application data transmitting system according to the first embodiment of the present invention illustrating a basic configuration of a business application system B.

FIG. 1 and FIG. 2 show an inter-application data transmitting system according to a first embodiment of the present invention.

Specifically, FIG. 1 shows a block diagram of the configuration of a business application system A which includes one of multiple, e.g. two in this embodiment, business applications interconnected over a network.

Referring now to the business application system A of FIG. 1, a reference numeral 20 denotes a user interface A through which the user of a business application A of the business application system A enters data in order to use the function of the business application A and receives an output result from the business application A.

A reference numeral 21 denotes the business application A which is the one of multiple business applications interconnected over the network. The business application A may be referred to hereinafter as the business application (21).

A reference numeral 22 denotes a communication protocol A which is used for communication between the user interface A (20) and the business application A (21).

A reference numeral 23 denotes a business program A. The business program A may be referred to hereinafter as the business program (23).

A reference numeral 24 denotes a data base A in which business data is stored. The business application A (21) is composed of the elements of the communication protocol A (22) and the business program A (23).

Now, the business application A (21) is connected with the data base A (24) in which data is stored by the business application A (21). The data base A (24) may be placed within the business application A (21). The configuration of FIG. 1 exemplifies that an external device of the data base A (24) is connected with the business application A (21).

A reference numeral 30 denotes an application interface A which is provided with a communication protocol for communicating with the communication protocol A (22) and used for exchanging data and a control command with the business program A (23).

A reference numeral 39 denotes an application intermediary unit A which mediates a transmitting operation of data between the network and the business application A (21). The application intermediary unit A will be referred to hereinafter as the application intermediary unit A (39) or the application intermediary unit (39).

A reference numeral 37 denotes an application control unit A which controls a transferring operation of data between the application intermediary unit A (39) and the business application A (21). The application control unit A (37) will be referred to hereinafter as the application control unit A (37) or the application control unit (37).

A reference numeral 32 denotes an access procedure rule memory which stores an access procedure control rule which defines a procedure for gaining access to data stored in the data base A (24) through the business application A (21). The access procedure rule memory of FIG. 1 of this embodiment defines the access procedure rule depending on the business application A (21). For that reason, the access procedure rule memory will be referred to, hereinafter, as the access procedure control rule memory A (32).

A reference numeral 31 denotes an access procedure control unit which gains access to data stored in the data base A (24) through the business application A (21) in accordance with the access procedure rule stored in the access procedure rule memory A (32). The access procedure control unit (31) is controlled by the application control unit A (37).

A reference numeral 34 denotes a data format conversion rule memory for storing a data exchange format which is predefined to be used for exchanging data with each other among multiple applications interconnected over the network, and also for storing a data format conversion rule which is used for converting a data format of data from/to the data exchange format into/from an application dependent data format. The application dependent data format is a format of data stored in the one of the multiple business applications interconnected over the network, i.e., the business application A (21) in this embodiment, which is accessed by the application procedure control unit (31). The data format conversion rule memory 34 of FIG. 1 according to this embodiment stores the data format conversion rule which is dependent on the business application A (21). For this reason, the data format conversion rule memory will be referred to hereinafter as the data format conversion rule memory A (34).

A reference numeral 33 denotes a data format conversion unit for converting the data format of data from/to the application data format to/from the data exchange format in accordance with the data format conversion rule stored in the data format conversion rule memory A (34).

A reference numeral 36 denotes a communication control rule memory which stores a communication control rule which defines a rule in communication. The communication control rule memory (36), according to the embodiment of FIG. 1, stores the communication control rule which is dependent on the business application A (21). For that reason, the communication control rule memory (36) will be referred to hereinafter as the communication control rule memory A (36).

A reference numeral 35 denotes a communication control unit which controls a transmission over the network of data in the data exchange format which is converted by the data format conversion unit (33) in accordance with the communication control rule stored in the communication control rule memory A (36).

Referring further to the application control unit A (37), the application control unit A is provided with two tables, a monitoring area table and a transferring data table.

A reference numeral 101 denotes the monitoring area table which sets data stored in the one of the multiple applications, i.e., the business application A (21) here, which is required to be notified to a communicating partner of the multiple applications as data to be notified, and sets a processing request status which indicates an occurrence of the data to be notified. Further, in response to the processing request status, the monitoring area table 101 sets a data area of data to be monitored which is stored in the one of the multiple applications which is monitored by the application control unit, and also sets a data value of the data area. The application control unit may set multiple types of the processing request status.

A reference numeral 102 denotes the transferring data table which defines the notifying data to be transferred from the one of the multiple applications to the another application in association with the processing request status.

The monitoring area table (101) and the transferring data table (102) each are to define data in such a manner as depending on the business application, i.e., the business application A (21) according to this embodiment. For that reason, they may be referred to hereinafter as the monitoring area table A (101) and the transferring data table A (101).

A reference numeral 38 denotes a network connection unit which connects the application intermediary unit A (39) or, in a concrete sense, the communication control unit (35) with the network.

A reference numeral 11 denotes the network over which the multiple business applications are interconnected.

In the following descriptions, the name of an element may have an alphabetic sign, "A" or "B", being added at the end thereof. This indicates that the element may include a factor depending on the corresponding business application labeled "A" or "B". However, it is assumed that the element being labeled "A" and the element being labeled "B" of the same name are the same in function. The element labeled "A" and the element labeled "B" of the same name may have the same function if the business applications on which those elements depend are the same in the type.

In the following descriptions of this embodiment and of the following embodiments, the terms of "business application" and "business program" are used for the sake of convenience in explanation. The "business application" may be interpreted as the application which is used for business and the "business program" may be interpreted as the program which is used for business. However, this does not mean to exclude the applications and programs which are not designed for business such as an application or program designed for a personal use or for amusement purposes. In that respect, there is no problem if the "business application" is referred to as an application and the "business program" is referred to as a program.

FIG. 2 shows a block diagram of a business application system B which is interconnected with the business application system A of FIG. 1 over the network for implementing the first embodiment of the inter-application data transmitting system of the present invention.

The configuration of the business application system B of FIG. 2 corresponds to the configuration of the business application system A of FIG. 1. Reference numerals 40 through 59 denote elements which are assumed to be the same in function as the elements having the same names of the business application system A of FIG. 1. For that reason, the elements 40 through 59 will not be described here in details. Thus, a user interface B (40), a business application B (41), a communication protocol B (42), and a business program B (43) are assumed to be the same in function as those having the same name of the business application system A of FIG. 1 according to this embodiment. However, those elements of the business application system B of FIG. 2 each may not be the same including a portion different from the corresponding element of the business application system A of FIG. 1.

Now, the monitoring area table (101) and the transferring data table (102) is described. Those tables are provided within the application control unit A (37) in the application intermediary unit A (39).

FIG. 3 shows an example of the monitoring area table (101).

The application control unit A (37) detects the processing request status which is set in the monitoring area table (101) and outputs an instruction corresponding to a detected processing request status to the access procedure control unit (31).

The business application A (37) detects the processing request status in the following manner. In the case that the business application A (21) is provided with a function for detecting the processing request status, the application control unit A (37) instructs the business application A (21) to detect the processing request status through the application interface A (30). In this case, the application control unit A (37) verifies the type of a detected processing request status from among the multiple types of the processing request status listed in the monitoring area table (101).

On the other hand, in the case that the business application A (21) is not provided with the function for detecting the processing request status, the application control unit A (37) instructs the access procedure control unit (31) to gain access to the data base A (24) through the application interface A (30) in order to detect the multiple types of the processing request status which are set in the monitoring area table (101). Then, data areas in the data base A (24) corresponding to the respective types of the processing request status are obtained and the occurrence of the processing request status is detected. The example of the monitoring area table (101) of FIG. 3 shows a checking list if there is any "change in the fixed date of deadline" for an order "in a wait status for response from the company B" in a "business requested a company B to deal with".

FIG. 4 shows an example of the transferring data table (102).

The application control unit A (37) sets a data area corresponding to the detected processing request status from which the data is to be obtained from the data base A (24).

FIG. 5 shows the example of the access procedure rule which is stored in the access procedure rule memory A (32).

A control condition is defined so as to correspond to the processing request status. The access procedure rule may include another type of control condition required other than that corresponding to the processing request status.

Control items shown in FIG. 5 include control items which are executed in the business application A (21) and control items which are executed in the access procedure control unit (31). Among the control items listed in the table, the underlined are executed in the business application A (21) and the others are executed in the access procedure control unit A (31). The control procedures of those control items depend on the access procedure of the business application A (21) for gaining access to the data base A (24). For that reason, it is required to change the procedures depending on the changes of business applications.

The access procedure control unit (31) is required to gain access to the business application A (21) in accordance with the control procedures.

FIG. 6 and FIG. 7 show the example of the format conversion rule.

The format conversion rule includes a data format conversion rule of FIG. 6 to be used for converting a data format from an application dependent data format into a data exchange format and a data format inversion rule of FIG. 7 to be used for converting a data format from the data exchange format into the application dependent format.

The data format conversion unit (33) converts a data format in accordance with the data format conversion rule or the data format inversion rule.

Referring to the tables of FIGS. 6 and 7, the data format conversion unit (33) converts data formats listed in "before data" columns into data formats listed in "after data" columns, respectively.

Specifically, with reference to the table of FIG. 6, with the first item in the column, it is indicated that Order ID which is represented by fourteen (14) letters in the data format of a system, whereas it is represented separately by date information of eight (8) letters and a serial number of six (6) letters in the data format of another system. With the last item in the column, "Length (Customer Name)>18" indicates that the first eighteen (18) letters of the name of a customer, whose name actually requires the number of letters longer than eighteen, is extracted to be used as the customer information due to a limitation of letters for transmission up to eighteen.

With the order ID of FIG. 7, zeros are added to the six-digit data format before inversion so as to fit the eight-digit data format after inversion in the company C.

With the second item, it is indicated that Customer ID information in the data format of a system is inverted into the data format of another system in which Company ID is separated form the "Customer ID" information.

With "Length (customer Name)>12" of the last item, it is indicated that eighteen letters is allowed for representing a customer name as a transmission format, but a system on the receiving side accepts up to twelve letters only for the customer name.

In the following descriptions, the data format conversion rule and/or the data format inversion rule may be referred to as the data format conversion rule.

FIG. 8 shows the example of the communication control rule stored in the communication control rule memory.

According to this example, the communication control rule memory includes multiple kinds of communication control rules. Among the multiple kinds of the communication control rules, a discussion will be made below in this embodiment with reference to the communication control rule designed for comminuting with a company B.

Further, with reference to FIG. 2, an application control unit B (57), an access procedure rule memory B (52), a data format conversion rule memory B (54), and a communication control rule memory B (56) are the elements of an application intermediary unit B (59) depending on the business application B (41). Further, the application control unit B (57) is assumed to be provided also with the monitoring area table (101) and the transferring data table (102), which are not illustrated in the figure, which is similar to the business application system A of FIG. 1. Similarly, descriptions will be made in the following embodiments also with the assumption that the monitoring area table (101) and the transferring data table (102) are provided in each of the business application systems.

An operation of the inter-application data transmitting system according to the first embodiment is now discussed with reference to FIG. 1 and FIG. 2.

Discussions will be made hereinafter with the assumption that the business application A (21) of FIG. 1 belongs to the company A as a system administrator and the business application B (41) of FIG. 2 belongs to the company B as a system administrator.

An explanation is now made with an assumption that a new order which is inputted by a user A through the user interface A (20) via the business application A (21) or an event of the update verification of an existing order which is previously inputted in the business application system A of FIG. 1 is reflected on the business application B (41) which is to be used by a user B in the business application system B of FIG. 2 together with the contents of the relating data. Further, the "order" may be referred to hereinafter as the "new order" or the "update verification of an order".

The system administrator, when specific data in the data base A (24) is updated or newly generated, sets or defines in the application control unit A (37) the fact that the specific data together with its associating data is to be reflected on the data base B (44) prior to the utilization of the business application system A. Specifically, the set data is stored in the monitoring area table (101) and the transferring data table (102) in the application control unit A (37).

The monitoring area table (101) is used in the following manner. The application control unit A (37) monitors the area which is written in the monitoring area table (101). When detecting the fact that the monitoring data is updated, the application control unit A (37) notifies the application intermediary unit B (59) of the updated data and its associating data. The application intermediary unit B (59) determines that the notified updated data is to be written into the data base B (44) together with the associating data. Data to be transmitted from the application intermediary unit A (39) to the application intermediary unit B (59) does not always conform with the data written in the monitoring area table (101). (For example, in the case that a new order is generated in a business order for the company B, the item of "order status" of the data is set to "new". In this case, the details of the new order, such as the name and the address and telephone number of the customer, are required to be notified to the data base B (44).

It is then required to read out data to be transmitted to the application intermediary unit B (59) again from the business application A (21), and specifically the data base A (24), through the access procedure control unit (31), and the application interface A (30) by referring to the transferring data table (102).

For that reason, the monitoring area table (101) and the transferring data table (102) are to be registered in the application control unit A (37) prior to the initiation of the system operation.

The operation of the inter-application data transmitting system of the first embodiment will be discussed in details with reference to the flow charts of FIG. 9 through FIG. 16.

Figure 9:
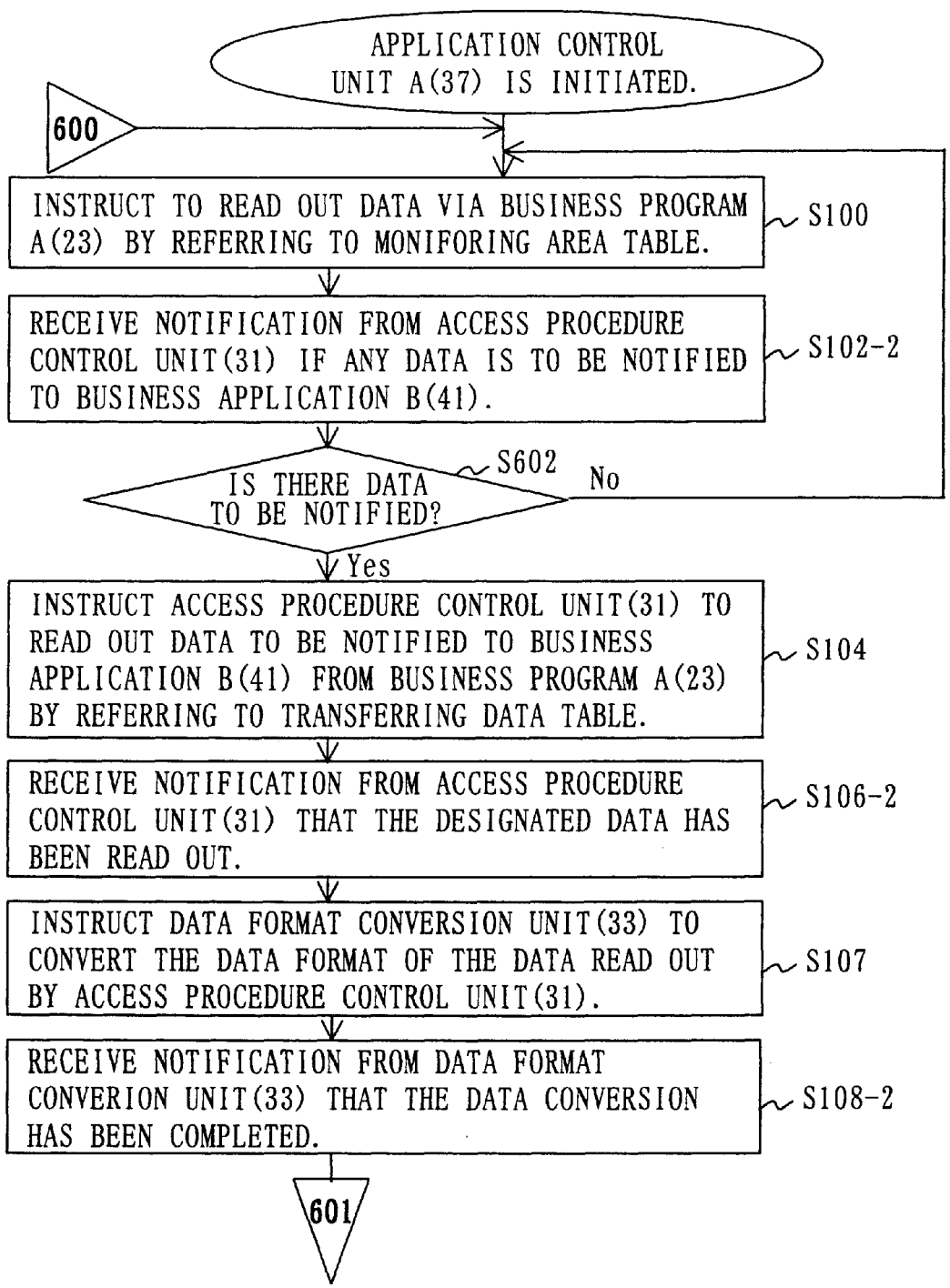
FIG. 9 shows a flow chart illustrating a series of operations performed by an application control unit in the business application system A when transmitting data.
Figure 10:
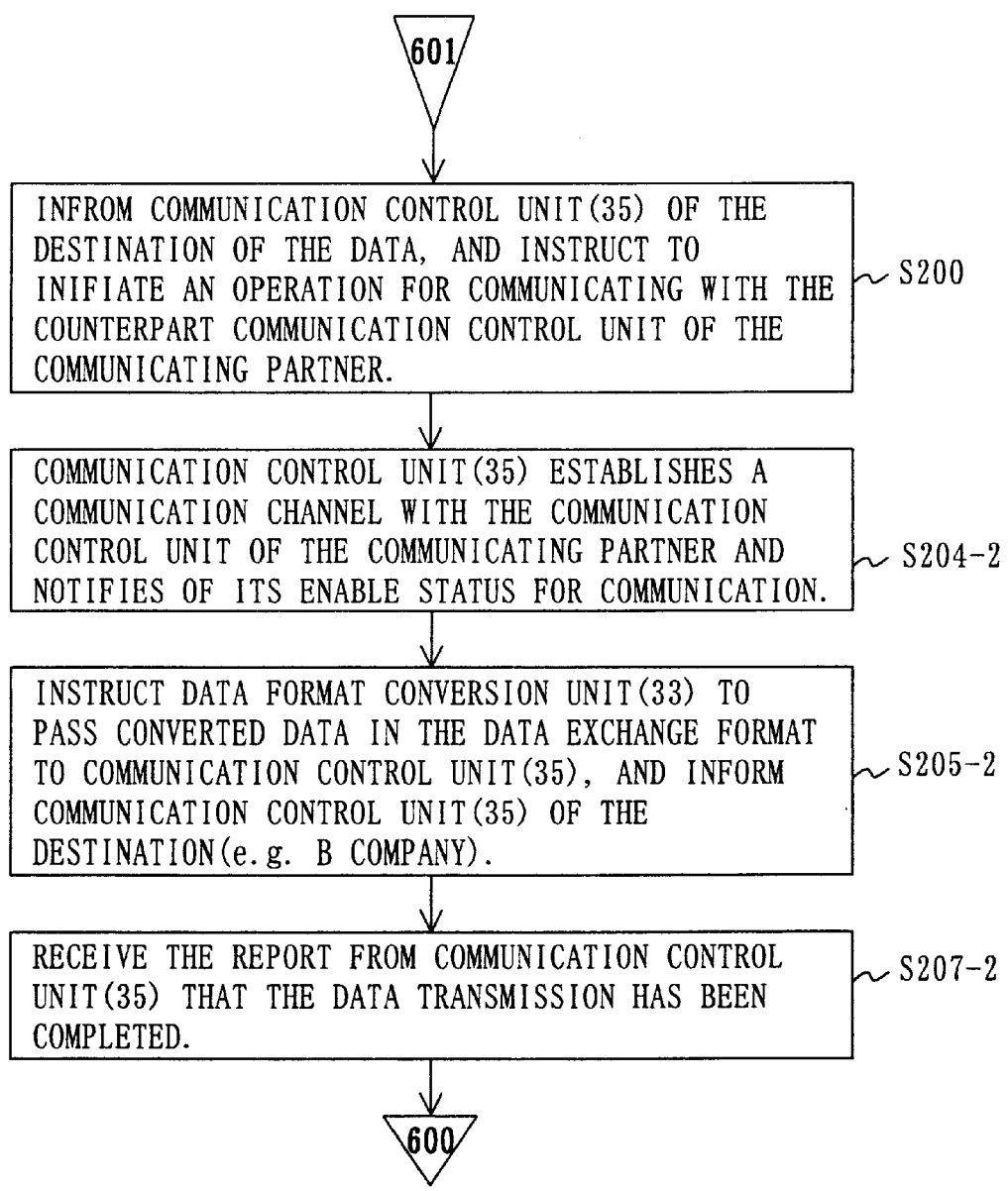
FIG. 10 shows a flow chart illustrating a further series of operations continued from the flow chart of FIG. 9 performed by the application control unit in the business application system A when transmitting the data.
Figure 11:
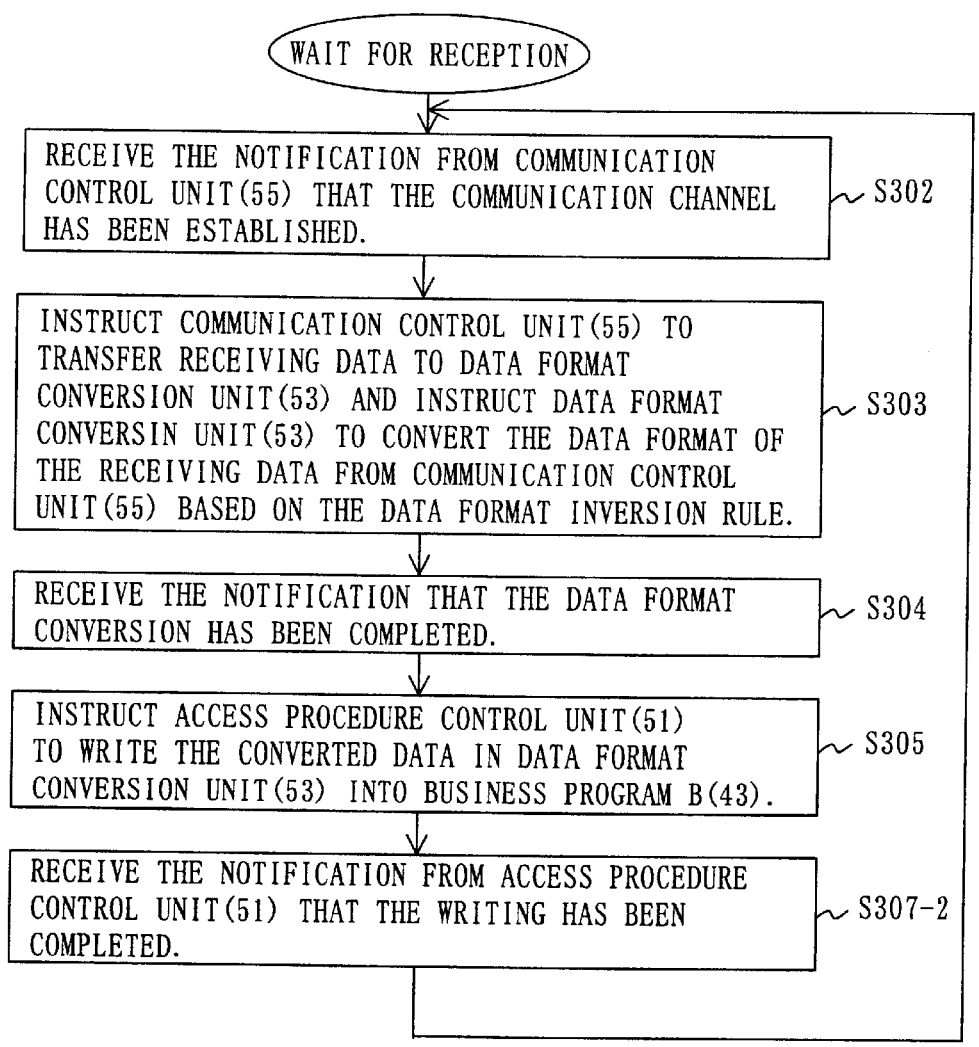
FIG. 11 shows a flow chart illustrating a series of operations performed by an application control unit in the business application system B when receiving the data.
Figure 12:
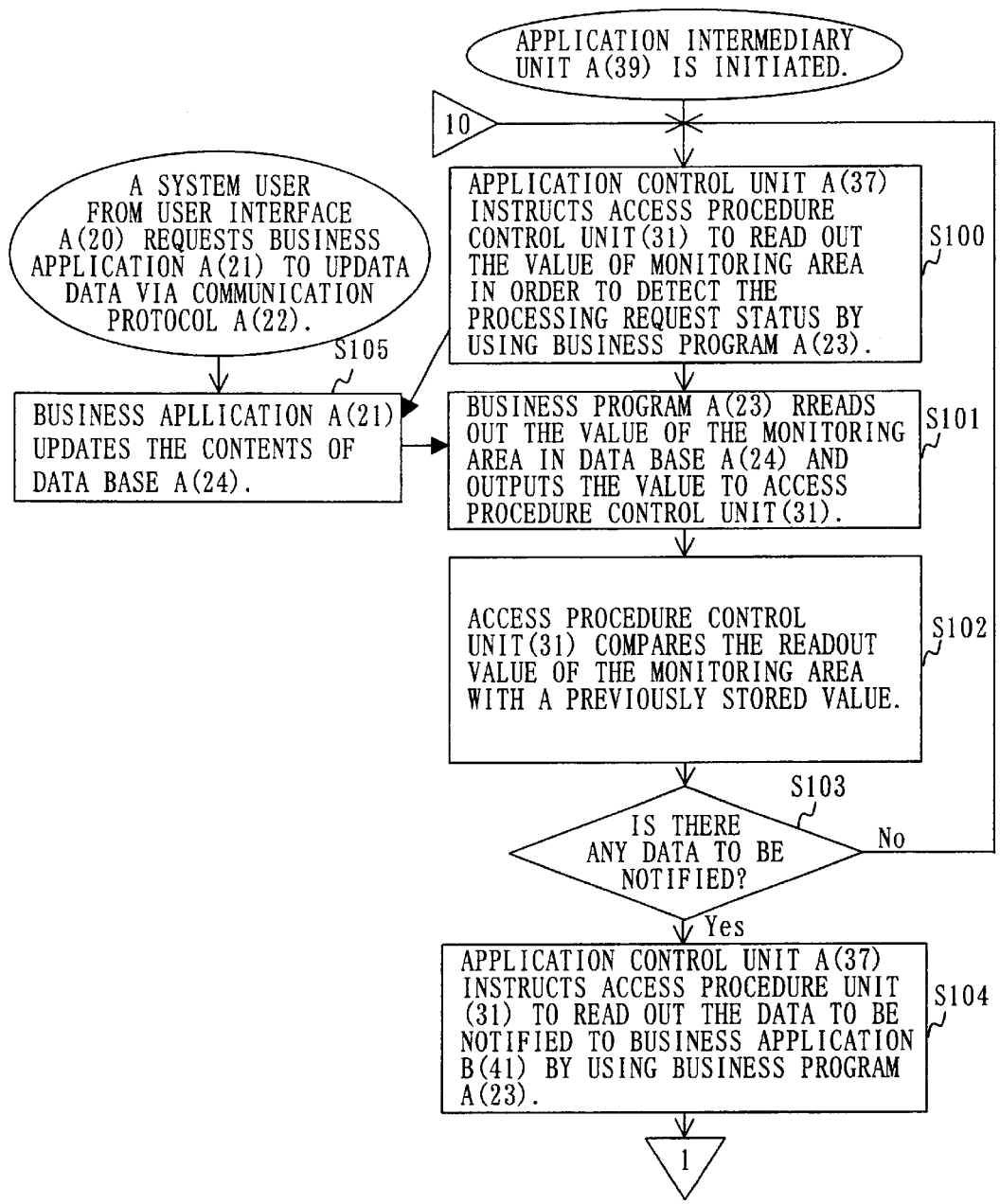
FIG. 12 shows a flow chart illustrating a series of operations performed by an application intermediary unit.
Figure 13:
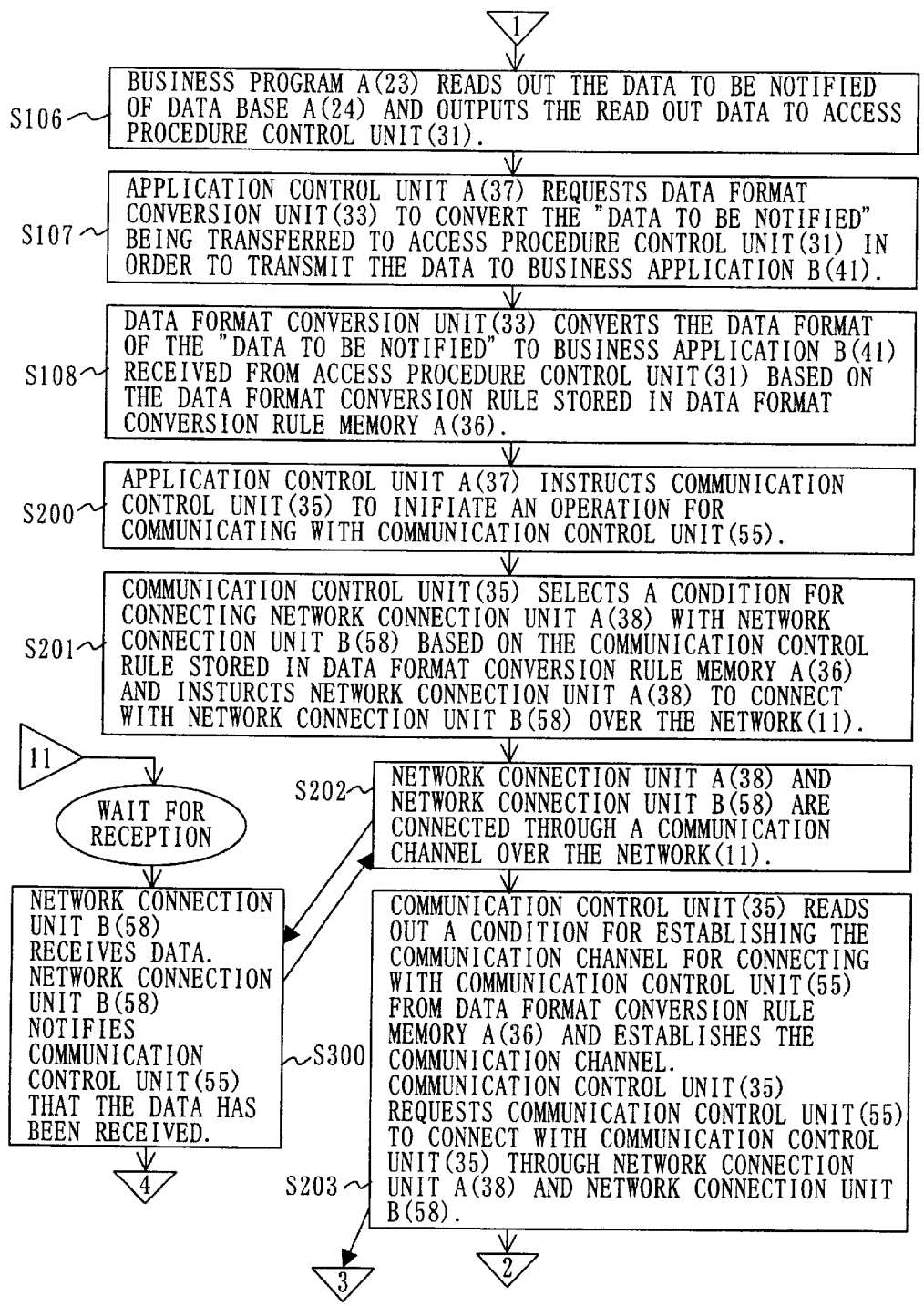
FIG. 13 shows a flow chart illustrating a series of operations performed by the application intermediary unit.
Figure 14:
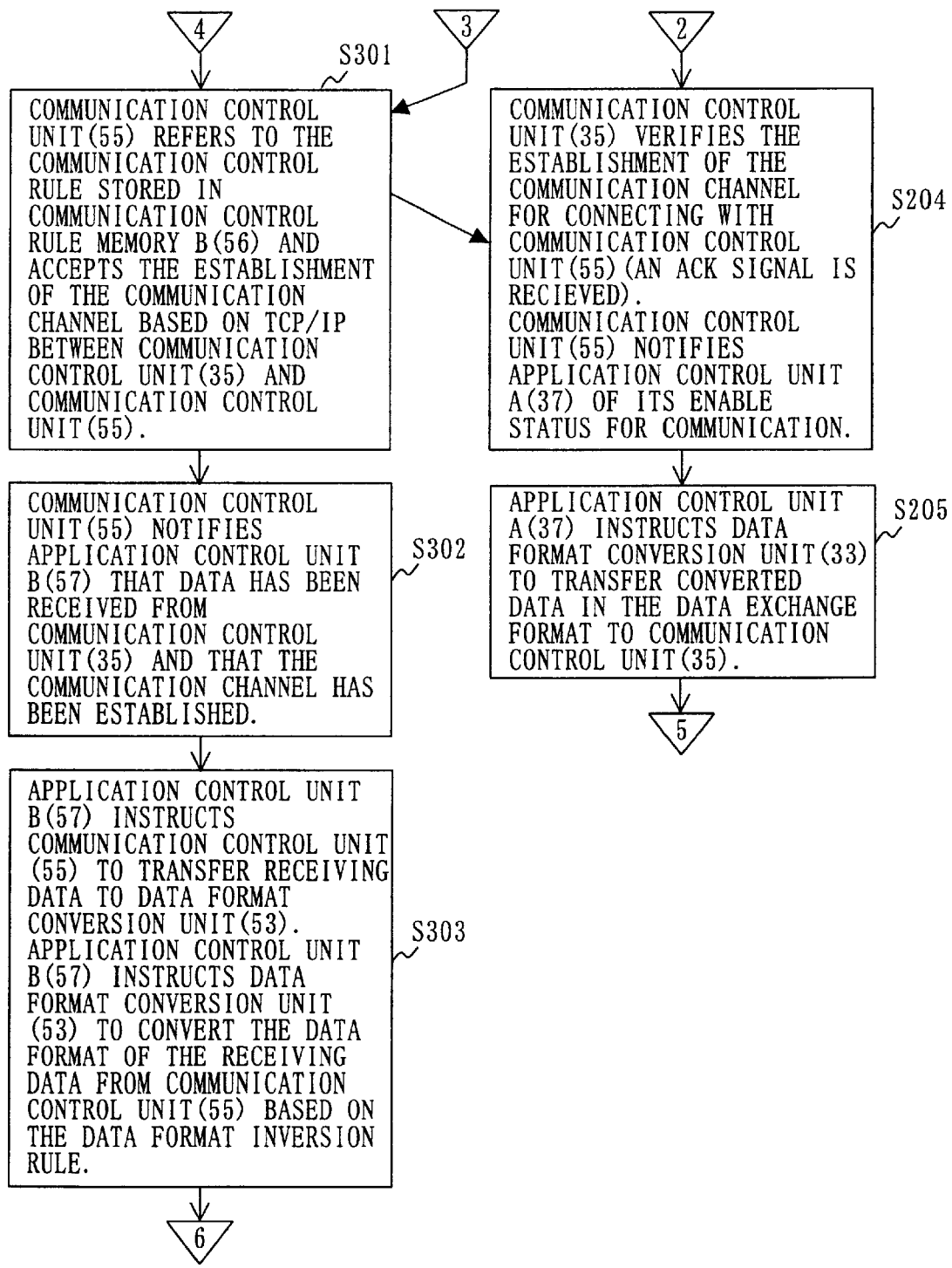
FIG. 14 shows a flow chart illustrating a series of operations performed by the application intermediary unit.

FIG. 9 and FIG. 10 are flow charts illustrating a series of operations performed by the business application control unit A (37) of the business application system A of FIG. 1, respectively. FIG. 11 is a flow chart illustrating a series of operations performed by the application control unit B (59) of the business application system B of FIG. 2. The flow charts of FIG. 9 through FIG. 11 illustrate the operations of the application control units which are essential portions of operations performed in the inter-application data transmitting system of this embodiment.

FIG. 12 through FIG. 16 are flow charts illustrating a series of operations for transferring data from the business application system A of FIG. 1 to the business application system B of FIG. 2 of the inter-application data transmitting system of this embodiment.

In the flow charts of FIG. 9 through FIG. 16, a reference numeral SXXX or SXXX-X (where XXX or XXX-X is a numerical value) denotes a step of operation. The steps of operation appearing in the flow charts of those figures with the same reference numeral are indicated to be the same operation.

Now, a series of operations for updating the corresponding data in the data base B (44) as a result of the user A of the business application A (21) requesting the business application A (21) to update data in the data base A (24) through the user interface A (20) are discussed.

First, data entered by the user at the user interface A (20) is transferred to the business program A (23) through the communication protocol A (22) and the new data updates previous data in the data base A (24) by using the function of the business program A (23)(S105).

The application control unit A (37) verifies whether or not the monitoring data registered in the motoring area table (101) has been updated regularly or in an arbitrarily set period of time (S100 through S102, S100-2 through S102-2). Specifically, the application control unit A (37) reads out the contents of the data base A (24) through the application interface A (30) and the business application A (21). In other words, the application control unit A (37) issues an instruction to the access procedure control unit (31)(S100, S100-2) to read out specified data being stored in the data base A (24) by using the business program A (23) through the application interface A (30) and the communication protocol A (22) (S101) so as to verify the update of readout data (S102, S102-2). When the access procedure control unit (31) gains access to the business program A (23) through the application interface A (30), the access procedure rule stored in the access procedure rule memory A (32) is used for the access procedures.

The value of the readout monitoring data is stored in the access procedure control unit (31). In addition, the application control unit A (37) compares the current value of the readout monitoring data with the previous value of previously read out data. As a result, if the current value of the data is different from the previous value of the data, then the application control unit A (37) determines that the business application A (21) has updated the monitoring data (S102, S103, S102-2, S602). The application control unit A (37) then initiates an operation for notifying the business application B (41) of a new registration of the order or that the contents of the order has been updated together with the updated data (new or updated)(S104, S104-2).

As an alternative method for determining whether or not the contents of the order has been updated, a data area may be provided for identifying the occurrence of updating data in the data base A (24), or the business application A (21) may add information identifying the occurrence of updating data to data read out from the data base A (24) to be transmitted to the application intermediary unit A (39). Of course, there are other methods applicable to this embodiment.

In the case that a set value of the monitoring data is changed to another value, the application control unit A (37) reads out new monitoring data to be notified to the business application B (41) from the business application A (21) by referring to the transferring data table (102) storing the data to be notified to the business application B (41).

Specifically, upon reception of an instruction from the application control unit A (37), the access procedure control unit (31) reads out "data to be notified to the business application B (41)", this time, which is written in the transferring data table (102) from the business program A (23) through the application interface A (30) and the communication protocol A (22) in accordance with the access procedure rule stored in the access procedure rule memory A (32). Read out data to be notified is transmitted to the application control unit A (37) (S106, S106-2).

Alternatively, the transferring data table (102) provided in the application control unit A (37) in the business application system A of FIG. 1 may be provided in the access procedure rule memory A (32).

In a next operation, the application control unit A (37) instructs the data format conversion unit (33) to convert the data format of the updated data to be notified to the business application B (41) into the data exchange format based on the data format conversion rule stored in the data format conversion rule memory A (34)(S107, S107-2). Then the data format of the updated data to be notified to the business application B (41) is converted into the data exchange format in the data format conversion unit (33). The data exchange format may be a data format based on a standard notation called XML (extensible Markup Language)(S108, S108-2), for example.

Converted data in the data exchange format is then instructed to be transferred to the communication control unit (35) by the application control unit A (37).

Subsequently, the application control unit A (37) instructs the communication control unit (35) to initiate an operation for communicating with the communicating partner.

The communication control unit (35) refers to the communication control rule (shown in FIG. 8) to be used for communicating with the communicating partner stored in the communication control rule memory A (36) and determines procedures for communicating with the counterpart communication control unit (55)(S201).

For example, in the case that Internet is used for communication over the network, a function called a fire wall may be provided within the network. The fire wall function is provided for the purpose of rejecting an access or communication from unintended communicating partner at the reception side of a communication request, i.e. the application intermediary unit B (59) according to this embodiment.

In such a case with the fire wall function, the fire wall has to be passed through by using a predetermined procedure in order to implement data transmission between the communication control unit (35) of the application intermediary unit A (39) and the communication control unit (55) of the application intermediary unit B (59). Usually, the predetermined procedure to be used for passing through the fire wall varies depending on the communicating partner in data transmission. The communication control rule stored in the communication control rule memory A (36) includes the port number and the communication protocol to be used for passing through the fire wall. The communication control unit (35) reads out the communication control rule and selects a communication procedure to be used for communicating with the communication control unit (55) of the communicating partner.

The network communication unit A (38) connects the communication control unit (35) to the network (11)(S202, S300). The communication control unit (35) executes the establishment of a communication channel for using the network. (S203, S204, S204-2, S301).

The converted data in the data exchange format to be transmitted to the application intermediary unit B (59) from the application intermediary unit A (39) is transmitted over the network (11) to the communication control unit (55) in the application intermediary unit B (59) through the network connection unit B (58) of the business application system B of FIG. 2 (S205, S205-2, S206, S302 through S304, S302-2 through S304-2).

The detailed operation of the communication control unit (35) will be discussed later in this embodiment.

In the business application system B of FIG. 2, received data in the application intermediary unit B (59) is written into the data base B (44) through the business application B (41) in a reverse order of the procedures performed by the application intermediary unit A (39).

Specifically, the communication control unit (55) of FIG. 2 reads out the converted data in the data exchange format from among received data in accordance with the communication control rule stored in the communication control rule memory B (56). The readout data is transferred to the data format conversion unit (53) together with information indicating that the readout data is received from the application intermediary unit A (39)(S303, S303-2).

The data format conversion unit (53) detects that the readout data has been transmitted from the application intermediary unit A (39). The data format conversion unit (53) selects a data format inversion rule corresponding to the data format of the received data from the data format conversion rule memory B (54). The data format conversion unit (53) then inverts the data exchange format of the received data into the application dependent data format applicable to the business application B (41) and transfers the converted result to the access procedure control unit (51)(S304, S304-2).

The access procedure control unit (51) writes the data in the application dependent data format into the business application B (41) through the application interface B (50) in accordance with the access procedure rule stored in the access procedure rule memory B (52) (S306). The application interface B (50) is provided with the same communication protocol in function as that of the communication protocol B (42). The application interface B (50) instructs the business program B (43) to write the transferred data through the communication protocol B (42)(S305, S305-2).

The business program B (43) updates previous data stored in the data base B (44) with the received data (S307).

Specifically, the business program B (43) uses SQL (Structured Query Language) for updating the data, for example.

The area in the data base B (44) into which the data is written and the format of the data to be used in the user interface B (40) through which the business application B (41) is used are defined based on the location of the data and a tag added to the data in the data exchange format. Specifically, the data format conversion rule stored in the data format conversion rule memory B (49) defines the data format of the data. The access procedure rule stored in the access procedure rule memory B (47) defines the procedures to be used for writing the data into the business application B (41) and the area into which the data is written in the business application B (41).

Figure 15:
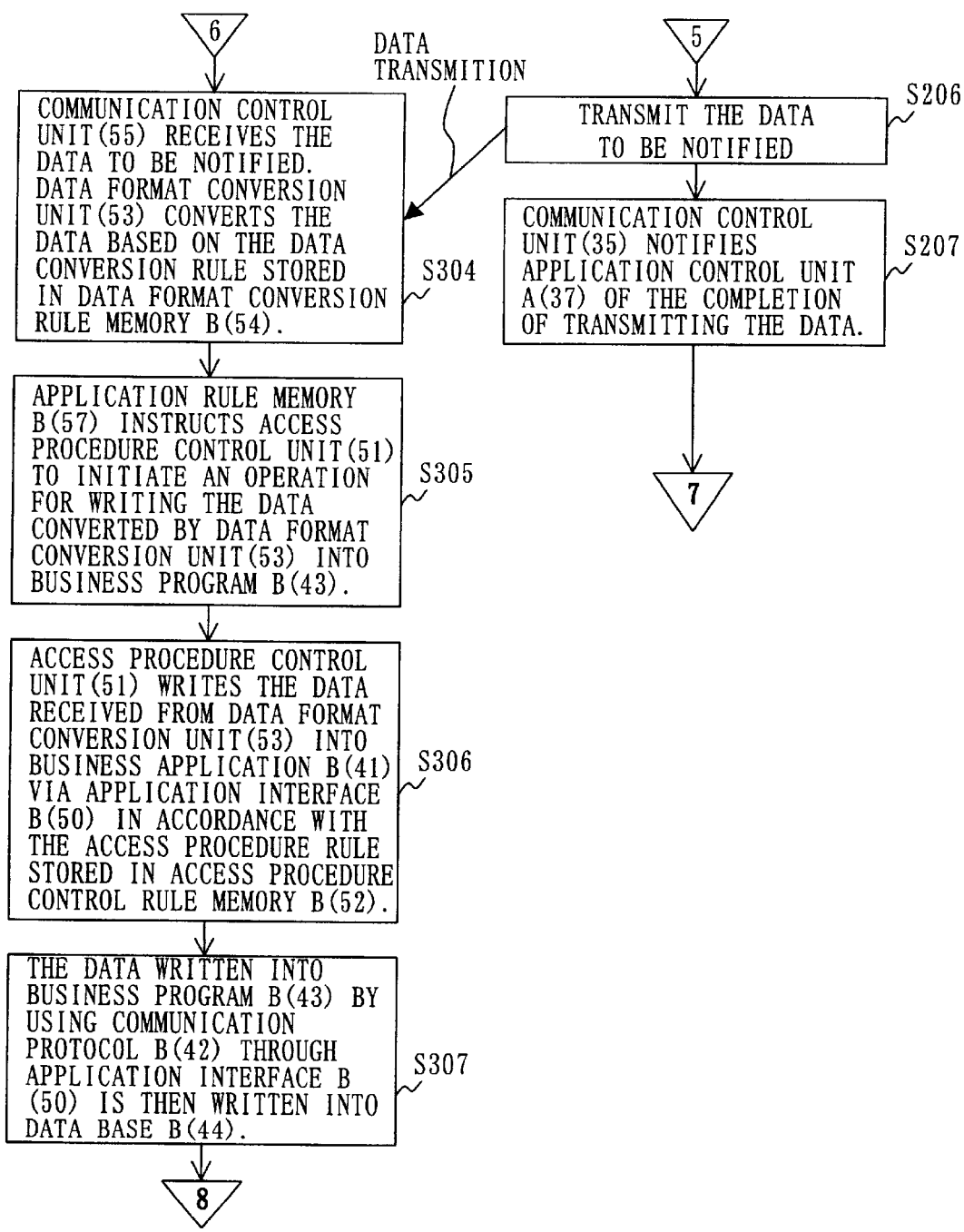
FIG. 15 shows a flow chart illustrating a series of operations performed by the application intermediary unit.
Figure 16:
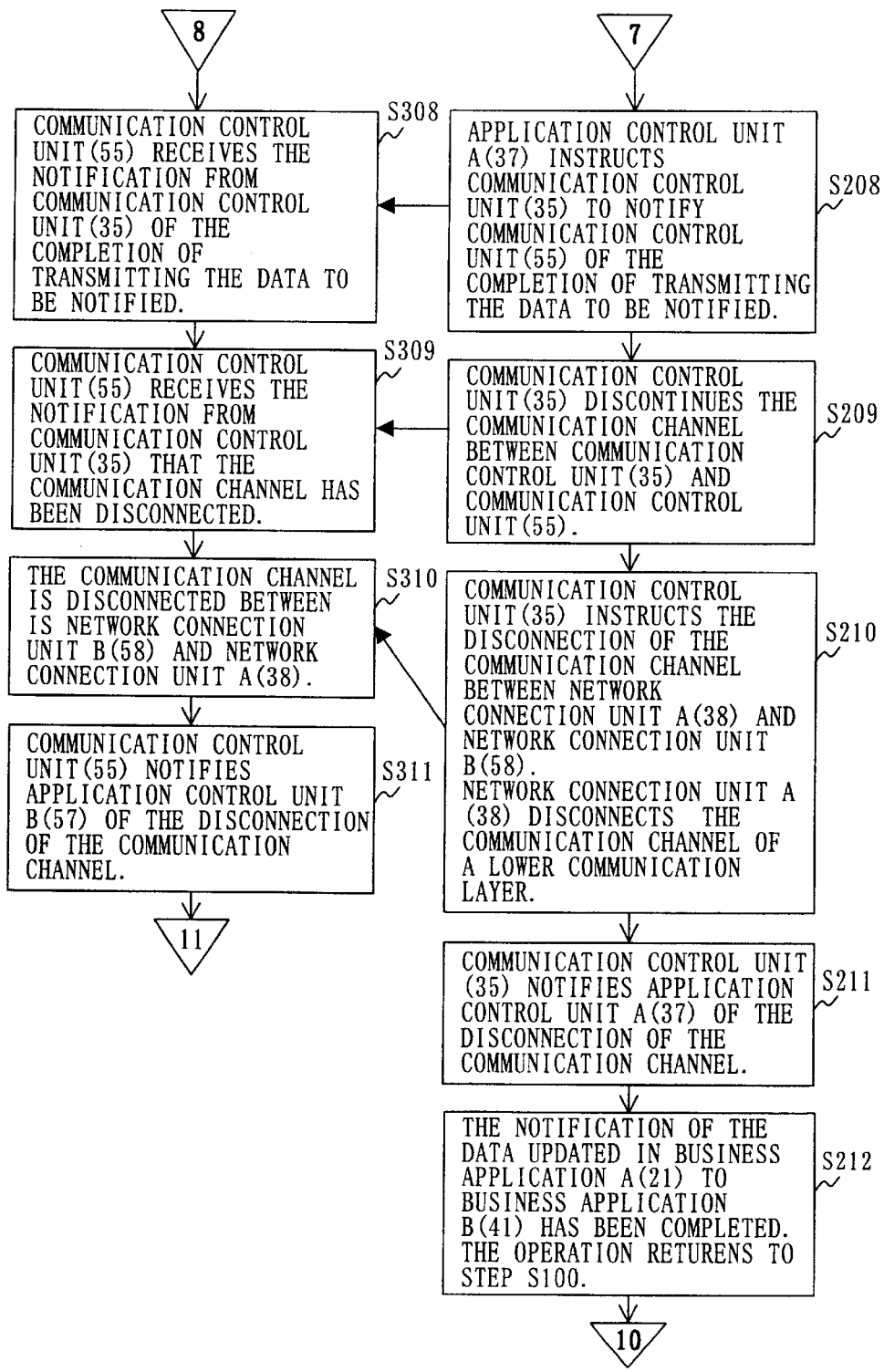
FIG. 16 shows a flow chart illustrating a series of operations performed by the application intermediary unit.

The operations after the transmission of the data to be notified has been completed are shown in step S207 through step S212 in the flow chart of FIG. 15 and step S308 through step S311 in the flow chart of FIG. 16.

An operation of the communication control unit (35, 55) is discussed below in detail with reference to FIG. 12 through FIG. 16.

The business application system A of FIG. 1 of the company A performs a series of operations as follows.

The application control unit A (37) instructs the communication control unit (35) to initiate an operation for communicating with the communication control unit (55) of the business application system B of the company B (S200).

The communication control unit (35) verifies the communication control rule stored in the communication control rule memory A (36) to be used for communicating with the business application system B of the company B (S201). The communication control unit (35) selects a condition for connecting the network connection unit A (38) and the network connection unit B (58) and instructs the network connection unit A (38) to connect with the network connection unit B (58) over the network (11)(S201).

Specifically, between the company A and the company B, a communication protocol TCP/IP (Transport Control Protocol/Internet Protocol) to be used for communication is defined but there is no arrangement about the network connection unit as shown in FIG. 8. This example of FIG. 8 applies to the case that the network connection unit A (38) and the network connection unit B (58) are both connected to the Internet in a direct manner through a router device, respectively. In the case that the network connection unit A (38) and the network connection unit B (58) are both line switching terminal adapters (TA) connected with ISDN, the communication control rule include the telephone number of the communicating partner. In that case, the network connection unit A (38) is to connect a line with the network connection unit B (58) corresponding to the telephone number.

In a next operation, the network connection unit A (38) and the network connection unit B (58) are connected over the network (11) by way of the communication channel (S202). As discussed with reference to step S201, when the network connection unit is directly connected with Internet through a router device, this operation can be verified if the network connection unit A (38) and the network connection unit B (58) are actually connected with Internet and the channel establishing procedure is executed with the confirmation of partner's IP. In the case that the network connection unit is an ISDN (Integrated Services Digital Network) TA (Terminal Adapter) type, a telephone number based line connection is performed and a line establishment signal is sent back from the network through a control channel.

The communication control unit (35) reads out the condition for establishing the communication channel for communicating with the communication control unit (55) from the communication control rule memory A (36) and establishes the communication channel (S203). For example, the communication control unit (35) selects TCP/IP as the communication procedure. The communication control unit (35) reads out a special port number for passing through the fire wall and so forth from the communication control rule memory A (36) and sets the items. The communication control unit (35) issues a request for connecting with the communication control unit (55) through the network connection unit A (38) and the network connection unit B (58)(S203). It is assumed that the company A can communicate with the company B through port number 1022 based on TCP/IP as shown in FIG. 8.

An IP packet to be transmitted to the business application system B of the company B includes an IP address which is written in the communication control rule. The communication control unit (35) issues a request for establishing a communication channel in accordance with a communication channel set procedure based on TCP and the communication control unit (55) responds to the request by issuing an Acknowledge signal. Through that procedure, the communication channel is established between the communication control unit (35) and the communication control unit (55).

The communication control unit (35) verifies the communication channel which has been established with the communication control unit (55)(S204)(with the verification of "TCP Ack"). The communication control unit (35) notifies the application control unit A (37) of an enable state of communication (S204) with the business application system B.

The application control unit A (37) instructs the data format conversion unit (33) to pass the converted data in the data exchange format to the communication control unit (35)(S205).

Then, the data to be notified is to be transmitted. The communication control unit (35) is notified by the application control unit A (37) that the destination of the transmitting data is the business application system B of the company B. Then, the communication control unit (35) transmits the transmitting data towards the business application system B of the company B based on TCP/IP protocol (Port No. 1022)(S206).

Thus, the updated data is transmitted from the business application system A of the company A to the business application B of the company B.

A series of operations performed in the business application system B of FIG. 2 of the company B is now discussed.

The data arrives at the network connection unit B (58). The network connection unit B (58) notifies the communication control unit (55) that the data has arrived (S300). In the case that the network connection unit B (58) is directly connected to Internet through a router device, then the above-mentioned notifying operation is not needed. In the case of the data being received through ISDN TA, a network layer based reception of the data is notified at this stage.

The communication control unit (55) refers to the communication control rule stored in the communication control rule memory B (56) and accepts the establishment of the TCP/IP based communication channel between the communication control unit (35) and the communication control unit (55)(with a response by issuing an Ack signal (S301).

Specifically, the transmitting IP packet has an IP address written for identifying that the transmitting source of the data is the company A. The company B refers to the communication control rule stored in the communication control rule memory B (56) and determines to accept the establishment of the communication channel based on TCP/IP (Port 1022) from the company A. The company B responds to the company A by issuing an Ack signal identifying that the establishment of TCP has been accepted.

The communication control unit (55) notifies the application control unit B (57) that the data has been received from the communication control unit (35) (through TCP/IP) and that the communication channel has been established (S302).

The application control unit B (57) instructs that receiving data thereafter is to be transferred from the communication control unit (55) to the data format conversion unit (53) and that the data exchange format of the receiving data is to be converted into the application dependent data format based on the data format inversion rule stored in the data format conversion rule memory B (54).

The communication control unit (55) receives the data to be notifying and transfers the data to the data format conversion unit (53)(S304). The data format conversion unit (53) converts the data format of the received data from the data exchange format to the application dependent data format applicable to the business application B (41) based on the data format inversion rule stored in the data format conversion rule memory B (54)(S304).

Those are the details of the operations performed by the communication control unit (35, 55).

In that manner, the data in the data base B (44) in the application dependent format upon the business application B (41) is updated so as to share the meaning with the updated data in the data base A (24) in the application dependent format upon the business application A (21).

Thereafter, a user who uses the business application B (41) through the user interface B (40) is allowed to read out the updated data which is originally updated in the business application A (21) and execute processing based on the updated data.

As aforementioned, according to the inter-application data transmitting system of this embodiment, the application intermediary unit A (39) and the application intermediary unit B (59) are allowed, respectively, to write and read out data from the business application A (21) and the business application B (41) by using the existing interfaces which are provided in the business application A (21) and the business application B (41). In addition to that, the access procedures to be used for gaining access to the respective data bases are based on the access procedure rules which are defined in the respective business applications. For that reason, there is no need of changing the business application program, the user interface and the communication protocol in the business application A (21), B (41). Therefore, it is a positive effect of the inter-application data transmitting system according to this embodiment that the users of the business applications are allowed to share data with each other over the network even when performing a conventional operation with the business application.

When received data is in a data format which is not applicable to the business application, the data format conversion unit (33),(53) converts the data format based on the data format conversion rule into the application dependent data format which is used by the business application connected with the application intermediary unit. As the data exchange format, a data format defining minimum required exchange data may be determined in an arrangement between the two business applications based on the language specification, for example, of XML (extensible Markup Language).

FIG. 17 shows an example of data based on the XML.

The example of FIG. 17 shows that defined data in the top chart may be converted into XML based data in the bottom chart.

This can economize the performance of data exchange, thereby allowing the inter-application data transmitting system to lower the communication cost. Further, the data exchange format may be set, for example, so as to apply to the specification of an international standard data format defined of a specific field of business. In that case, it is another positive effect of this embodiment of the present invention that different types of business applications if used for the same field of business are allowed to exchange data with each other.

As an effect of the inter-application data transmitting system according to this embodiment of the present invention, the application intermediary unit allows the different types of multiple business applications to exchange data with each other using existing data without changing the currently using business application software.

Embodiment 2

A second embodiment of the inter-application data transmitting system of the present invention is now discussed with reference to FIG. 18 and FIG. 19.

In this embodiment, the inter-application data transmitting system is discussed when multiple applications, e.g., three applications here, exchange data with each other.

In FIG. 18, elements having the same reference numerals as those of the elements of FIG. 1 and FIG. 2 are assumed to be the same in function as those discussed in the first embodiment.

A reference numeral 81 denotes a business application C which is a third business application interconnected over the network with the others. According to this embodiment, the business application C (81) belongs to a company C as the administrator.

A reference numeral 80 denotes a user interface C (80) which is the user interface of the business application C (81). A reference numeral 84 denotes a data base C which is used by the business application C (81). A reference numeral 89 denotes an application intermediary unit C which allows the business application C (81) to exchange data with each other among the other business applications. A reference numeral 85 denotes a communication control unit (85) which is an element of the application intermediary unit C (89) and corresponds to the communication control unit (35) included in the application intermediary unit A (39) discussed in the first embodiment, for example. A reference numeral 88 denotes a network connection unit which connects the application intermediary unit C (89) with the network so as to establish a communication channel.

FIG. 18 shows an overall network connection view of three business application systems including the business application A (21), the business application B (41) and the business application C (81) according to the inter-application data transmitting system of this embodiment. FIG. 18 illustrates that the business application A (21) and the business application B (41) exchange data with each other over the network (11) and the business application A

(21) also exchanges the data with the business application C (81) over the network (11).

Figure 19:
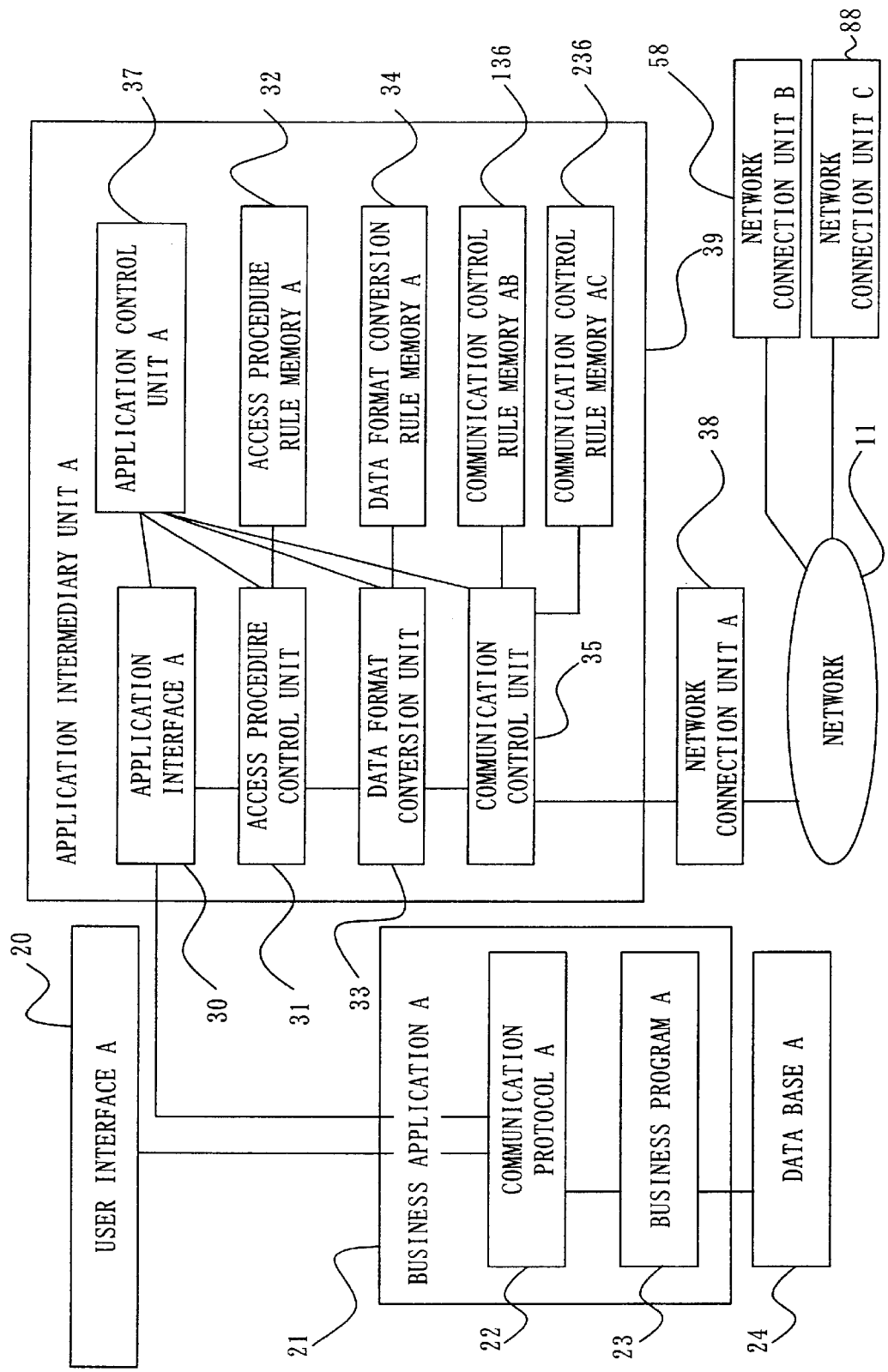
FIG. 19 shows a block diagram of an inter-application data transmitting system illustrating an application intermediary unit including multiple communication control rule memories.

FIG. 19 shows a block diagram of an inter-application data transmitting system of the second embodiment of the present invention. Again, elements having the same reference numerals as those of FIG. 1 and FIG. 2 are assumed to be the same in function as those discussed in the first embodiment.

FIG. 20 shows an example of a monitoring area table provided in the application control unit A (37) used in this embodiment.

FIG. 21 shows an example of a transferring data table provided in the application control unit A (37) used in this embodiment.

A reference numeral 136 denotes a communication control rule memory AB which stores a communication control rule to be used for communication between the application intermediary unit A (39) and the application intermediary unit B (59). FIG. 22 shows an example of the communication control rule to be used for communicating between the business application system A of the company A and the business application system B of the company B in this embodiment.

A reference numeral 236 denotes a communication control rule memory AC which stores a communication control rule to be used for communication between the application intermediary unit A (39) and the application intermediary unit C (89). FIG. 23 shows an example of the communication control rule to be used for communicating between the business application system A of the company A and the business application system C of the company C in this embodiment.

The application intermediary unit A (39) of FIG. 19 modifies the application intermediary unit A (39) of FIG. 1 by replacing the communication control rule memory A (36) with the communication control rule memory AB (136) and the communication control rule memory AC (236) so as to exchange data with each other among the business application A (21), the business application B (41) and the business application C (81).

Alternatively, however, the application intermediary unit A (39) of this embodiment may be provided with a single communication control rule memory in which different types of the communication control rules to be used for the multiple communicating partners (such as the company B and the company C of this embodiment) are to be stored as shown in the example communication control rules of FIG. 8.

An operation of the inter-application data transmitting system of this embodiment is now discussed with reference to FIG. 18 and FIG. 19.

In the following descriptions, it is assumed that data has been updated in the business application A (21) so that the updated result of the data is to be transmitted to the business application B (41) and the business application C (81). It is also assumed that the data exchange format to be used for transmitting the data to the application intermediary unit B (59) and the data exchange format to be used for transmitting the data to the application intermediary unit C (89) are the same.

At the beginning, the contents of data stored in the data base A (24) has been updated by the user of the business application A (21), which causes the updated result of the data to be notified to the business application B (41) and the business application C (81), which is similar to the first embodiment.

The application control unit A (37) monitors the data base A (24) in the same manner as that discussed in the first embodiment to see if there is any change occurred in the contents of the data base A. If the access procedure control unit (31) and the application control unit A (37) determine that readout data is to be notified to the business application B (41) and the business application C (81), the application control unit A (37) reads out data to be notified from the data base A (24). Then, the access procedure control unit (31) transfers the data to be notified to the data format conversion unit (33) together with additional information identifying that the data to be notified is to be transmitted to the application intermediary unit (59) and the application intermediary unit (89). The data format conversion unit (33) verifies the destinations of the data, which are the application intermediary unit B (59) and the application intermediary unit C (89) in this embodiment. Subsequently, the data format conversion unit (33) selects an appropriate one of the data format conversion rules for the respective destinations from the data format conversion rule memory A (34) and then converts the data format of the data.

In fact, according to this embodiment, the data is assumed to be transmitted to the application intermediary unit B (59) and the application intermediary unit C (89) in the same data exchange format, and therefore, the same data format conversion rule is applied to converting the data format of the data.

Subsequently, the converted data in the data exchange format is transferred to the communication control unit (35) together with the information identifying that the destinations of the transmitting data are the application intermediary unit B (59) and the application intermediary unit C (89).

The communication control unit (35) communicates with the communication control unit (55) of the application intermediary unit B (59) and transmits the data in the data exchange format to the application intermediary unit B (59) in accordance with the communication control rule stored in the communication control rule memory AB (136). The communication control unit (35) also communicates with the communication control unit (85) of the application intermediary unit C (89) and transmits the data in the data exchange format to the application intermediary unit C (89) in accordance with the communication control rule stored in the communication control rule memory AC (236).

Specifically, the communication control unit (35) first requests the network connection unit A (38) to establish communication channels, respectively, with the network connection unit B (58) and the network connection unit C (88) of the communicating partners. When the communication channels have been established, the communication control unit (35) initiates an operation for transmitting the data to the communication control unit (55) and the communication control unit (85).

It may be necessary for the application intermediate unit A (39) to specify a special communication port number to be used for passing through a fire wall provided within the network for communicating with the communication control unit (55) of the application intermediary unit B (59). Similarly, the application unit A (39) may have to specify another special communication port number to be used for passing through another fire wall provided within the network for communicating with the communication control unit (85) of the application intermediary unit C (89). For that reason, the communication control rule memory AB (136) and the communication control rule memory AC (236) store communication port number information required for communication through each communication channel.

Data thus received at the communication control unit (55) of the application intermediary unit B (59) is written into the data base B (44) via the business application B (41) through the same procedures as those discussed in the first embodiment. Similarly, thus received data at the communication control unit (85) of the application intermediary unit (89) is written into the data base C (84) via the business application C (81) through the same procedures as those discussed in the first embodiment.

An operation of the communication control unit (35, 55, 85) is discussed below in detail according to this embodiment. In the following descriptions, a reference numeral SXXX (where XXX designates a numerical value) indicates an operating step in the flow charts of FIG. 12 through FIG. 16.

According to this embodiment, the communication control rule memory AB (136) is provided as shown in FIG. 19 to be used for communicating between the company A and the company B instead of the communication control rule memory A (36) of FIG. 1. Similarly, the communication control rule memory AC(236) is provided as shown in FIG. 19 to be used for communicating between the company A and the company C. The same situation will be applied to descriptions in the following embodiments when discussing the operations of the inter-application data transmitting system of the present invention with reference to FIG. 18 and FIG. 19.

First, an operation of the communication control unit (35) of the company A communicating with the company B is discussed.

The application control unit A (37) instructs the communication control unit (35) to initiate an operation for communicating with the communication control unit (55) of the company B (S200).

The communication control unit (35) verifies the communication control rule stored in the communication control rule memory AB (136) to be used for communicating with the company B (S201). The communication control unit (35) selects a condition for connecting the network connection unit A (38) with the network connection unit B (58), and instructs the network connection unit A (38) to connect with the network connection unit B (58) over the network (11) (S201). Specifically, the communication control rule defines the communication protocol TCP/IP only for communication between the company A and the company B with no definition on the network connection units (FIG. 22). The example of FIG. 22 is applied to the case in which the network connection unit A (38) and the network connection unit B (58) each are connected directly to Internet through a router device.

The network connection unit A (38) and the network connection unit B (58) are connected through a communication channel over the network (11)(S202).

The communication control unit (35) reads out a condition for establishing a communication channel to be used for communicating with the communication control unit (55) from the communication control rule memory AB (136) and then establishes the communication channel (S203). Specifically, data is to be transmitted over TCP/IP through port number 1022 for communication between the company A and the company B. An IP packet to be transmitted to the company B includes an IP address which is written in the communication control rule. The communication control unit (35) issues a request for establishing the communication channel in accordance with a communication channel set procedure based on TCP. The communication control unit (55) responds to the request from the communication control unit (35) by issuing an Acknowledge signal, thereby establishing the communication channel between the communication control unit (35) and the communication control unit (55).

With respect to encryption and authorization, nothing is to be involved in data transmission between the company A and the company B (FIG. 22) according to this embodiment. For that reason, the data security may be low in communication, but the data is allowed now to be transmitted from the company A to the company B.

The communication control unit (35) verifies the establishment of the communication channel with the communication control unit (55) (upon reception of a TCP Ack signal)(S204). The communication control unit (35) notifies the application control unit A (37) of an enable status of data communication with the communication control unit (55) of the company B.

Next, an operation of the communication control unit (35) of the company A communicating with the company C is now discussed.

The application control unit A (37) instructs the communication control unit (35) to initiate an operation for communicating with the communication control unit (85) of the company C (S200).

The communication control unit (35) verifies the communication control rule stored in the communication control rule memory AC (236) for communicating with the company C (S201). The communication control unit (35) selects a condition for connecting the network connection unit A (38) and the network connection unit C (88). The communication control unit (35) then instructs the network connection unit A (38) to connect with the network connection unit C (88) over the network (11)(S201).

Specifically, the communication control rule defines a communication based on a commination protocol HTTP (Hypertext Transfer Protocol) (FIG. 23) between the company A and the company C. The HTTP is a communication protocol based on TCP/IP, which specifies a port, thereby allowing for ease in passing through a fire wall. With this example of FIG. 23, it is also assumed that the network connection unit A (38) and the network connection unit C (88) each are connected directly to Internet through a router device.

The network connection unit A (38) and the network connection unit C (88) are connected through a communication channel over the network (11)(S202).

The communication control unit (35) reads out a condition for establishing the communication channel for communicating with the communication control unit (55) from the communication control rule memory AC (236) and then establishes the communication channel (S203). Specifically, data is to be transmitted based on HTTP over TCP/IP for communication between the company A and the company C. An IP packet to be transmitted to the company C includes an IP address which is written in the communication control rule. The communication control unit (35) issues a request for establishing the communication channel in accordance with the communication channel set procedure based on TCP.

The communication control unit (85) responds to the request for establishing the communication channel by issuing an Acknowledge signal, thereby establishing the communication channel between the communication control unit (35) and the communication control unit (85). The example of FIG. 23 shows no encryption nor authorization being involved in communication between the company A and the company C.

The communication control unit (35) verifies the communication channel with the communication control unit (85) (upon reception of the TCP Ack signal)(S204). The communication control unit (35) notifies the application control unit A (37) of an enable status of the communication control unit (35) for communication with the communication control unit (85) of the company C (S204).

The communication channel is thus established between the company A and the company B, and between the company A and the company C, respectively.

Consequently, the communication control unit (35) is allowed to transmit data to the communication control unit (55) through the communication channel using port 1022 based on TCP/IP and also to the communication control unit (85) through the communication channel based on HTTP.

Next, the application control unit A (37) instructs the data format conversion unit (33) to transfer the converted data in the data exchange format as a transmitting format to the communication control unit (35)(S205).

The communication control unit (35) is notified of the destination of the transmitting data by the application control unit A (37)(S206). With the company B as the destination of the transmitting data, the communication control unit (35) transmits the data through port 1022 based on TCP/IP by using the IP packet with IP address set for the communication control unit (55)(S206). With the company C as the destination of the transmitting data, the communication control unit (35) transmits the data through HTTP by using the IP packet with the IP address set for the communication control unit (85)(S206).

Thus, the inter-application data transmitting system of the second embodiment of the present invention allows data to be exchanged among the multiple application intermediary units whose conditions for communication are different from each other. As a result, it is a positive effect of the inter-application data transmitting system of this embodiment that the number of business applications which are interconnected over the network for exchanging data with each other may be increased. Furthermore, according to this embodiment, conditions for communication which are different from each other depending on the utility environment types of the individual business applications may be defined in the communication control rule in the application intermediary unit. This is another positive effect of this embodiment that the conditions for communication is allowed to be set individually or separately.

Further, according to this embodiment, the discussion has been made in the case that the data is transmitted from the company A to the company B and also from the company A to the company C. Of course, however, the data may be transmitted from the company B to the company A and also from the company C to the company A in the same manner as that discussed above. Still, of cause, the data may be exchanged between the company B and the company C in the same manner as aforementioned.

In the case of transmitting the data from the company C to the company B based on HTTP, a program for accepting the reception of data transmitted through HTTP is required to be provided in the communication control unit (55).

As aforementioned, according to this embodiment of the present invention, the communication control rule is allowed to be set adaptively to each pair of the business applications for exchanging data. As the positive effect of the inter-application data exchanging data, therefore, data may be exchanged with each other over the network among conventional business applications which are not allowed conventionally to exchange data over the network due to restricted conditions for communication.

Furthermore, according to this embodiment, the communication control rule may be set separately for each specific business application. It is another positive effect of this embodiment of the present invention, therefore, that the communication control rule may be set on a business application basis even if multiple business applications are to operate on the same computer.

Embodiment 3

A third embodiment of an inter-application data transmitting system of the present invention is now discussed with reference to FIG. 18 and FIG. 19 which is similar to the second embodiment. In this embodiment, the communication control rule include such additional items of definition as communication time and data priority.

The elements of FIG. 18 and FIG. 19 are the same as those discussed in the previous embodiments. As shown in FIG. 18, the inter-application data transmitting system of this embodiment involves the three business application systems including the business application A (21). The business application B (41) and the business application C (81). Specifically, the business application A (21) and the business application B (41) exchange data with each other over the network (11) and the business application A (21) also exchanges the data with the business application C (81) over the network (11) which is similar to the second embodiment.

In this embodiment, it is assumed that the business application A (21) has data to be notified to the business application B (41) and the business application C (81). It is also assumed that the data exchange format to be used for transmitting the data of the business application A (21) to the application intermediary unit B (59) and the data exchange format to be used for transmitting the data to the application intermediary unit C (89) are the same which is similar to the second embodiment.

The contents of the data to be notified to the business application B (41) and the business application C (81) are converted into a data format applicable to the business application B (41) and the business application C (81), respectively, and then transferred to the communication control unit (35) in the same manner as that discussed in the second embodiment. In this embodiment, however, the contents of the data is converted into the data exchange format.

The communication control unit (35) communicates with the communication control unit (55) of the application intermediary unit B (59) and transmits the data to the application intermediary unit B (59) in accordance with the communication control rule (FIG. 24) stored in the communication control rule memory AB (136). The communication control unit (35) also communicates with the communication control unit (85) of the application intermediary unit C (89) and transmits the data to the application intermediary unit C (89) in accordance with the communication control rule (FIG. 25) stored in the communication control rule memory AC (236).

The communication control unit (35), prior to initiating an operation for communicating with the communication control units of the communicating partners, verifies conditions for communication, such as data priority of the transmitting data and communication time for the transmitting data, stored in the communication control rule memory AB (136) and the communication control rule memory AC (236) (S201).

The communication time defines a time for transmitting data from one application to another application. FIG. 24 shows an example of the communication control rule including the communication time defined according to this embodiment.

The data priority defines priority of data to be transmitted from one application to another application. FIG. 24 and FIG. 25 show examples of the communication control rule including the data priority defined according to this embodiment. It is assumed according to this embodiment that Class A is higher in priority than Class B. Data having no set priority is assumed to be the lowest in priority.

Referring to the communication control rule of FIG. 24, for example, the transmission time defines that data is to be transmitted every three minutes between twelve o'clock midnight to seven o'clock in the morning of a day and every one minute in the other periods of the day. In other words, data is to be accumulated for three minutes or one minute until a defined communication time comes so as to transmit accumulated data at each communication time.

The communication control unit (35) is provided with a timer device and a communication priority determination unit, which are not shown in FIG. 19, in order to determine the communication time and the data priority.

The timer device holds time and informs the communication control unit (35) of the communication time which is defined in the communication control rule.

The communication priority determination unit receives the data priority defined in the communication control rule and determines which data transmission request to be assigned a highest priority based on the received data priority if having multiple data transmission requests.

That is a typical and widely used approach for lowing the cost for communication by transmitting data in an accumulated amount. As shown in the communication control rule of FIG. 25, no communication time is defined for transmitting data towards the business application C (81) so that data is to be transmitted immediately after the data is updated for the purpose of requesting corresponding data to be updated in the communicating partner. In accordance with the data priority defined as Class B in the communication control rule, the data is to be transmitted to the business application B (41) prior to the business application C (81), in the case that the communication control unit (35) receives requests for transmitting data to the business application B (41) and the business application C (81) at the same time.

In this manner, the communication control unit (35), prior to establishing the communication channel with the communication control unit of the communicating partner, selects timing for establishing a communication channel by referring to the communication control rules stored in the communication control rule memory AB (136) and the communication control rule memory AC (236).

The communication time and the data priority may be written directly by the user of the business application A (21) as data in the data base A (24). Alternatively, the communication time and the data priority may not be written as data in the data base A (24) but may be added to data by the business program A (23) when reading out the data from the data base A (24). In that case, the communication time and the data priority depend on the business program A (23).

Still alternatively, the communication time and the data priority may be added based on predefined information on communication in the application intermediary unit A (39) when the application control unit A (37) reads out data from the business application A (21).

The communication control unit (35) performs communication control by extracting the communication time and the data priority defined in the communication control rules stored in the communication control rule memory AB (136) and the communication control rule memory AC (236).

The communication control unit (35) requests the network connection unit A (38), when the time comes for establishing the communication channel, to establish the communication channel for communicating with the application intermediary unit (59) or the application intermediary unit (89). When the communication channel has been established, the communication control unit (35) transmits converted data in the data exchange format in accordance with the communication protocol specified in the communication control rule stored in the communication control rule memory AB (136) or the communication control rule memory AC (236).

The converted data in the data exchange format received at the communication control unit (55) in the application intermediary unit B (59) is written into the data base B (44) through the business application B (41) in the same manner as that discussed in the first embodiment. Similarly, the converted data in the data exchange format received at the communication control unit (85) in the application intermediary unit C (89) is written into the data base C (84) through the business application C (81).

An operation of the communication control unit (35) of this embodiment is discussed below in detail. In the following descriptions, a reference numeral SXXX (where XXX designates a numerical value) indicates an operating step in the flow charts of FIG. 12 through FIG. 16.

The application control unit A (37) instructs the communication control unit (35) to initiate an operation for communicating with the communication control unit of the company B (S200).

The communication control unit (35) verifies the communication control rule designed for communicating with the company B stored in the communication control rule memory AB (136)(S201). The communication control unit (35) selects a condition for connecting the network connection unit A (38) with the network connection unit B (58) and, instructs the network connection unit A (38) to connect with the network connection unit B (58) over the network (11) (S201). It is defined between the company A and the company B that data is to be transmitted through port number 1022 based on the communication protocol TCP/IP, and on top of it, the data priority is defined as Class A and the communication time is defined (every three minutes in the period of twelve o'clock midnight to seven o'clock in the morning of a day (0:00 hour to 7:00 hours), and every one minute in the other part of the day (7:00 hours to 0:00 hour). It is assumed that the network connection unit B (58) is connected directly to Internet through a router device.

The network connection unit A (38) and the network connection unit B (58) are connected over the network (11) through the communication channel (S202).

The communication control unit (35) reads out a condition for establishing the communication channel for communicating with the communication control unit (55) in the application intermediary unit B (59) of the company B from the communication control rule memory A (36) and establishes the communication channel (S203). Between the company A and the company B, data is to be transmitted through port number 1022 based on the communication protocol TCP/IP. An IP packet to be transmitted to the company B includes the IP address which is written in the communication control rule. The communication control unit (35) issues a request for establishing the communication channel in compliance with the communication channel set procedure based upon TCP.

The network connection unit B (58) responds to the request by issuing an Acknowledge signal, thereby establishing the communication channel between the communication control unit (35) and the communication control unit (55).

In addition, the data priority for communication between the company A and the company B is set to Class A which is higher than the data priority for communication between the company A and the company C. The communication time is set to the three-minute based communication in the period from twelve o'clock midnight to seven o'clock in the morning of a day (0:00 hour to 7:00 hours) and the one-minute based communication in the other part of the day (7:00 hours to 0:00 hour). The communication time and the data priority are set, respectively, in the timer device and the communication priority determination unit which are provided in the communication control unit (35).

The communication control unit (35) verifies the establishment of the communication channel for communicating with the communication control unit (55) (upon reception of the TCP Ack signal)(S204). The communication control unit (35) notifies the application control unit A (37) of the enable status for transmitting data to the communication control unit (55) of the company B (S204).

The application control unit A (37) instructs the data format conversion unit (33) to transfer the converted data in the data exchange format to the communication control unit (35)(S205).

Thereafter, the communication control unit (35) asks the application control unit A (37) if there is any data to be transmitted to the company B at each set communication time. In the case of having data to be transmitted to the company B, the application control unit A (37) instructs the data format conversion unit (33) to transfer the transmitting data to the communication control unit (35). The application control unit A (37) also instructs the communication control unit (35) that the data is to be transmitted to the company B (S206). The communication control unit (35) transmits the data, because the data is to be transmitted to the company B, by using port number 1022 based on TCP/IP in accordance with the communication control rule stored in the communication control rule memory AB (136) and setting the address of the IP packet to the communication control unit (55) of the company B. In this case, because the data priority for transmitting the data to the company B is set to Class A, and the data priority for transmission of the company C is set to Class B, if there is also data to be transmitted to the company C, an operation for transmitting the data to the company B is initiated prior to an operation for transmitting the data to the company C.

Thus, the communication control unit (35) and the descriptions of the communication control rule of the inter-application data transmitting system of this embodiment allows data to be transmitted by specifying the transmission time or communication time based on the data priority being set.

As aforementioned, according to this embodiment, the communication control rules are stored in the communication control rule memory AB (136) and the communication control rule memory AC (236). Alternatively, however, the communication control rule memory AB (136) may be employed alone in the case that data is to be exchanged only between the business application A (21) and the business application B (41).

Still alternatively, a single unit of a communication control rule memory ABC may be employed to store the communication control rule to be shared if the communication control rule is applied commonly to the business application B (41) and the business application C (81).

Furthermore, in the case of exchanging data among a larger number of business applications interconnected over the network, three or more sets of the communication control rules may be employed.

Still further, in this embodiment, the single set of the communication control rule is stored in the single unit of the communication control rule memory. Alternatively, however, multiple sets of the communication control rules may be stored in the single unit of the communication control rule memory as shown in the example of FIG. 8.

As an effect of the inter-application data transmitting system of this embodiment of the present invention, the communication protocol and the condition for communication to be used for passing through the fire wall may be set on a business application basis.

Embodiment 4

A fourth embodiment of the present invention is now discussed with reference to FIG. 18 and FIG. 19.

It is a feature of this embodiment that an authentication system to be used for authenticating the application intermediary unit of a communicating partner to which data is to be transmitted and a cryptographic system to be applied to enciphering data to be transmitted are additionally set as the communication control rule. The system configuration of the inter-application data transmitting system of this embodiment is assumed to be the same as the system configuration of the inter-application data transmitting system discussed in the third embodiment.

In the case that the contents of data of the business application A (21) is to be notified to the business application B (41) and the business application C (81), the data format of the data is converted into data exchange formats applicable to the business application B (41) and the business application C (81), respectively, although the same data exchange format is used in this embodiment for transmitting data to be exchanged among the business application systems. Then, the converted data is transferred to the communication control unit (35) through the same procedures as those discussed in the third embodiment.

The communication control unit (35) selects an authentication system to be used for communicating with the communication control unit (55) of the communicating partner and a cryptographic system to be applied to the data to be exchanged in the communication from the contents of the communication control rule memory AB (136) and then transmits the data based on the selected authentication system and the cryptographic system. Similarly, the communication control unit (35) selects an authentication system to be used for communicating with the communication control unit (85) of the communicating partner and a cryptographic system to be applied to the data to be exchanged in the communication from the contents of the communication control rule memory AC (236) and then transmits the data based on the selected authentication system and the cryptographic system.

The authentication system is used for authenticating the application intermediary unit of the communicating partner to which data is to be transmitted in communication between one application and another application. FIG. 26 shows an example of the communication control rule which defines an authentication system.

The cryptographic system defines that enciphered data is to be transmitted in communication between one application and another application. FIG. 26 and FIG. 27 show examples of the communication control rules defining different types of the cryptographic system.

The communication control unit (35) requests the network connection unit A (38) to establish communication channels for connecting the network connection unit A (38) with the respective communication control units of the communicating partners. The network connection unit A (38) establishes a communication channel with the network connection unit B (58) for the application intermediary unit B (59) and a communication channel with the network connection unit C (88) for the application intermediary unit C (89).

The communication control unit (35) in the application intermediary unit A (39) authenticates the communication control unit (55) and the communication control unit (85) of the communicating partners based on the respective authentication systems stored in the communication control rule memory AB (136) and the communication control rule memory AC (236) through the established communication channels. In this embodiment, however, the communication control rule memory AC (236) has no authentication system defined as shown in FIG. 27.

For example, authentication systems include a type of authentication in which identification numbers and passwords are exchanged with each other among the communicating partners and a type of authentication which uses the art of public key for authentication.

Cryptographic systems include a type of cryptography which uses a common key in a predetermined bit length (e.g., a 128-bit length) and a type of cryptography which uses a public key in a predetermined bit length (e.g., a 128-bit length).

Those systems of authentication and cryptography mentioned above are examples which do not limit the authentication system and the cryptographic system which is applicable to this embodiment.

An operation for transmitting data from the communication control unit (35) of the company A to the company B is now discussed in detail. In the following descriptions, a reference numeral SXXX (where XXX designates a numerical value) indicates an operating step in the flow charts of FIG. 9 through FIG. 16.

The application control unit A (37) instructs the communication control unit (35) to initiate an operation for communicating with the communication control unit of the company B (S200).

The communication control unit (35) verifies the communication control rule to be used for communicating with the company B stored in the communication control rule memory AB (136)(S201). The communication control unit (35) selects a condition for connecting the network connection unit A (38) with the network connection unit B (58) and instructs the network connection unit A (38) to connect with the network connection unit B (58) over the network (11) (S201).

Specifically, in addition to that data is to be transmitted between the company A and the company B through port number 1022 based on the communication protocol TCP/IP, it is also prescribed that data is to be transmitted by means of cryptography based on a cryptographic system called SecPat1 and mutual authentication based on an authentication system called ID1 The cryptographic system and the authentication system are executed and set through procedures described later in a step S203. I is assumed that the network connection unit B is also connected directly to Internet through a router device.

The network connection unit A (38) and the network connection unit B (58) are connected through the communication channel over the network (11)(S202).

The communication control unit (35) reads out a condition for establishing a communication channel for communicating with the communication control unit (55) in the application intermediary unit B (59) of the company B from the communication control rule memory AB (136)(S203) and establishes the communication channel between the company A and the company B. Data is to be transmitted between the company A and the company B through port number 1022 based on TCP/IP. An IP packet to be transmitted to the company B includes an IP address which is written in the communication control rule. The communication control unit (35) issues a request for establishing a communication channel in accordance with the communication channel set procedure based on TCP. The network connection unit B (58) responds to the request by issuing an Acknowledge signal, thereby establishing the communication channel between the communication control unit (35) and the communication control unit (55). A series of those operations are the same as those described in the first embodiment.

The communication control unit (35) verifies the establishment of the communication channel with the communication control unit (55)(upon reception of the TCP Ack signal)(S204). On top of it, the communication control unit (35) of the company A and the communication control unit (55) of the company B authenticate each other by means of their authenticators so that they are prepared for enciphering data to be transmitted (S204). More particularly, bi-directional authentication based on a public key called SSL (Secure Sockets Layer) cryptography are assumed to be used between the company A and the company B. In other words, it is assumed that SecPat1 is the public key based cryptographic system which matches the SSL, and ID1 is also the authenticator based authentication system which matches the public key based SSL. Then, if the company A and the company B execute procedures over TCP for communicating with each other based on the SSL and exchange their authenticators including their public keys with each other, thereby allowing the companies to recognize the company as the expecting communicating partner (authentication). In addition to that, the cryptographic key to be used for cryptography can be read out from the authenticator of the communicating partner. Then, this allows the system to encipher the transmitting data.

The communication control unit (35) executes procedures to be used for authentication and stores received authenticator of the company B in itself. Then, the communication control unit (35) notifies the application control unit A (37) of an enable status of communicating with the communication control unit (55) of the company B.

The application control unit A (37) instructs the data format conversion unit (33) to transfer converted data in the data exchange format to the communication control unit (35)(S205).

Thereafter, when receiving a request for transmitting data to the company B from the application control unit A (37), the communication control unit (35) enciphers the data to be transmitted to the company B based on the public key of the company B written in the authenticator of the company B and then transmits the data to the company B in accordance with the public key based cryptographic system (S205).

An operation for receiving data of the communication control unit (55) is discussed below.

The network connection unit B (58) receives the notification from the communication control unit (55) that the data has been received (S300). In the case that the network connection unit B (58) is connected directly with Internet through a router device, this particular operation is not required.

The communication control unit (55) verifies the communication control rule stored in the communication control rule memory and then accepts the establishment of the communication channel based on TCP/IP between the communication control unit (35) and the communication control unit (55)(by issuing an Ack signal in response)(S301). Specifically, a receiving IP packet includes the IP address identifying that the data is transmitted by the company A. The company B verifies the communication control rule stored in the commination control rule memory to determine that the establishment of the communication channel with Company A be accepted through port 1022 based on TCP/IP, and responds by issuing an Ack signal indicating the acceptance of the establishment over TCP. Subsequently, the communication control unit (55) exchanges the authenticators with the company A through the bi-directional authentication and the public key based cryptography based on SSL. In this manner, the company A and the company B verify the communicating partners each other (authentication). The communication control unit (55) stores the received authenticator of the company A in itself.

The communication control unit (55) notifies the application control unit B (57) that the data has received from the communication control unit (35)(through TCP/IP) and that the communication channel has been established (S302).

The application control unit B (57) instructs the communication control unit (55) to transfer receiving data thereafter to the data format conversion unit (53). The application control unit B (57) also instructs the data format conversion unit (53) to convert the data format of the transferred data into the application dependent data format applicable to the business program B (43) in accordance with the data format inversion rule stored in the data format conversion rule memory B (54)(S303).

Specifically, the communication control unit (55) receives enciphered data to be notified. The communication control unit (55) deciphers the received enciphered data by means of a Private key of its own and transfers a deciphered result to the data format conversion unit (53)(S304). The data format conversion unit (53) converts the data format of the received deciphered data into the application dependent data format applicable to the business application B (41) based on the data format inversion rule stored in the data format conversion rule memory B (54)(S304).

An operation for transmitting data by the communication control unit (35) of the company A to the company C is discussed below.

The application control unit A (37) instructs the communication control unit (35) to initiate an operation for communicating with the communication control unit (85) of the company C (S200).

The communication control unit (35) verifies the communication control rule to be used for communicating with the company C stored in the communication control rule memory AC (236)(S201). The communication control unit (35) selects a condition for connecting the network connection unit A (38) with the network connection unit C. Then, the communication control unit (35) instructs the network connection unit A (38) to connect with the network connection unit C (88) over the network (11)(S201).

Data is to be transmitted between the company A and the company C through port number 2022 based on the communication protocol TCP/IP. In addition to that, data is enciphered through the common key based cryptographic system SecPat2 and access is authenticated based on Login name and Password. The cryptography and authentication are executed and established through later discussed procedures in a step S203. It is assumed that the network connection unit C (88) is directly connected with Internet through a router device.

The network connection unit A (38) is connected with the network connection unit C (88) over the network (11) through the communication channel (S202).

Specifically, the communication control unit (35) reads out a condition to be used for establishing the communication channel for connecting with the communication control unit (85) of the application intermediary unit C (89) of the company C from the communication control rule memory AC (236) and set the communication channel (S203). Specifically, data is to be transmitted through port number 2022 based on TCP/IP between the company A and the company C. An IP packet to be transmitted to the company C includes an IP address written in the communication control rule. The communication control unit (35) issues a request for establishing the communication channel in accordance with the communication channel set procedure based on TCP.

The network connection unit C (88) responds to the request by issuing an Acknowledge signal, thereby establishing the communication channel between the communication control unit (35) and the communication control unit (85) in the same manner as that discussed in the first embodiment.

In addition to that, in data communication between the company A and the company C, the communication partners are to be authenticated based on Login name and Password and the data is be enciphered by means of the common key based cryptographic system SecPat2 (assuming that SecPat2 exists as a cryptographic system).

Upon establishment of the TCP communication channel, the communication control unit (85) of the company C sends a signal to the communication control unit (35) for requesting the Login name and Password. The communication control unit (35) sends the Login name and Password written in the communication control rule memory (36) in response to the communication control unit (85) of the company C. Then, the communication control unit (35) waits for a signal of verified authentication in response to the supplying Login name and Password.

The communication control unit (35) verifies the establishment of the communication channel with the communication control unit (85)(upon reception of the signal of verified authentication in response through TCP)(S204). The communication control unit (35) informs the application control unit A (37) of its enable status for communicating with the communication control unit (85) of the company C (S204).

The application control unit A (37) instructs the data format conversion unit (33) to transfer the converted data in the data exchange format to the communication control unit (35) (S205).

Thereafter, the company A enciphers data to be transmitted to the company C by means of the Common Key based SecPat2 cryptographic system in the communication control unit (35)(S205).

An operation of the communication control unit (89) of the company C is discussed below in detail.

Data arrives at the network connection unit C (88). The arrival of the data is notified to the communication control unit (85)(S300). In the case that the network connection unit C is connected directly with Internet through a router device, this operation is not required in particular.

The communication control unit (85) verifies the commination control rule stored in the communication control rule memory and accepts the establishment of the communication channel based on TCP/IP between the communication control unit (35) and the communication control unit (85)(by issuing an Ack signal for response)(S301). More specifically, the receiving IP packet includes the IP address indicating that the data is transmitted by the company A. The company C verifies the communication control rule stored in the communication control rule memory and determines that the establishment of the commination channel through port 2022 based on TCP/IP with the company A is to be accepted. The company C then issues an Ack signal for identifying the acceptance of the establishment of TCP in response. Subsequently, the communication control unit (85) transmits a request for the transmission of the Login name and Password to the communication control unit (35). Upon reception of the Login name and Password, the communication control unit (85) verifies that the received Login name and Password are acceptable. This terminates the operation of authentication performed by the communication control unit (85).

Subsequently, the communication control unit (85) notifies the application control unit C of the reception of data from the communication control unit (35)(through TCP/IP) and of the establishment of the communication channel (S302).

The application control unit C instructs the communication control unit (85) to transfer receiving data thereafter to the data format conversion unit. The application control unit C (87) also instructs the data format conversion unit to convert the data format of receiving data into the application dependent data format applicable to the business program C in accordance with the data format inversion rule stored in the data format conversion rule memory C (S303).

The communication control unit (85) receives enciphered data to be notified (S304). The communication control unit (85) deciphers the enciphered data by means of the Common Key which has been predetermined and stored in the communication control rule memory C (S304). The communication control unit (85) transfers a deciphered result to the data format conversion unit (S304). The data format conversion unit of the application intermediary unit C (89) converts the data format of the received data into the application dependent data format applicable to the business application C (81) by applying the data format inversion rule stored in the data format conversion rule memory C (S304).

As aforementioned, it is an effective feature of the inter-application data transmitting system of this embodiment that the authentication system and the cryptographic system for securing safe transmission of data can be applied individually to the business applications to which data is to be exchanged over the network (11), thereby data can be exchanged between business applications in line with the type of utility.

Further, according to this embodiment, after the communicating partner is authenticated and the cryptographic system is determined, the communication control unit (35) exchanges data with the communication control unit (55) and the communication control unit (85) of the communicating partners and then transmits the data towards the counterpart units. Upon reception of the data, the communication control unit (55) of the application intermediary unit B (59) and the communication control unit (85) of the application intermediary unit C (89) each write the received data in the data base B (44) and the data base C (84), respectively, through the business application B (41) and the business application C (81) in the same procedures as those discussed in the second embodiment and the third embodiment. Thereafter, the data becomes their own data applicable to be used by the respective business applications.

As an effect of the inter-application data transmitting system of this embodiment of the present invention, the communication protocol and the condition for communication to be used for passing through the fire wall may be set on a business application basis.

Embodiment 5

A fifth embodiment of an inter-application data transmitting system of the present invention is now discussed with reference to FIG. 1 and FIG. 2. It is a feature of the inter-application data transmitting system of this embodiment that the application control unit of the application intermediary unit, upon reception of the notification of data being updated from the business application, initiates an operation for updating the corresponding data of the business application of a communicating partner business application system. According to this embodiment, it is assumed that the business application detects a processing request status and then notifies the application control unit of the application intermediary unit of a detected processing request status.

It is assumed in this embodiment that a user of the user interface A (20) updates the contents of data stored in the data base A (24) in the business application A (21) and consequently the contents of the corresponding data stored in the data base B (44) in the business application B (41) is to be updated, which is similar to that discussed in the first embodiment.

Specifically, the following situations are similar to those of the first embodiment. The user updates the contents of data stored in the data base A (24). Then, the business program A (23) updates the data of the data base A (24) and notifies the application intermediary unit A (39) of the occurrence of an event of updating data. There may be business applications which are provided with a function of determining whether or not the occurrence of the event of updating data corresponds to the processing request status and business applications which are not provided with such a function. In the case that the business application is not provided with such a function, the application control unit A (37), upon reception of the notification of the event of updating data, determines whether the occurrence of the event of updating the data corresponds to the processing request status. Alternatively, however, another approach may be used for determining the application of the processing request status to the event of updating data.

It is also possible to notify the area and data value of the data being updated together with the fact that the data has been updated in addition to the notification of the occurrence of the event of updating data. The notification of the occurrence of the event of updating data is transmitted to the application interface A (30) by using the communication protocol A (22) and then to the application control unit A (37). Thus, it is the characteristic of this embodiment that the timing of updating data is notified from the communication protocol A (22) to the application control unit A (37) through the application interface A (30).

The application interface A (30) and the application control unit A (37), in the case that the fact of the data being updated alone is notified or that an updated value is not notified but an updated data area is notified, reads out the data to be notified to the business applications of the communicating partners from the data base A (24) in accordance with the control of the application control unit A (37) in the same manner as that discussed in the first embodiment. The application control unit A (37) verifies that the readout data has been updated and then initiates an operation for transmitting the readout data to the business application B (41) in the same manner as that discussed in the first embodiment.

In the case that the value of the updated data is additionally notified to the application control unit A (37) through the application interface A (30), the application control unit A (37) initiates an operation for transmitting the contents of the updated data to the business application B (41). A subsequent series of operations are performed in the same manner as those discussed in the first embodiment and therefore will not be discussed here.

According to the fifth embodiment, in the business application system A, the application, i.e., the business program A (23) in this embodiment, is required to be changed for notifying the application intermediary unit A (39) of the update timing of data when the data is actually updated, and in addition, for notifying of the updated data area and the new data value of the updated data. However, according to this embodiment, the update timing of the data is notified to the application intermediary unit A (39) by the business application A (21), which provides almost a real-time detection of the occurrence of the event of updating data immediately after the data is actually updated. That is faster than the application intermediary unit A (39) detects the occurrence of the event of updating the data of the business application A (21).

Furthermore, according to this embodiment, in the case that such updated data information, such as data area and data value, itself is not notified from the business application A (21), an additional memory is required for storing previous data in the access procedure control unit (31) of the application intermediary unit A (39) or in the application control unit A (37) in order to verify the occurrence of the event of updating data. The additional memory is used to store the contents of previous data to be compared with the contents of currently notified data to detect the occurrence of the event of updating data. However, as a positive effect of this embodiment, in the case that the updated data information itself is notified from the business application A (21), then the additional memory is not required.

Thus, as an effect of the inter-application data transmitting system of this embodiment of the present invention, the throughput and the storage size of the application intermediary unit may be reduced.

As aforementioned, the inter-application data transmitting system of this embodiment requires the change of the business application, whereas the inter-application data transmitting system of the first embodiment does not require the change of business application. Both types of the inter-application data transmitting system may be available for selection to be used for the user's convenience of the business applications. This allows a larger number of business applications can be interconnected over the network to exchange data as a positive effect of this embodiment.

Embodiment 6

A sixth embodiment of the present invention introduces an inter-application data transmitting system in which a mobile agent is used for exchanging data among the communication control unit (35) of the application intermediary unit A (39), the communication control unit (55) of the application intermediary unit B (59) and the communication control unit (85) of the application intermediary unit C (89).

Figure 28:
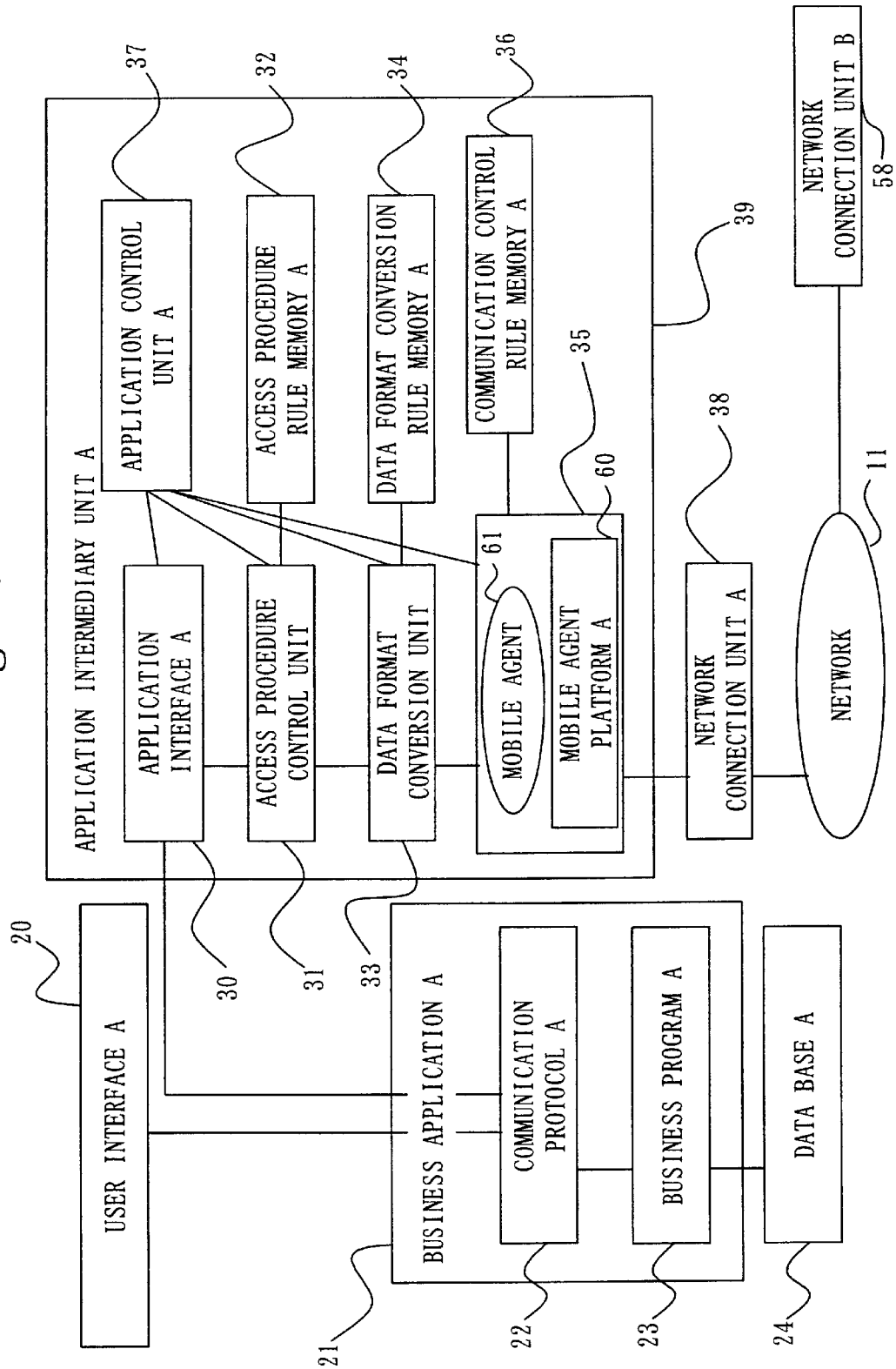
FIG. 28 shows a block diagram of an inter-application data transmitting system according to a sixth embodiment and a seventh embodiment of the present invention illustrating an application intermediary unit of the business application system A including a communication control unit which is provided with a mobile agent platform.

FIG. 28 shows a block diagram of the inter-application data transmitting system of this embodiment illustrating the configuration of the application intermediary unit A (39) in the case that the communication control unit (35) transmits data by means of the mobile agent in the business application system A.

Figure 29:
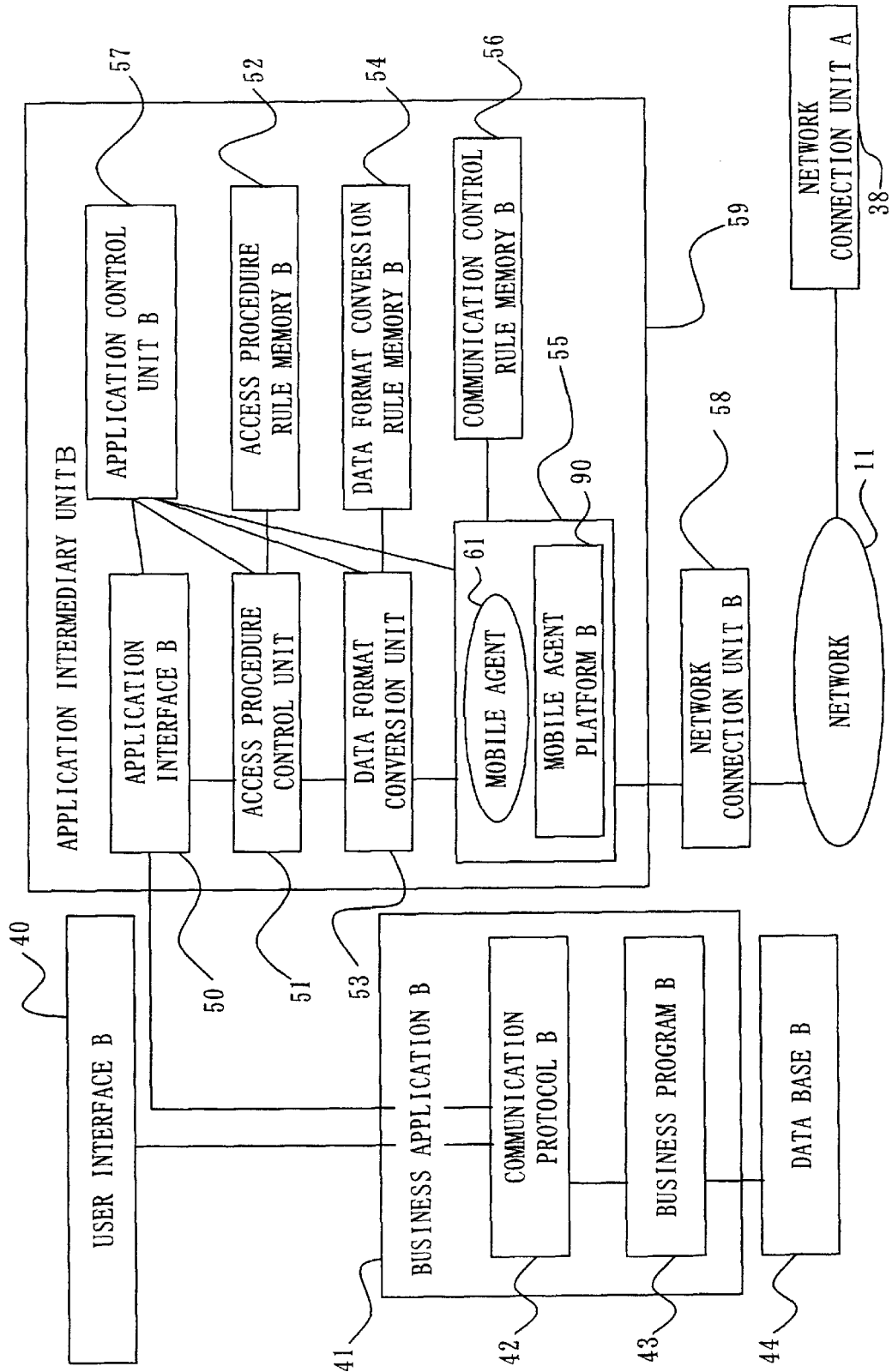
FIG. 29 shows a block diagram of the inter-application data transmitting system according to the sixth and seventh embodiments illustrating an application intermediary unit of the business application system B including a communication control unit which is provided with a mobile agent platform.

FIG. 29 shows a block diagram of the inter-application data transmitting system of this embodiment illustrating the configuration of the application intermediary unit B (59) in the case that the communication control unit (55) transmits data by means of the mobile agent in the business application system B.

Referring now to FIG. 28, a reference numeral 60 denotes a mobile agent platform A which provides the mobile agent with an instruction about destination and with an execution environment in which the mobile agent can move, which will be referred to hereinafter as the "agent execution environment". A reference numeral 61 denotes the mobile agent which moves from one mobile agent platform to another mobile agent platform carrying or delivering converted data in the data exchange format and an execution program. The mobile agent 61 moves from one unit to another among multiple communication control units.

Referring now to FIG. 29, a reference numeral 90 denotes a mobile agent platform B which provides the mobile agent with an instruction about destination and with the agent execution environment. The mobile agent 61 is the same as that of FIG. 28. The mobile agent 61 is a software moving with the data and the execution program between the mobile agent platform A 60 and the mobile agent platform B 90. Elements of FIG. 28 and FIG. 29 sharing reference numerals with the corresponding elements of FIG. 1, and FIG. 2, respectively, are assumed to are the same in function as those discussed in the first embodiment.

An operation of the inter-application data transmitting system of this embodiment is now discussed with reference to FIG. 28 and FIG. 29 based on the communication control rule of FIG. 30.

First, referring to FIG. 28, the contents of data to be notified to the business application B (41) are converted into the data exchange format and then transferred to the communication control unit (35) in the same manner as that discussed in the first embodiment.

Then, the communication control unit (35) writes the received data as data to be conveyed by the mobile agent (61). At the same time, the communication control unit (35) sets a port number for passing through a fire wall, a time for transmitting the mobile agent, a password for authentication and the like, as required, in the mobile agent (61) or the mobile agent platform A (60) based on the communication protocol written in the communication control rule of FIG. 30, for example, stored in the communication control rule memory A (36).

In addition to that, in the case that a cryptographic system has been determined in the communication control rule, the mobile agent platform (60) enciphers data to be conveyed by the mobile agent (61) to generate the mobile agent. Then, the mobile agent platform (60) requests the network connection unit A (38) to establish a communication channel.

When the network connection unit A (38) establishes the communication channel for communicating with the network connection unit B (58) of the communicating partner, the communication control unit (35) and the communication control unit (55) verify each other the communication channel between the mobile agent platform A (60) and the mobile agent platform B (90). The mobile agent platform B (90) verifies the transmitting source of the data so as to receive no unintended mobile agent through authentication, for example, of the mobile agent platform A (60).

The method for authenticating the mobile agent platform of the communicating partner which is written in the communication control rule stored in the communication control rule memory B (56) is informed previously by the communication control unit (55) to the mobile agent platform B (90).

The mobile agent platforms of the communicating partners authenticate each other. If it is verified that the mobile agent (61) is moving from the intended mobile agent platform to the intended destination mobile agent platform, the mobile agent (61) moves from the communication control unit (35) to the communication control unit (55) with the data.

The mobile agent (61) is received by the communication control unit (55) of the application intermediary unit B (59) of FIG. 29. The communication control unit (55) reads out and transfers the conveyed data by the mobile agent (61) to the data format conversion unit (53). With enciphered data, the mobile agent platform B (90) deciphers the enciphered data through the cryptographic system written in the communication control rule stored in the communication control rule memory B (56). Then, the deciphered data is transferred to the data format conversion unit (53) from the communication control unit (55).

A subsequent series of operations are performed in the same manner as those discussed in the first embodiment. Received data is written into the data base B (44) through the application intermediary unit B (59) and the business application B (41).

The inter-appellation data transmitting system of this embodiment uses the mobile agent for transmitting data, and therefore, the function and facility of the mobile agent platform can be utilized. Specifically, the mobile agent platform includes a function for enciphering data to be conveyed by the mobile agent, a function for authenticating the transmitting source of the mobile agent and the destination of the mobile agent each other prior to the transmission of the mobile agent, and a function for queuing the mobile agent for securing the transmission of the mobile agent. The mobile agent queuing function is provided for a communication protocol including a procedure called "two-phase commit" or for a mobile agent re-send request caused by a possible bit error in communication. For that reason, it is a positive effect of this embodiment that the system configuration may be shared with other applications which use the mobile agent.

The mobile agent can move within the network serially delivering data and program from one mobile agent platform to another, which allows data to be transmitted in a serial manner to business applications having mobile agent platforms within the network. In this respect, it is another positive effect of this embodiment that the work load of the application intermediary unit A (39) as the updating source of the data can be reduced.

An operation of the communication control unit of this embodiment is discussed below in detail with reference to the flow charts of FIG. 12 through FIG. 16. The discussion will be made below with reference to an example of the communication control rule of FIG. 30. In the descriptions, a reference numeral SXXX (where XXX denotes a numerical value) indicates an operating step in the flow charts of FIG. 12 through FIG. 16.

The application control unit A (37) instructs the communication control unit (35) to initiate an operation for communicating with the communication control unit (55) of the company B (S200).

The communication control unit (35) verifies the communication control rule stored in the communication control rule memory A (36) to be used for communicating with the company B (S201). The communication control unit (35) selects a condition for connecting the network connection unit A (38) and the network connection unit B (58) and instructs the network connection unit A (38) to connect with the network connection unit B (58) over the network (11) (S201). Specifically, between the company A and the company B, data is to be transmitted by means of the mobile agent conveying the data. As a communication protocol to be used between the company A and the company B, a system which is employed by a mobile agent system is used. This communication protocol is called here a communication protocol JR (assuming that JR exists as a communication protocol) which is assumed to be in an upper layer than the communication protocol TCP/IP. It is also assumed that the network connection unit B (58) connected directly to Internet through a router device.

The network connection unit A (38) and the network connection unit B (58) are connected over the network (11) through the communication channel (S202).

The communication control unit (35) reads out a condition for establishing the communication channel for communicating with the communication control unit (55) of the application intermediary unit B (59) of the company B from the communication control rule memory A (36) and establishes the communication channel (S203).

At this stage, it is identified that data is to be exchanged with the company B by means of the mobile agent.

The mobile agent platform A (60) initiates an operation for communicating with the mobile agent platform B (90) of the company B based on the communication protocol TCP/IP. The mobile agent platform A (60) then verifies that the communication control unit (55) of the communicating partner is provided with the mobile agent platform B (90) which has been executed and prepared for receiving the mobile agent (S203).

The mobile agent platform includes SecPat2 of the cryptographic system and ID2 of the authentication system which are written and stored in the communication control rule memory A (36). Prior to moving the mobile agent (61), the respective mobile agent platforms of the communicating partners encipher the authenticators of their own by means of the Private keys of their own, and exchange the enciphered authenticators with each other. Then, upon receipt of the authenticator of the communicating partner, the respective mobile agent platforms each decipher a received enciphered authenticator by means of the Public Key of the communicating partner, thereby authenticating the communicating partner.

The communication control unit (35) verifies the establishment of the communication channel for communicating with the communication control unit (55). (The verification is performed on both sides of the communicating partners by the mobile agent platforms to verify and authenticate the communicating partner.) Subsequently, the communication control unit (35) notifies the application control unit A (37) of the enable status of communicating with the communication control unit (55) of the company B (S204).

The applications control unit A (37) instructs the data format conversion unit (33) to transfer the converted data in the data exchange format to the communication control unit (35)(S205).

Thereafter, the company A transfers the data to be transmitted to the company B to the mobile agent (61) and then moves the mobile agent (61). The mobile agent platform A (60) enciphers the data to be transmitted by the mobile agent (61) including the notifying data by means of the Public Key of the company B.

Now, an operation of the communication control unit (55) of the company B is discussed.

The mobile agent (61) arrives at the network connection unit B (58). The reception of the mobile agent (61) is notified to the communication control unit (55)(S300). In the case that the network connection unit is connected directly to Internet through a router device, this specific operation is not required.

The communication control unit (55) refers to the communication control rule memory B (56) and verifies that the mobile agent (61) is used in data communication between the communication control unit (35) and the communication control unit (55). It is also verified that Java RMI is used as a communication protocol over TCP/IP (S301). At this stage, the communication control unit (55) accepts the establishment of the communication channel through TCP/IP (by issuing an Ack signal in response)(S301). Specifically, a receiving IP packet includes an IP address written identifying that the data is transmitted from the company A. The company B refers to the communication control rule memory B (56) and determines that the establishment of the communication channel through TCP/IP (Port 1022) from the company A is to be accepted. Then, the communication control unit (55) issues an Ack signal identifying the acceptance of the establishment of the communication channel through TCP.

The mobile agent platform A (60) in the communication control unit (35) of the company A and the mobile agent platform B (90) in the communication control unit (55) of the company B each include SecPat2 of the cryptographic system and ID2 of the authentication system. Prior to moving the mobile agent (61), the mobile agent platform A (60) and the mobile agent platform B (90) each encipher the authenticator of the self by means of the Private Key of the self and exchange the enciphered authenticator with each other. Upon reception of the enciphered authorizations being exchanged, the mobile agent platform A (60) and the mobile agent platform B (90) each decipher the received enciphered authenticator by means of the Public Key of the communicating partner, thereby authenticating the communicating partners each other.

The communication control unit (55) notifies the application control unit B (57) that the data has been received (through TCP/IP) from the communication control unit (35), that the communication channel has been established, and that the mobile agent platforms have verified and authenticated the communicating partners each other so that the reception of the data (S302) is now enabled.

The application control unit B (57) instructs the communication control unit (55) to transfer receiving data thereafter to the data format conversion unit (53) and instructs the data format conversion unit (53) to invert the data format of the receiving data into the application dependent data format applicable to the business program B (43) in accordance with the table of the data format inversion rule stored in the data format conversion rule memory B (54)(S303).

The communication control unit (55) receives the enciphered notifying data (S304). The communication control unit (55) deciphers the received enciphered data by means of the Private Key of the self, and transmits a deciphered result of the data to the data format conversion unit (53)(S304). The data format conversion unit (53) converts the data format of the received deciphered data into the application dependent data format applicable to the business application B (41) in accordance with the data format inversion rule stored in the data format conversion rule memory B (54).

As aforementioned, the inter-application data transmitting system of this embodiment is provided with the communication control unit having the function of the mobile agent platform. It is a positive effect of this embodiment that the function of the mobile agent platform may be used. In addition to that, this embodiment allows for ease in adding a network route selecting function for effectively delivering data. The network route selecting function selects an effective route in data transmission with less traffic or an effective line in which a communication band is not fully occupied by transmitting data depending on the situation of communication traffic within the network.

As aforementioned, according to the inter-application data transmitting system of this embodiment, the business application can select the function of the communication control unit in compliance with the configuration of the application intermediary unit of the communication partner with which data is to be exchanged. In addition to that, it becomes easy to add further business applications with which data is to be exchanged.

Embodiment 7

A seventh embodiment of the present invention introduces an inter-application data transmitting system in which data is transmitted in a serial manner by means of the mobile agent in the case that the communication control unit uses the mobile agent for data transmission as discussed in the sixth embodiment of the present invention. The inter-application data transmitting system of this embodiment, in which data is exchanged among multiple, e.g., three business applications here, is discussed with reference to FIG. 18, FIG. 28, FIG. 29, and FIG. 31.

As shown in FIG. 18, three business applications, namely, the business application A (21), the business application B (41), and the business application C (81), are assumed to be interconnected over the network through the respective application intermediary units A, B and C (39, 59, 89) and the respective network connection units A, B and C (38, 58, 88).

Figure 31:
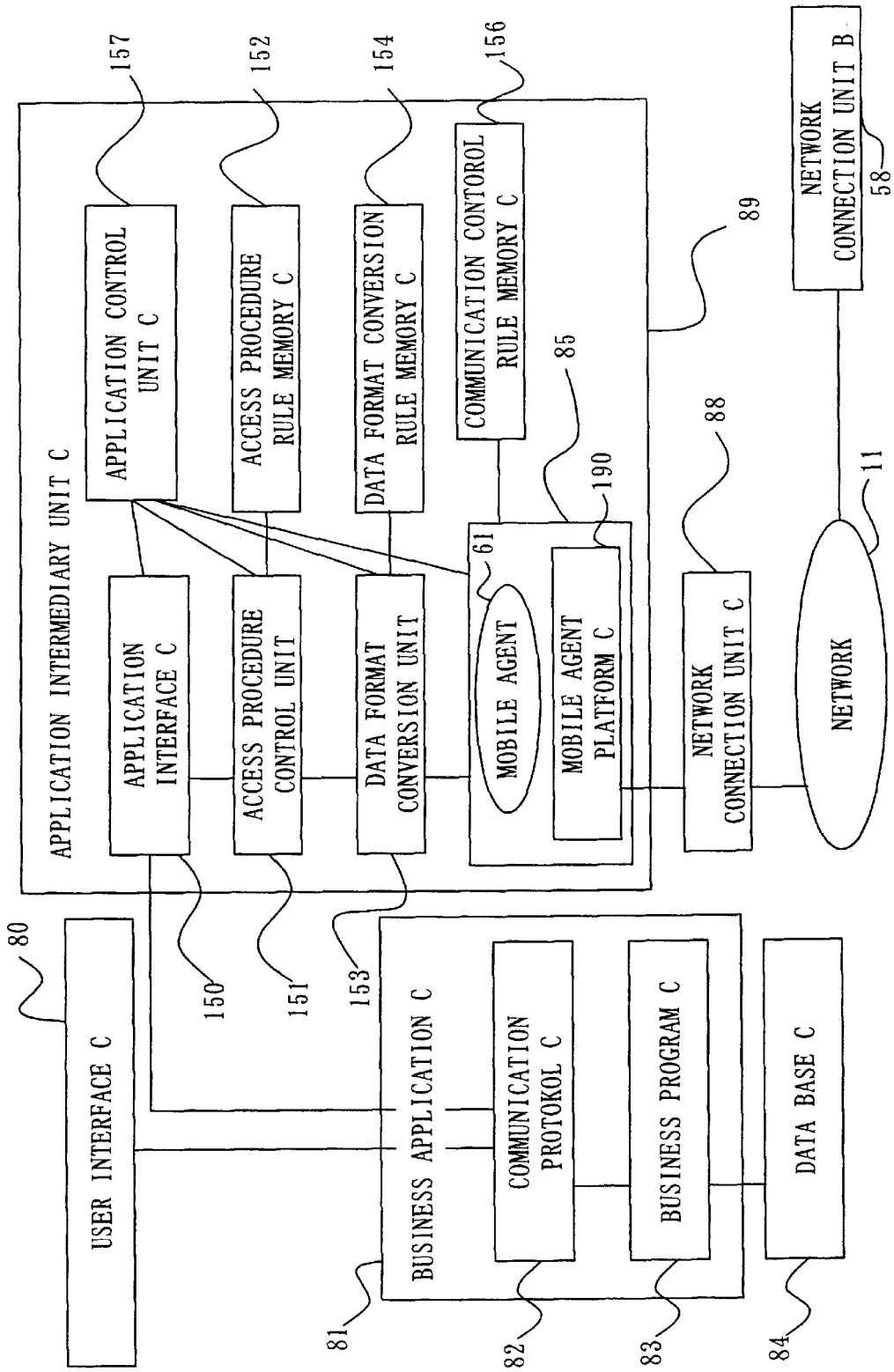
FIG. 31 shows a block diagram of the inter-application data transmitting system according to the sixth and seventh embodiments illustrating an application intermediary of a business application system C including a communication control unit which is provided with a mobile agent platform.

FIG. 31 shows a block diagram of the inter-application data transmitting system of this embodiment illustrating the configuration of a business application system C including the business application C. Referring now to FIG. 31, a reference numeral 82 denotes a communication protocol C of the business application C (81). A reference numeral 83 denotes a business program C of the business application C (81).

A reference numeral 150 denotes an application interface C of the application intermediary unit C (89). A reference numeral 151 denotes an access procedure control unit of the application intermediary unit C (89). A reference numeral 152 denotes an access procedure rule memory C which stores the access procedure rule to be used by the access procedure control unit (151). A reference numeral 153 denotes a data format conversion unit. A reference numeral 154 denotes a data format conversion rule memory C. A reference numeral 156 denotes a communication control rule memory C. A reference numeral 157 denotes an application control unit C. Those elements of the application intermediary unit C (89) identified above are the same in function as the corresponding elements of the application intermediary unit A (39) and the application intermediary unit B (59).

A reference numeral 190 denotes a mobile agent platform C. The mobile agent platform C (190) is a platform software which can move and execute the mobile agent (61) in the same manner as that discussed with reference to the mobile agent platform A (60) and the mobile agent platform B (90).

It is assumed that the communication control units of the application intermediary units shown in the FIG. 18, FIG. 28, FIG. 29 and FIG. 31 each are provided with the mobile agent platform. In addition to that, it is also assumed that the mobile agent platform is provided with software for allowing the mobile agent to move from one mobile agent platform to another among multiple mobile agent platforms.

Now, it is assumed that the business application A (21) has the event of updating data, and consequently, the contents of the updated data is to be transmitted to the business application B (41) and the business application C (81). It is also assumed in this embodiment that the same data exchange format is used for transmitting the data of the business application A (21) to the business application B (41) and to the business application C (81) in the similar manner to that discussed in the third embodiment.

Now, the mobile agent (61) first delivers the updated data to the application intermediary unit B (59). Then, the mobile agent (61) moves sequentially from the application intermediary unit B (59) to the application intermediary unit C (89) to deliver the updated data. This simplifies greatly the operations of the application intermediary unit A (39).

Specifically, a user updates data in the business application A (21) through the user interface A (20). Then, for the purpose of updating the corresponding data of the business application B (41) and the corresponding data of the business application C (81) with the updated data, the application intermediary unit A (39) converts the data format of the updated data in the data exchange format in the data format conversion unit (33). Then, the application intermediary unit A (39) transfers the converted data to the communication control unit (35) in the same manner as that discussed in the second embodiment.

Now, in the communication control unit (35), the converted data is written in the mobile agent (61) as the transmitting data. Then, the mobile agent (61) is transmitted from the mobile agent platform A (60). It is assumed here that the mobile agent (61) is designated to be transmitted first to the mobile agent platform B (90) and then to the mobile agent platform C (190). Thus, the mobile agent (61) is transmitted first to the mobile agent platform B (90) in the communication control unit (55) of the application intermediary unit B (59) from the application intermediary unit A (39).

The communication control unit (35), in compliance with an instruction by the mobile agent platform A (60), requests the network connection unit A (38) to establish a communication channel for communicating with the network connection unit B (58) of the application intermediary unit B (59). When the communication channel is established, the communication control unit (35) transmits the mobile agent (61) to the mobile agent platform B (90). For example, a communication port number to be used for passing through a fire wall has been stored in the communication control rule memory A (36). The communication control unit (35) informs the mobile agent platform A (60) of the stored communication port number, thereby allowing the mobile agent (61) to move within the network.

Upon arrival at the mobile agent platform B (90), the mobile agent (61) is processed in the application intermediary unit B (59) through the same procedures as those discussed in the sixth embodiment. In the communication control unit (55), the transmitting data is removed from the mobile agent (61) and transferred to the data format conversion unit (53). In the case of the data being enciphered, the cryptographic system is obtained from the communication control rule memory B (56), and the mobile agent platform B (90) deciphers the enciphered data. The thus deciphered data in the communication control unit (55) is transferred to the data format conversion unit (53). The data received in the business application system B is then written into the data base B (44) through the application intermediary unit B (59) and the business application B (41) by using the same operations and procedures as those discussed in the first embodiment.

Subsequently, the mobile agent (61) moves to the mobile agent platform C (190).

When received at the mobile agent platform B (90), the mobile agent has a next destination written by the application intermediary unit A (39). When observing the next destination of the mobile agent (61), the mobile agent platform B (90) initiates an operation for transmitting the mobile agent (61) to the next destination of the mobile agent platform C (190).

Specifically, the communication control unit (55) refers to the communication control rule stored in the communication control rule memory B (56) and verifies a communication protocol to be used for communicating with the application intermediary unit C (89), a port number to be used for passing through a fire wall and so forth. Usually, those pieces of information as the communication control rule are set previously in the mobile agent platform B (90).

In addition to that, the communication control unit (55) verifies the cryptographic system to be determined to be used for the data to be delivered by the mobile agent in the communication control rule memory B (56).

In the case that the mobile agent platform C (190) uses a different cryptographic system from that used by the mobile agent (61), the mobile agent platform B (90) received the mobile agent (61) re-enciphers the received data in the business application system B in accordance with the cryptographic system of the mobile agent platform C (190) and writes the re-enciphered data in the mobile agent (61). In the case of the mobile agent platform C (190) using the same cryptographic system as that used by the mobile agent, the mobile agent platform B (90) sends the mobile agent (61), as it is, towards the mobile agent platform C (190).

Subsequently, the mobile agent platform B (90) requests the network connection unit B (58) to establish a communication channel for communicating with the mobile agent platform C (190). With the communication channel being established between the mobile agent platform B (90) and the mobile agent platform C (190), the two mobile agent platforms authenticate each other and transmit the mobile agent (61). The operation of the application intermediary unit C (89) upon reception of the mobile agent (61) is the same as that of the application intermediary unit B (59) previously received the mobile agent (61).

Thus, the inter-application data transmitting system of this embodiment is provided with the mobile agent platform in the communication control unit of the application intermediary unit so as to utilize the data transmitting function by means of the mobile agent. This can reduce the workload of the application intermediary unit as the update source of updated data when exchanging data among multiple business applications interconnected over the network. Alternatively, however, a specific group may be formed by multiple mobile agent platforms in which a unified cryptographic system may be used. In this case, the workload of a relaying mobile agent platform may be lightened.

In addition to that, the mobile agent (61) may move in a more simplified manner within the group of the multiple mobile agent platforms. A special mobile agent platform dedicated to relaying the mobile agent may be provided in the network by utilizing the function of the mobile agent platform. In that case, the mobile agent may not be sent directly to a destination mobile agent platform, but may be sent to the destination mobile agent platform by taking a detour through an efficient route by selecting a line through which a communication band is not fully occupied by transmission data or a route having less traffic based on the current traffic condition in the network in data communication. Thus, it is a positive effect of this embodiment that the additional route selecting function in the network may be utilized.

As an example of the mobile agent platform, "Concordia" is developed by Mitsubishi Electric Information Technology Center, America. "Concordia" includes Concordia Server which corresponds to the mobile agent platform discussed in the sixth embodiment and Concordia Agent which corresponds to the mobile agent discussed also in the sixth embodiment.

As aforementioned, according to the inter-application data transmitting system of this embodiment, the business application can select the function of the communication control unit in compliance with the configuration of the application intermediary unit of the communication partner with which data is to be exchanged. In addition to that, it becomes easy to add further business applications with which data is to be exchanged.

Embodiment 8

An eighth embodiment of the present invention introduces an inter-application data transmitting system which is provided with two types of communication control units, one for transmitting data by means of the mobile agent and the other for transmitting data by using a communication protocol without using the mobile agent. The inter-application data transmitting system of this embodiment selects one of the two communication control units depending on the communicating partner with which data is exchanged. The inter-application data transmitting system of this embodiment is now discussed with reference to FIG. 18 and FIG. 32.

FIG. 18 is the example of the overall network connection view of the business application systems of the company A, the company B and the company C discussed in the third embodiment.

Figure 32:
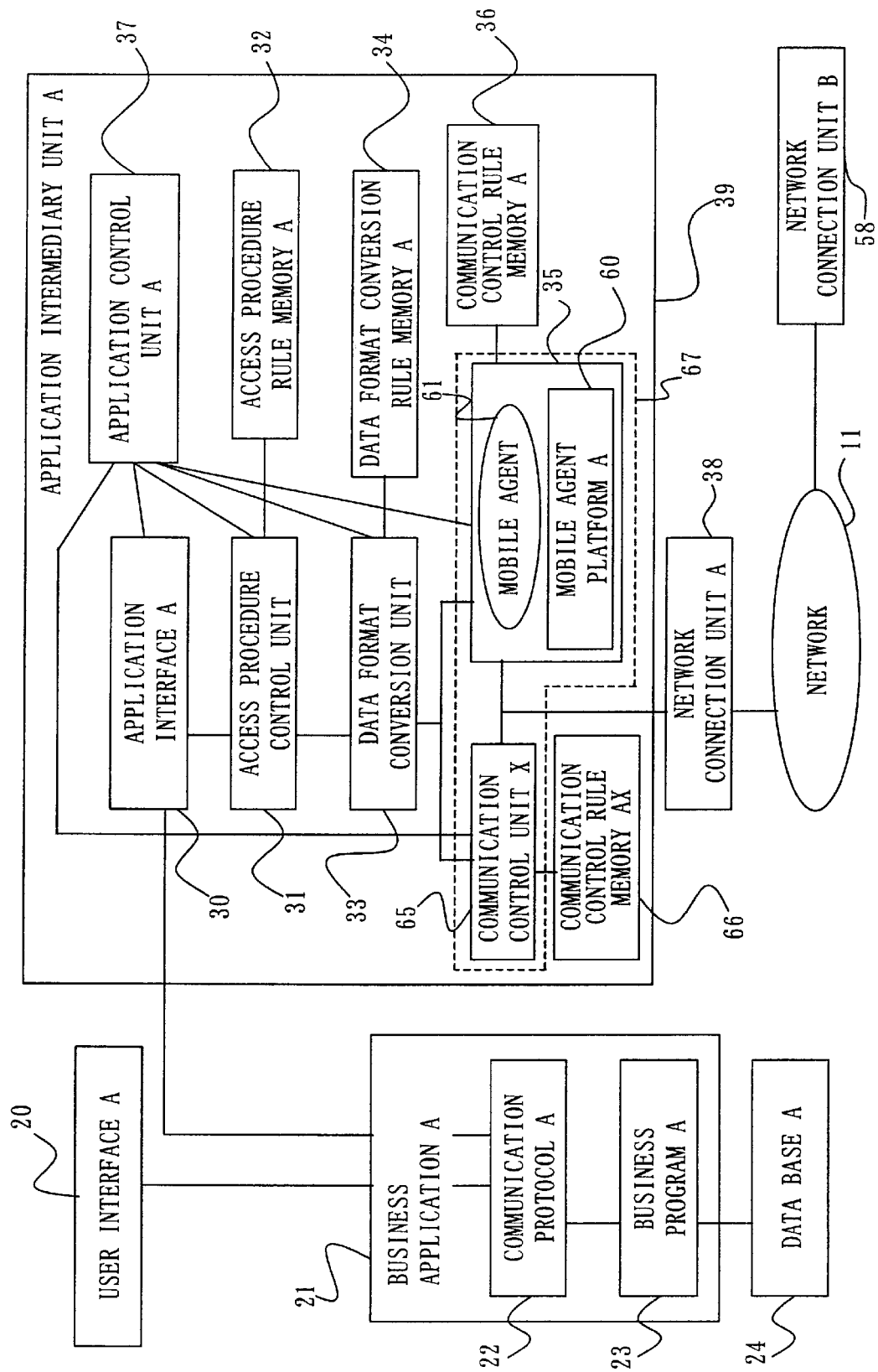
FIG. 32 shows a block diagram of an inter-application data transmitting system of the present invention illustrating an application intermediary unit which is provided with a function for selecting one of a communication control unit which uses the mobile agent and a communication control unit which uses no mobile agent.

FIG. 32 shows a block diagram of an inter-application data transmitting system of this embodiment illustrating the configuration of the business application A (21) and the configuration of the application intermediary unit A (39) of the company A.

It is assumed that the communication control unit (55) of the company B, which is not shown in the figures, is provided with the mobile agent platform and the communication control unit (85) of the company C, which is not shown in the figures either, is not provided with the mobile agent platform.

Referring now to FIG. 32, the communication control unit (35) is provided with the function of the mobile agent platform A (60). A reference numeral 65 denotes a communication control unit X which is not provided with the function of the mobile agent platform. A reference numeral 66 denotes a communication control rule memory AX which stores the communication control rule applied to the communication control unit X.

In FIG. 32, the communication control unit (35) and the communication control unit X (65) are shown as separate units. Alternatively, however, the functions of the communication control unit (35) and the communication control unit X (65) may be included in a single integrated communication control unit as shown by a broken line 67.

It is assumed that data is updated in the business application A (21) so that the updated data is to be notified to the business application B (41) and the business application C(81), and consequently, the processing request status is detected.

As to the transmitting format of data to be transmitted from the business application A (21), it is assumed that the same data exchange format is used for transmitting data to the business application B (41) and to the business application C (81), which is similar to the third embodiment.

The contents of the updated data to be notified to the business application B (41) and the business application C (81) are converted into data exchange formats applicable to the business application B (41) and the business application C (81), respectively. (However, the same data exchange format is assumed to be used in this embodiment for transmitting data to be exchanged among the business application systems, instead of using the application dependent data format as mentioned above.) Then, the converted data is transferred to the communication control unit (35) in the same manner as that discussed in the third embodiment.

According to this embodiment, however, the converted data is transferred to the communication control unit (35) and also to the communication control unit X (65).

Now, an operation of transmitting data from either one of the communication control unit (35) and the communication control unit (65) is discussed.

The application control unit A (37) selects either one of the communication control unit (35) having the mobile agent platform A (60) and the communication control unit X (65) having no mobile agent platform based on the communication control rule depending on the destination of the data to be transmitted. FIG. 30 shows the example of the communication control rule stored in the communication control rule memory A. In accordance with the communication control rule of FIG. 30, the communication control unit (35) is selected to transmit the data to the application intermediary unit B (59) by means of the mobile agent (61). The communication control rule memory AX (66) is assumed to store the examples of the communication control rule shown in FIG. 25 or FIG. 27. In other words, the data to be transmitted to the application intermediary unit C (89) is transmitted by the communication control unit X (65) by means of a data communication protocol using the communication protocol called TCP/IP, for example, other than the mobile agent.

Thus, in the case of transmitting data to the application intermediary unit B (59), the communication control unit (35) having the mobile agent platform A (60) is selected. The communication control unit (35) instructs the network connection unit A (38) to establish a communication channel with the network connection unit B (58) which is connected with the application intermediary unit B (59). Subsequently, the communication control unit (35) transmits the data to the communication control unit (55) by means of the mobile agent (61) in accordance with the communication control rule stored in the communication control rule memory A (36). Upon reception of the data transmitted by the mobile agent (61), the application intermediary unit B (59) updates the contents of the corresponding data stored in the data base B (44) through the same procedures as those discussed in the first embodiment or the sixth embodiment.

In the case of transmitting the data to the application intermediary unit C (89), the communication control unit X (65) having no mobile agent platform is selected so that the data is transmitted to the communication control unit (85) in accordance with the communication protocol written in the communication control rule stored in the communication control rule memory AX (66). Upon reception of the data, the application intermediary unit C (89) updates the contents of the corresponding data stored in the data base C (84) through the same procedures as those discussed in the first embodiment.

As aforementioned, the inter-application data transmitting system of this embodiment is provided with the function of selecting an applicable and effective communication control function to be used for a specific communicating partner from among the communication control function using the mobile agent and the conventional communication control function without using the mobile agent based on the communication control rule. It is a positive effect of the inter-application data transmitting system of this embodiment that data is allowed to be exchanged among a larger number of application intermediary units. It is another positive effect of the inter-application data transmitting system of this embodiment that data is allowed to be exchanged with other applications using the mobile agent function.

According to this embodiment, the present invention has been discussed with reference to the two different functions of the communication control units. Alternatively, however, this example dose not limit communication control functions to be applicable to the present invention.

As aforementioned, the inter-application data transmitting system of this embodiment is provided with the communication control unit having the function of the mobile agent platform. It is a positive effect of this embodiment that the function of the mobile agent platform may be used. In addition to that, this embodiment allows for ease in adding a network route selecting function for effectively delivering data. The network route selecting function selects an effective route in data transmission with less traffic or an effective line in which a communication band is not fully occupied by transmitting data depending on the situation of communication traffic within the network.

Embodiment 9

A ninth embodiment of the present invention introduces an inter-application data transmitting system in which the communication control rule is set and entered through a user interface for entering the communication control rule.

Figure 33:
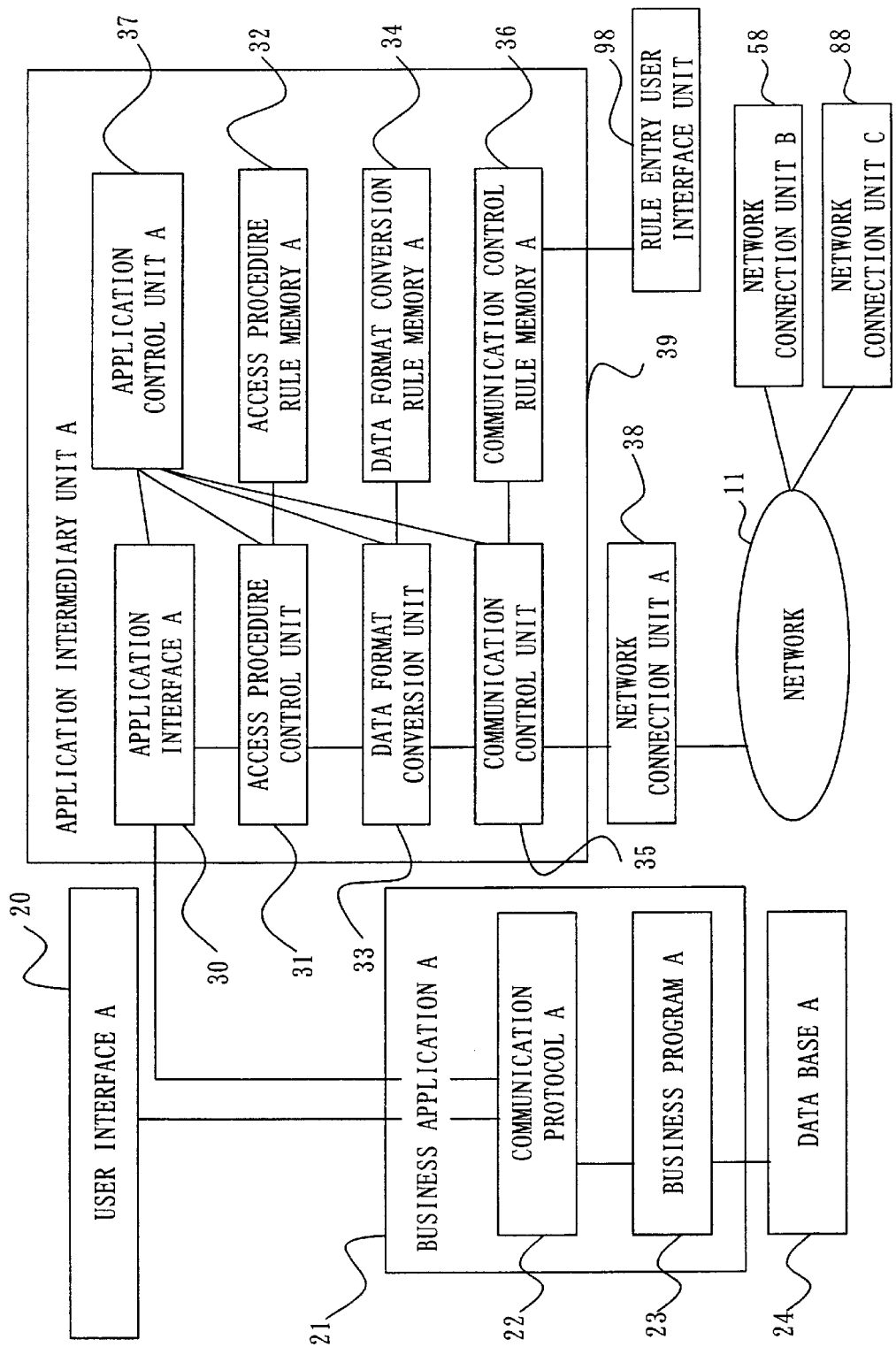
FIG. 33 shows a block diagram of an inter-application data transmitting system of the present invention including an application intermediary unit which is provided with a rule entry user interface for entering the communication control rule to be stored in the communication control rule memory.

FIG. 33 shows a block diagram of an inter-application data transmitting system of this embodiment illustrating that the application intermediary unit A (39) is provided with an additional rule entry user interface.

Referring to FIG. 33, a reference numeral 98 denotes a rule entry user interface unit which includes a user interface for entering the contents of the communication control rule stored in the communication control rule memory A (36) in the application intermediary unit A (39) and for re-writing or updating the contents of the communication control rule.

The user is allowed to directly designate various types of setting through the rule entry user interface unit (98). The types of setting to be designated through the rule entry user interface unit (98) include the setting of a communication protocol to be used for communication with the application intermediary unit of a communicating partner and the communication port number to be used for the communication, the setting of the communicating time in data transmission and the data priority for transmission, the setting of an authentication system to be used for authenticating the application intermediary unit of the communicating partner and a cryptographic system to be used for enciphering data to be transmitted, and the setting of authentication systems to be used by the mobile agent platforms for authenticating each other of the communicating partners. The rule entry user interface unit (98) may be provided one in each of the respective application intermediary units of the communicating partners as shown in FIG. 33.

As an effect of the inter-application data transmitting system of this embodiment of the present invention, the communication protocol and the condition for communication to be used for passing through the fire wall may be set on a business application basis. In addition to that, the rule entry user interface unit of this embodiment allows the communication control rule to be modified effectively.

Embodiment 10

A tenth embodiment of the present invention introduces an inter-application data transmitting system in which multiple data format conversion rule memories are employed. The inter-application data transmitting system of this embodiment is discussed with reference to FIG. 18 and FIG. 34.

Figure 34:
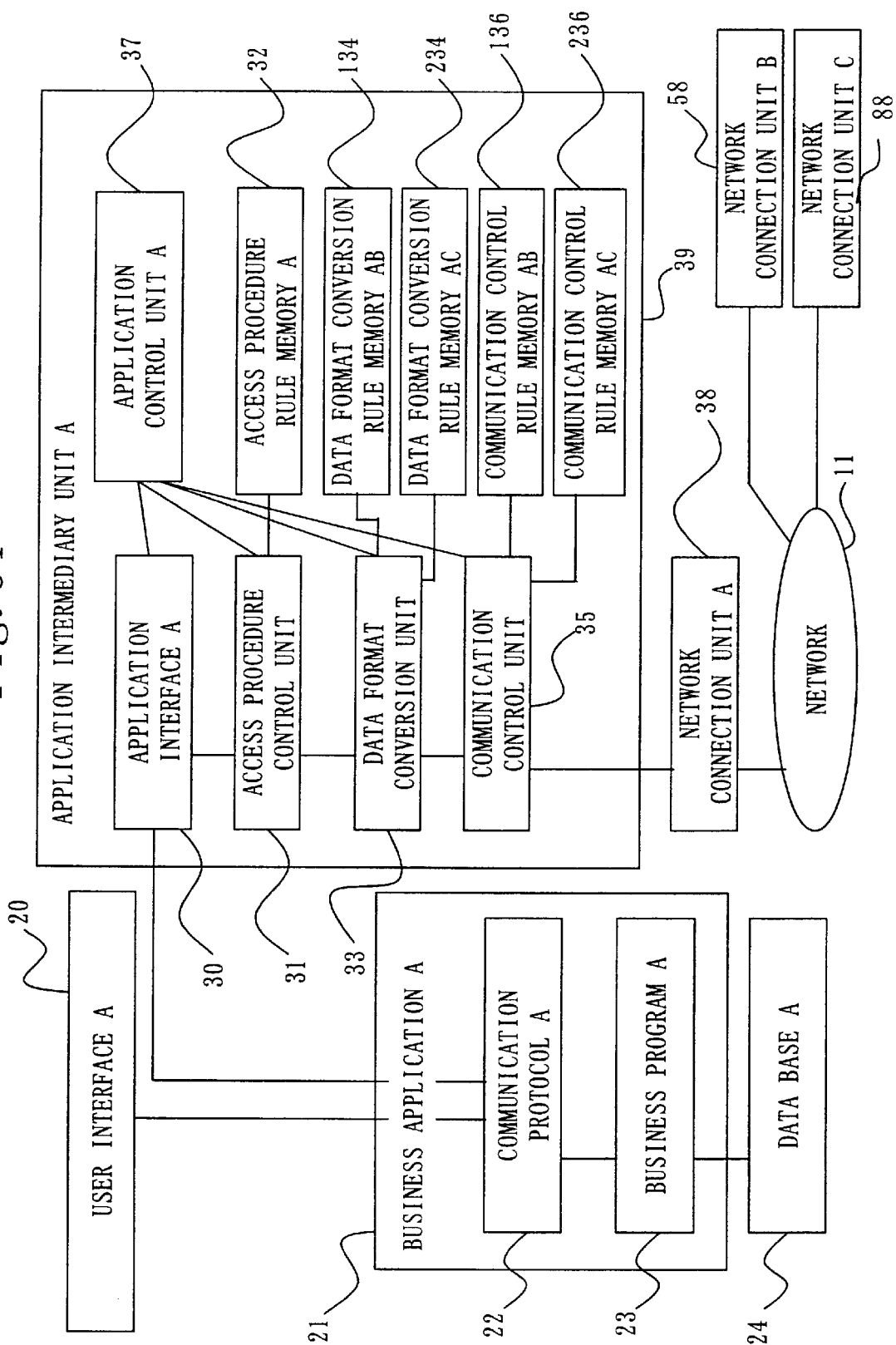
FIG. 34 shows a block diagram of an inter-application data transmitting system of the present invention illustrating an application intermediary unit which is provided with multiple data format conversion rule memories.

FIG. 34 shows a block diagram of an inter-application data transmitting system of this embodiment illustrating a configuration of the application intermediary unit which is provided with multiple, e.g. two here, data format conversion rule memories. Referring to FIG. 34, a reference numeral 134 denotes a data format conversion rule memory AB which is used for exchanging data between the application intermediary unit A (39) and the application intermediary unit B (59). A reference numeral 234 denotes a data format conversion rule memory AC which is used for exchanging data between the application intermediary unit A (39) and the application intermediary unit C (89).

The inter-application data transmitting system of this embodiment is now discussed with reference to the overall network connection view of FIG. 18 including the business application systems of the company A, the company B and the company C.

In the previous embodiments of second embodiment through the ninth embodiment, the discussions were made with the assumption that the data exchange format to be used for transmitting data from the application intermediary unit A (39) to the application intermediary unit B (59) is the same as the data exchange format to be used for transmitting the data to the application intermediary unit C (89). According to this embodiment, however, it is assumed that the data exchange format to be used for transmitting data to the application intermediary unit B (59) is different from the data exchange format to be used for transmitting the data to the application intermediary unit C (89) from the application intermediary unit A (39).

In this embodiment, therefore, it is required that the application intermediary unit A (39) should create different types of data exchange formats designed for different destinations of transmitting data. For that reason, the data format conversion unit (33) converts the data format of data to be transmitted to the application intermediary unit B (59) based on the data format conversion rule stored in the data format conversion rule memory AB (134) and converts the data format of the data to be transmitted to the application intermediary unit C (89) based on the data format conversion rule stored in the data format conversion rule memory AC (234).

Thus, the data format conversion unit (33) outputs two kinds of data in different data exchange formats to be transmitted to the different destinations to the communication control unit (35). These two kinds of output data are transferred to the communication control unit (35) with information about the application intermediary units, respectively, of the individual destinations attached.

In addition to that, according to this embodiment, multiple (e.g., two here) communication control rule memories are provided for including different kinds of communication control rules to be used for communicating with the application intermediary units of multiple destinations. Specifically, the communication control rule memory AB (136) is used for communicating with the application intermediary unit B (59) and the communication control rule memory AC (236) is used for communicating with the application intermediary unit C (89).

The data conversion unit (35) selects one of the communication control rule memory AB (136) and the communication control rule memory AC (236) based on an instruction signal from the application control unit A (37) that recognized the communicating partner to which the data is to be transmitted, or based on destination information attached to the updated data by the application control unit A (37).

As aforementioned, even if different kinds of data exchange formats are used for exchanging data among multiple application intermediary units, data can be exchanged among multiple business applications by using the different kinds of data exchange formats adaptively according to this embodiment.

As an effect of the inter-application data transmitting system of this embodiment in which multiple kinds of the data format conversion rules are provided, the data exchange format may be selected depending on the application dependent data format of the application intermediary unit of the communicating partner to which the data is to be transmitted.

Embodiment 11

An eleventh embodiment of the present invention introduces an inter-application data transmitting system in which multiple data format conversion are provided. Among the multiple data format conversion units, at least one of which does not output converted data in the data exchange format to the communication control unit (35) but output the converted data to the outside of the application intermediary unit A (39). The inter-application data transmitting system of this embodiment is discussed with reference to FIG. 35.

Figure 35:
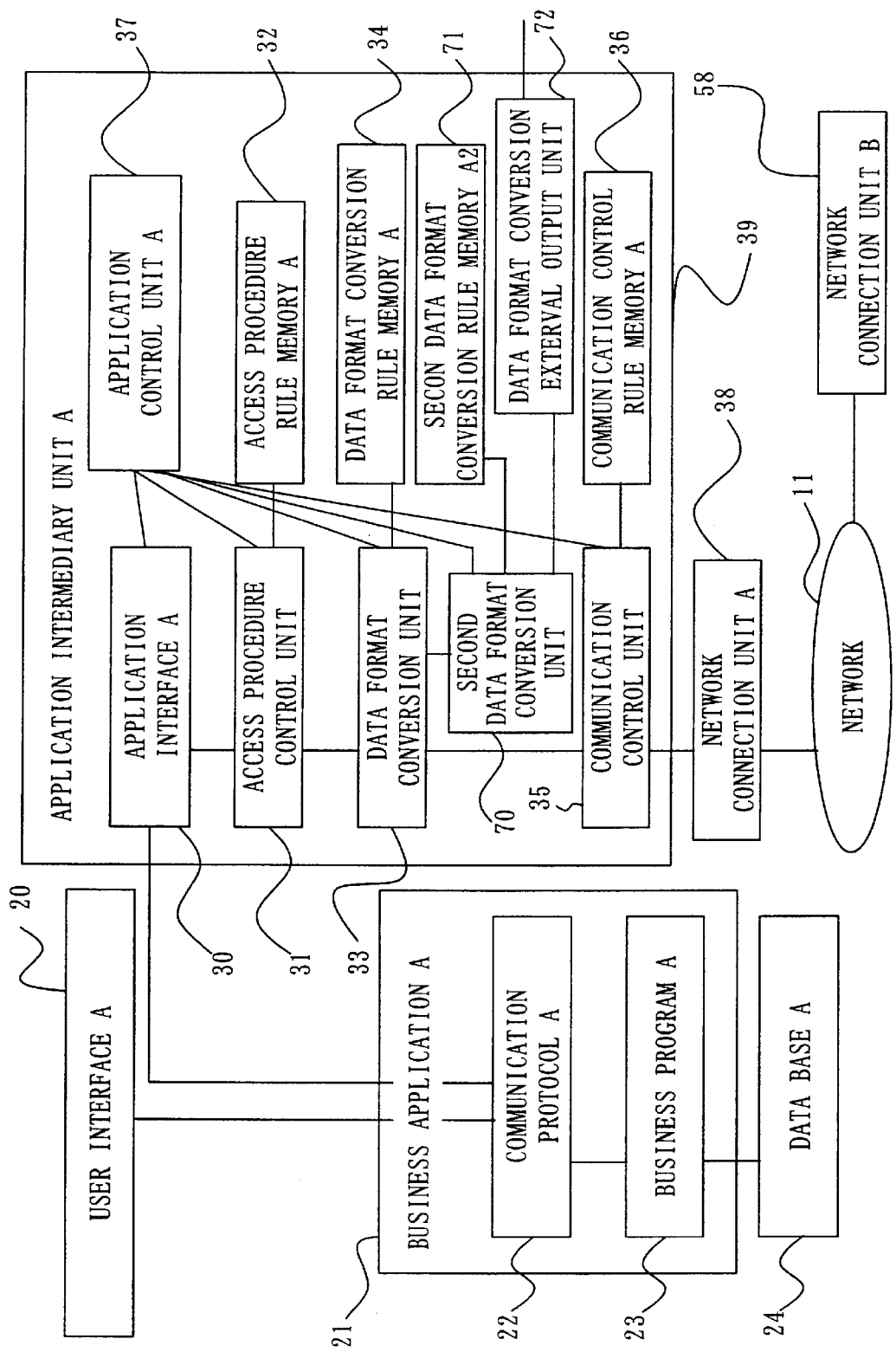
FIG. 35 shows a block diagram of an inter-application data transmitting system of the present invention illustrating an application intermediary unit which is provided with multiple data format conversion units and at least one of the multiple data format conversion units outputs a conversion result to a unit other than a communication control unit.

FIG. 35 shows a block diagram of an inter-application data transmitting system of this embodiment illustrating the configuration of the application intermediary unit A (39) which is characterized with two data format conversion units and the corresponding two data format conversion rule memories and an external output unit of converted data. Referring to FIG. 35, a reference numeral 70 denotes a second data format conversion unit which is an additional unit to the data conversion unit (33). A reference numeral 71 denotes a second data format conversion rule memory A2 which stores at least one kind of data format conversion rules to be used for converting the data format of data to be transmitted in the second data format conversion unit (70). A reference numeral 72 denotes a data format conversion external output unit which outputs converted data from the second data format conversion unit (70) to the outside of the application intermediary unit A (39). According to this embodiment, the second data format conversion unit (70) is to receive an output of the data format conversion unit (33). Alternatively, however, the second data format conversion unit (70) may directly receive an output of the access procedure control unit (31) in the case of transmitting data from the application intermediary unit A (39), and directly receive an output of the communication control unit (35) in the case of receiving data from the outside of the application intermediary unit A (39).

In this embodiment, it is assumed that a user of the user interface A (20) updates the contents of data stored in the data base A (24) through the business application A (21), and the contents of the data base B (44) corresponding to the updated data is to be updated through the application intermediary unit B (59) and the business application B (41), which is similar to the first embodiment.

Data being updated in the data base A (24) is inputted to the data format conversion unit (33) in the same manner as that discussed in the first embodiment. The data format conversion unit (33) converts the data format of the updated data into the data exchange format based on the data format conversion rule stored in the data format conversion rule memory A (34). A data format using XML (extensible Markup Language) may be set, for example, as the data exchange format in the data format conversion rule stored in the data format conversion rule memory A (34). In that case, the converted data through XML is inputted to the second data format conversion rule memory (70) as data in an XML based data format.

The second data format conversion unit (70) further assigns conversion to the inputted data based on the data format conversion rule stored in the data format conversion rule memory A2 (71). It is assumed in this embodiment that the second data format conversion rule memory A2 (71) stores the data format conversion rule to be used for converting the XML based data format into an HTML (Hyper Text Markup Language) based data format and outputting converted data into an HTML format file. An output of the data format conversion external output unit (72) is outputted as the HTML format file. According to this specific example, the outputted HTML format file becomes available immediately for display on an external display unit through a browser.

The second data format conversion rule memory A2 (71) may store the data conversion rule to be used for converting data into a different XML based data format. In that case, the data format conversion external output unit (72) outputs XML format data which is different from the XML format data outputted from the data format conversion unit (33).

Furthermore, it is assumed that an external data base device is connected with the data format conversion external output unit (72) for directly dealing with the XML format data. In the case that the data format conversion rule stored in the second data format conversion rule memory A2 (71) is set as the data format conversion rule applied to the XML format data which is processed by the external data base device, an output of the data format conversion external output unit (72) may be directly used by the external data base device for dealing with the XML format data.

The inter-application data transmitting system of FIG. 35 shows a configuration in which the multiple data format conversion units are provided in accordance with the multiple units to which converted data is to be outputted. Alternatively, however, a single data format conversion unit may be provided with a function for allowing the converted data to be outputted to multiple outputs, outputs other than the communication control unit in the concrete. In other words, the data format conversion unit selects at least one of the multiple output units and then the converted data is to be outputted to selected output unit(s).

Still alternatively, a single data format conversion rule memory may store multiple different kinds of data format conversion rules. In that case, the data format conversion unit selects one kind of the multiple data format conversion rules stored in the single data format conversion rule memory depending on the destination to which the data is to be transmitted.

As aforementioned, it is a positive effect of the inter-application data transmitting system of this embodiment provided with the data format conversion external output unit that converted data is outputted and supplied to an external device immediately and directly from the application intermediary unit.

It is another positive effect of the inter-application data transmitting system of this embodiment provided with the second data format conversion unit and the second data format conversion rule memory that updated data in a data format other than the data exchange format to be defined for exchanging data is allowed to be outputted to an external device from the application intermediary unit. Furthermore, it is still another positive effect of the inter-application data transmitting system of this embodiment having the function of selecting an output unit of converted data by the data format conversion unit that the updated data is allowed to be displayed on the screen of an external device and/or to be inputted to a general-purpose data base for re-processing.

As an effect of the inter-application data transmitting system of this embodiment in which the multiple data format conversion units are provided in the application intermediary unit and at least one of the data format conversion unit outputs data to the outside of the application intermediary unit, the output of the data format conversion unit is exchanged among other business applications interconnected over the network. On top of it, the output of the data format conversion unit may be used for constructing a data base based on a new data format (or a data format to be used for standardization) for displaying the contents of data based on a general-purpose software tool.

Embodiment 12

A twelfth embodiment of the present invention introduces an inter-application data transmitting system in which data is transmitted among the application intermediary units by means of an electronic-mail or E-mail system. The inter-application data transmitting system of this embodiment is discussed with reference to FIG. 36 and FIG. 1 and FIG. 2.

Figure 36:
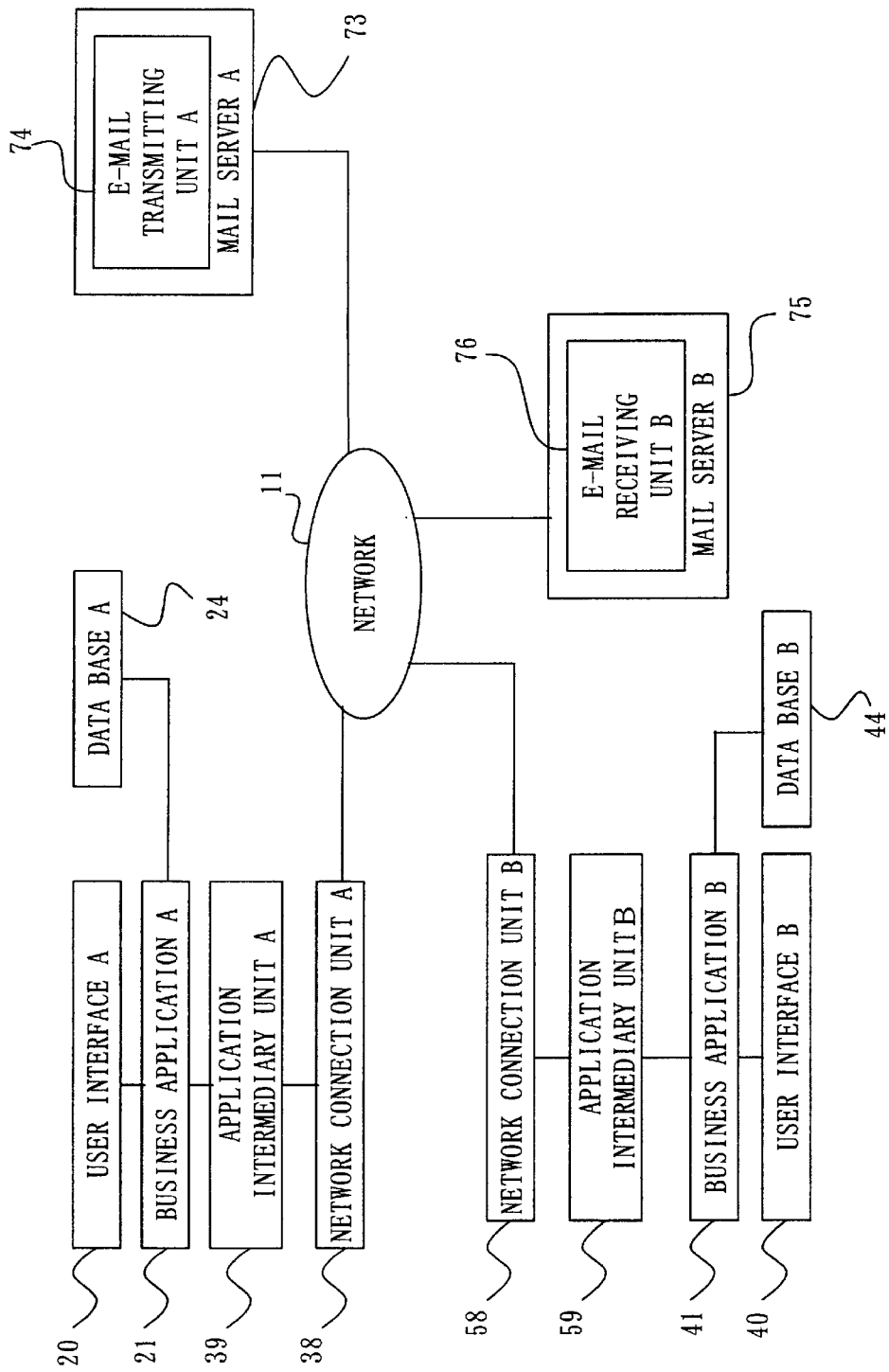
FIG. 36 shows a block diagram of an overall network connection view of an inter-application data transmitting system of the present invention involving an electronic mail system.

FIG. 36 shows an overall network connection view of the inter-application data transmitting system according to this embodiment in which data is exchanged by means of an E-mail system. Referring to FIG. 36, a reference numeral 73 denotes a mail server A which is used by the application intermediary unit A (.39). A reference numeral 74 denotes an E-mail transmitting unit for the mail server A (73). The E-mail transmitting unit (74) may transmit an E-mail to the mail server of the destination to which the E-mail is to be transmitted through a communication procedure called SMTP (Simple Mail Transfer Protocol), for example. A reference numeral 75 denotes a mail server B which is used by the application intermediary unit B (59). A reference numeral 76 denotes an E-mail receiving unit for the mail server B (75). For example, the application intermediary unit B (59) can obtain an E-mail received through a communication protocol called IMAP (Internet Message Access Protocol) 4.

An operation of the inter-application data transmitting system of this embodiment is now discussed with reference to FIG. 1, FIG. 2 and FIG. 36.

First, with reference to FIG. 1 and FIG. 36, a user at the user interface A (20) updates data in the business application A (21). Then, for the purpose of updating the corresponding data in the business application B (41), the application intermediary unit A (39) converts the data format of the updated data into the data exchange format in the data format conversion unit (33) and transfers the converted data to the communication control unit (35) in the same manner as that discussed in the first embodiment.

Subsequently, the communication control unit (35) edits the received data so as to be applicable to the Email system. Otherwise, the received data is attached to the E-mail as an attached file. Then, the communication control unit (35) requests the E-mail transmitting unit (74) of the mail server A (73) to deliver the E-mail with the address of the E-mail receiving unit (76) of the mail server B (75) as the destination to which the E-mail is to be transmitted attached thereto. In order to transmit the E-mail, the communication control unit (35) verifies the communication control rule stored in the communication control rule memory A (36) and obtains such information as the E-mail system to be used for transmission, the address of the E-mail and so forth.

The mail server A (73), upon receipt of the request for delivering the E-mail, transmits the received data to the E-mail receiving unit B (76) of the mail server B (75) of the designated destination as the contents of the E-mail or as the attached file to the E-mail.

When transmitting the received data as the E-mail, the mail server A (73) writes such a character string as "It is indicated that this E-mail contains data to be written into the business application B (41)" which is predetermined as the "Subject" or "Title" of the E-mail.

The E-mail receiving unit (76) of the mail server B (75), upon receipt of this E-mail, holds this E-mail and waits for the access of the application intermediary unit B (59) to receive this E-mail.

The application control unit B (57) of the application intermediary unit B (59) instructs the communication control unit (55) at each scheduled time to gain access to the mail server B (75) so as to receive the delivered E-mail in the E-mail receiving unit (76). The communication control unit (55) requests the mail server B (75) to verify the "Subject" or "Title" written in each Email held in the E-mail receiving unit (76) of the mail server B (75) and then obtain the E-mail which has the predetermined character string.

Thus, the mail server B (75) obtains an E-mail requested. The function of obtaining an E-mail containing such a specific subject or title is provided by the communication protocol called IMAP4.

The communication control unit (55) receives the data to be written into the business application B (41) from the contents of the thus received E-mail or the attached file to the E-mail. The communication control unit (55) then notifies the application control unit B (57) of the reception of the data.

Subsequently, the received data is written into the data base B (44) through the application intermediary unit B (59) and the business application B (41) in the same manner as that discussed in the first embodiment. In accordance with the procedures discussed above in this embodiment and through the E-mail system, the updated data in the business application A (21) is transmitted to the business application B (41). Then, the contents of the data base B (44) is updated so as to have the same meaning as that of the updated data in the data base A (24), thereby allowing the business application A (21) and the business application B (41) to share data in the same meaning.

As aforementioned, the inter-application data transmitting system of this embodiment is characterized with transmitting data between the application intermediary units through the E-mail system. It is a positive effect of this embodiment that the network connection unit of the reception side does not have to be always prepared for responding to a coming request for connection issued by the communicating partner. Data can be obtained from an E-mail held in the mail receiving unit by establishing a communication channel with the mail server at any arbitrary time when data can be received. In addition to that, with a network having a fire wall, data can be received when a communication port through which an E-mail is received is opened. This allows the inter-application data transmitting system to omit an operation for opening a new communication port.

Embodiment 13

A thirteenth embodiment of the present invention introduces an inter-application data transmitting system in which the application interface gains access directly to the business application without passing through the communication protocol of the business application.

With reference to the previously discussed first through twelfth embodiment, the application interface A (30) and the communication protocol A (22) exchange data and control information with each other between the application intermediary unit A (39) and the business application A (21) by using the shared communication protocol. This implementation system is applicable to the case that the application intermediary unit A (39) and the business application A (21) are packaged separately in different computer systems in the same LAN. Otherwise, this implementation system is applicable to or the case that the application intermediary unit A (39) and the business application A (21) are packaged separately in remote computer systems from each other.

Figure 37:
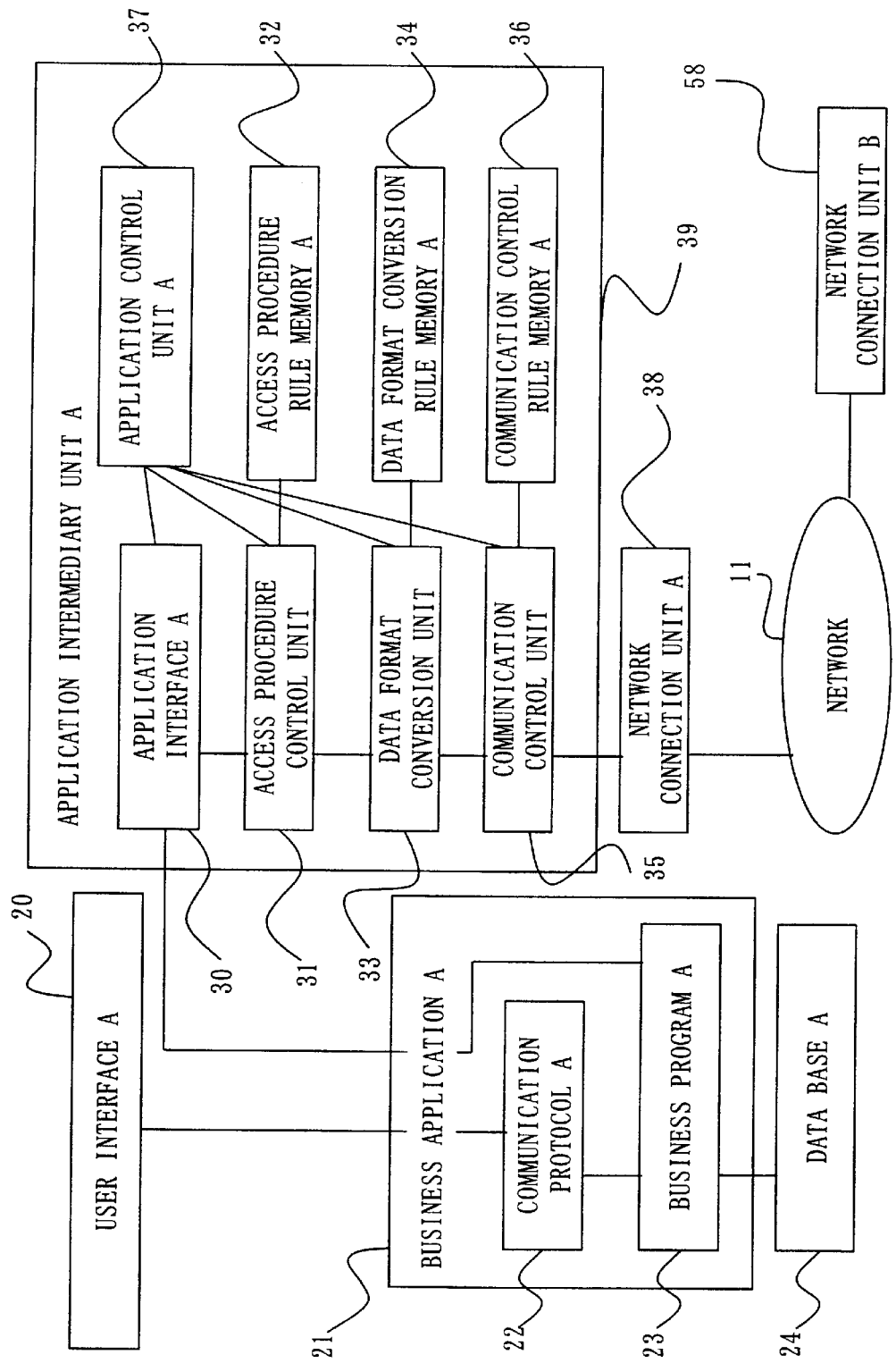
FIG. 37 shows a block diagram of an inter-application data transmitting system of the present invention in a case of directly gaining access to a business program from an application interface.

FIG. 37 shows a block diagram of an inter-application data transmitting system of this embodiment illustrating that the application interface A (30) exchanges data and control information with the business program A (23) by means of the API of the business program A (23). This embodiment, however, introduces an implementation system applicable to the case that the application intermediary unit A (39) and the business application A (21) are both packaged in the same computer system. According to this embodiment, as shown in the figure, the application interface A (30) is thus allowed to exchange data and control information in a direct manner with the business program A (23) by means of the API of the business program A (23) without the communication protocol A (22) being involved.

Embodiment 14

A fourteenth embodiment of the present invention is now discussed. With reference to the first embodiment of the present invention, the elements of the application intermediary unit perform their respective operations when controlled by the application control unit as discussed in detail with reference to the flow charts of FIG. 9 through FIG. 16. However, those elements of the application intermediary unit are not necessarily perform their operations by the instruction of the application control unit. In other words, the elements of the application intermediary unit may receive information directly from elements at their previous processing stages by means of an inter-system message or the like indicating that the previous operation has been completed, thereby initiating their respective operations. In that case, the application control unit controls the progress of operations performed by the respective elements of the application intermediary unit.

According to this embodiment, therefore, in case of a failure occurred in the application intermediary unit causing a transmission break of data, the respective elements of the application intermediary unit execute their same operations again in accordance with information controlled by the application control unit. This allows the processing request status, or specifically, order processing to be carried out.

With a recently spreading object oriented system, the inter-application data transmitting system of this embodiment may be allowed for ease in implementation.

In addition to the elements of the application intermediary unit introduced as an example in this and the previous embodiments, a new element having a function controlled by the application control unit which is different from those elements may alternatively be employed.

Embodiment 15

A fifth embodiment of the present invention introduces an inter-application data transmitting system in which a state transition control function is provided for changing the status of the operation of the inter-application data transmitting system. The state transition control function executes processing in response to an event occurring in the inter-application data transmitting system in operation for the purpose of changing the status or state transition.

Figure 38:
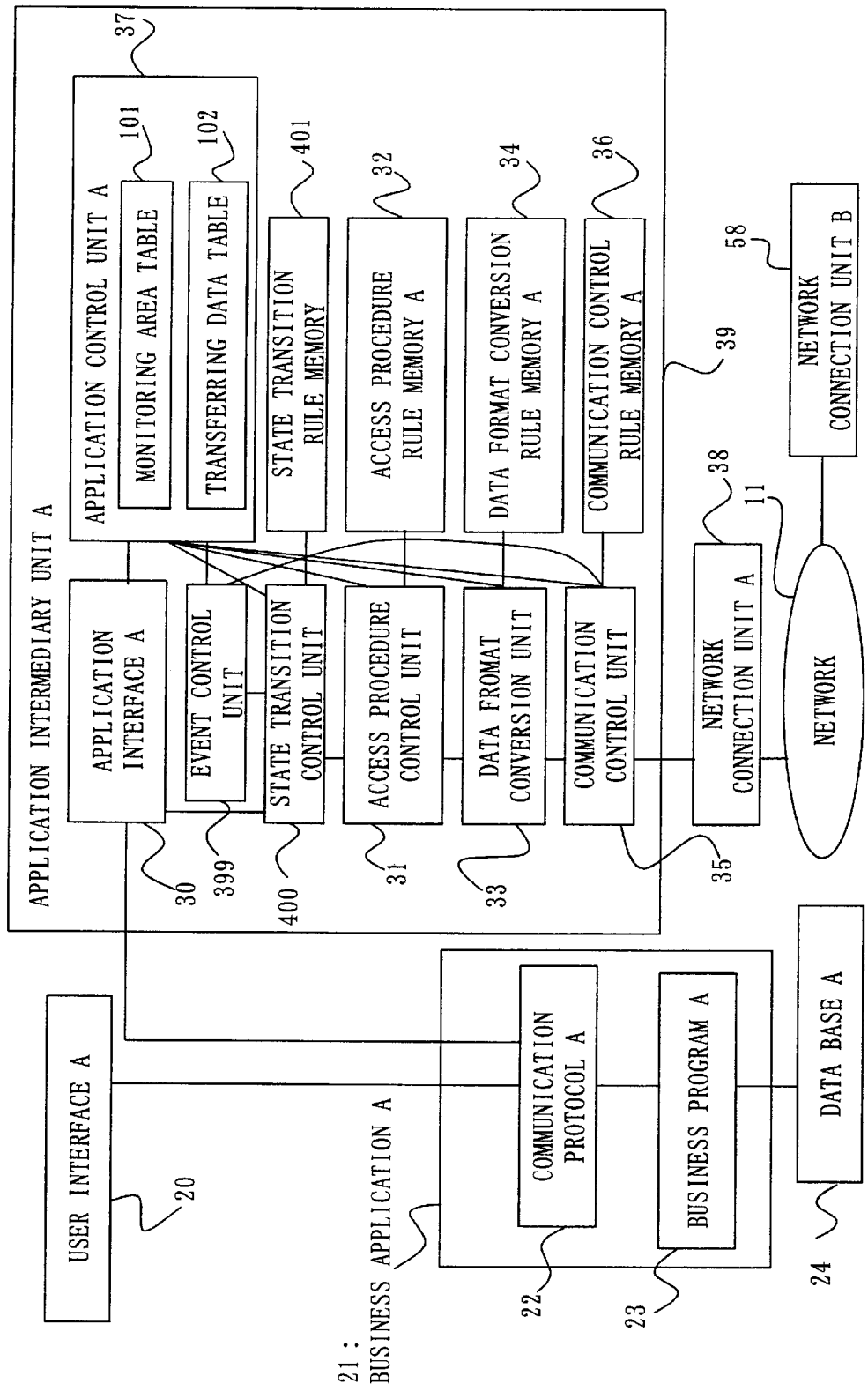
FIG. 38 shows a block diagram of an inter-application data transmitting system of the present invention involving a state transition control.

FIG. 38 shows a block diagram of an inter-application data transmitting system of this embodiment illustrating the configuration of an application intermediary unit of the business application system A designed for controlling the state transition.

The inter-application data transmitting system of the fifteenth embodiment modifies the inter-application data transmitting system of the first embodiment by adding an event control unit, a state transition control unit and a state transition rule memory. According to this embodiment, the business application system B of FIG. 2 which the business application system A exchanges data with, for example, is assumed to have the same configuration as that of the business application system A of this embodiment.

Referring to FIG. 38, a reference numeral 399 denotes an event control unit which receives an event or detect an event, and then controls the received or detected event to be transferred to a state transition control unit.

There are various types of events such as various kinds of external events which are notified by the application control unit A (37) or by the communication control unit (35), various kinds of internal events including a timer event, an exceptional event, and a system termination event, and an event when the system monitors predefined data (a predetermined monitoring data field) and detects that the data reached a given value. Other events may, of course, be applied to this embodiment.

A reference numeral 401 denotes a state transition rule memory for storing a state transition rule which defines various types of processing corresponding to various types of events. The state transition rule is composed of a conditional portion and a body portion. The conditional portion indicates a condition for transition in order to execute a state transition operation and the body portion corresponding to the conditional portion defines a state transition operation in order to change the statue of the inter-application data transmitting system.

A reference numeral 400 denotes a state transition control unit which retrieves a kind of state transmission corresponding to an event received from the event control unit (399) in accordance with the state transition rule stored in the state transition rule memory (401), and performs the retrieved kind of state transition.

In FIG. 38, the event control unit (399) and the state transition rule memory (401) are not named like the event control unit A or the state transition rule memory A. However, they depend on the business application in fact. Therefore, the state transition operations and the contents of data of those elements depending on the business application A (21) differ from those depending on a different business application.

Figure 39:
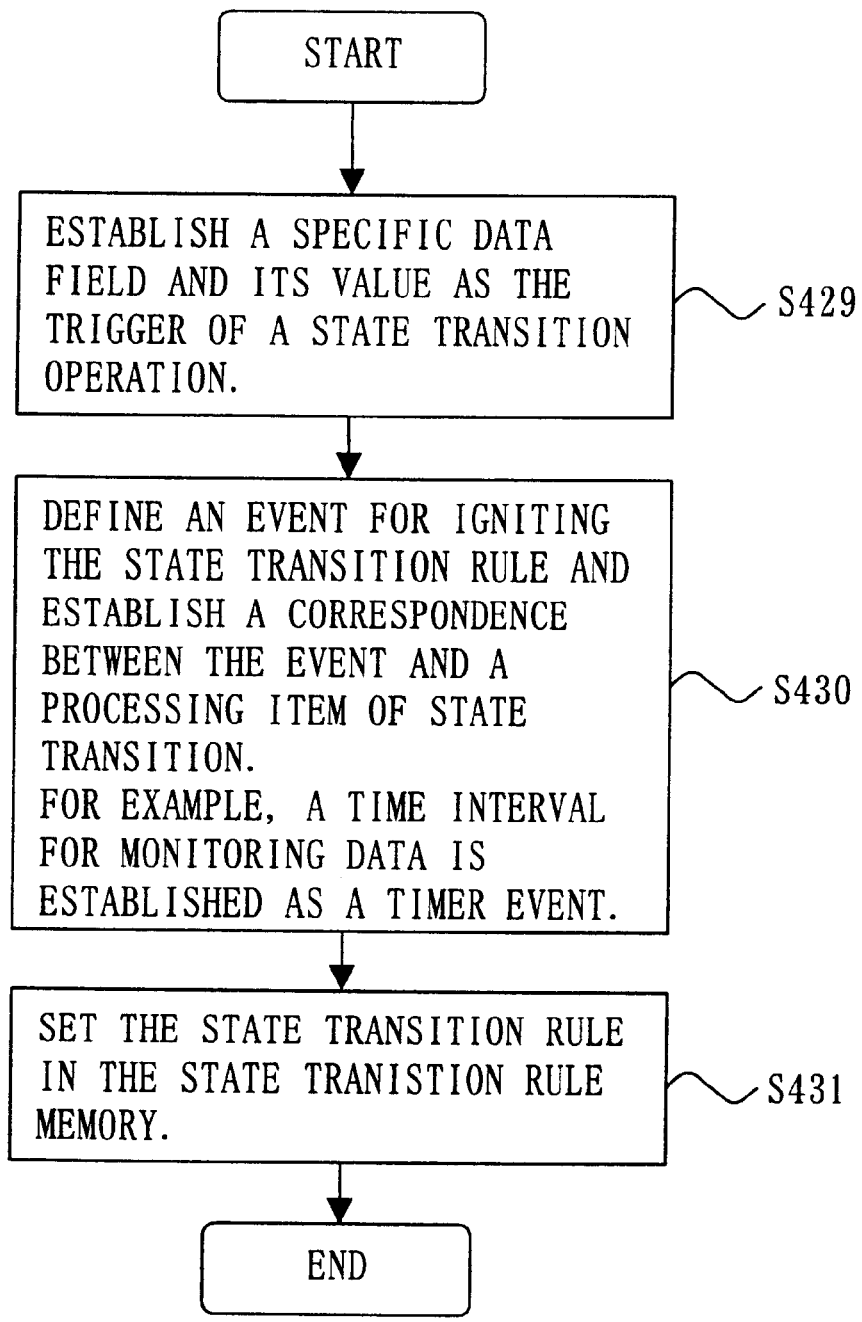
FIG. 39 shows a flow chart illustrating a series of operations for setting an event in the inter-application data transmitting system involving the state transition control.
Figure 40:
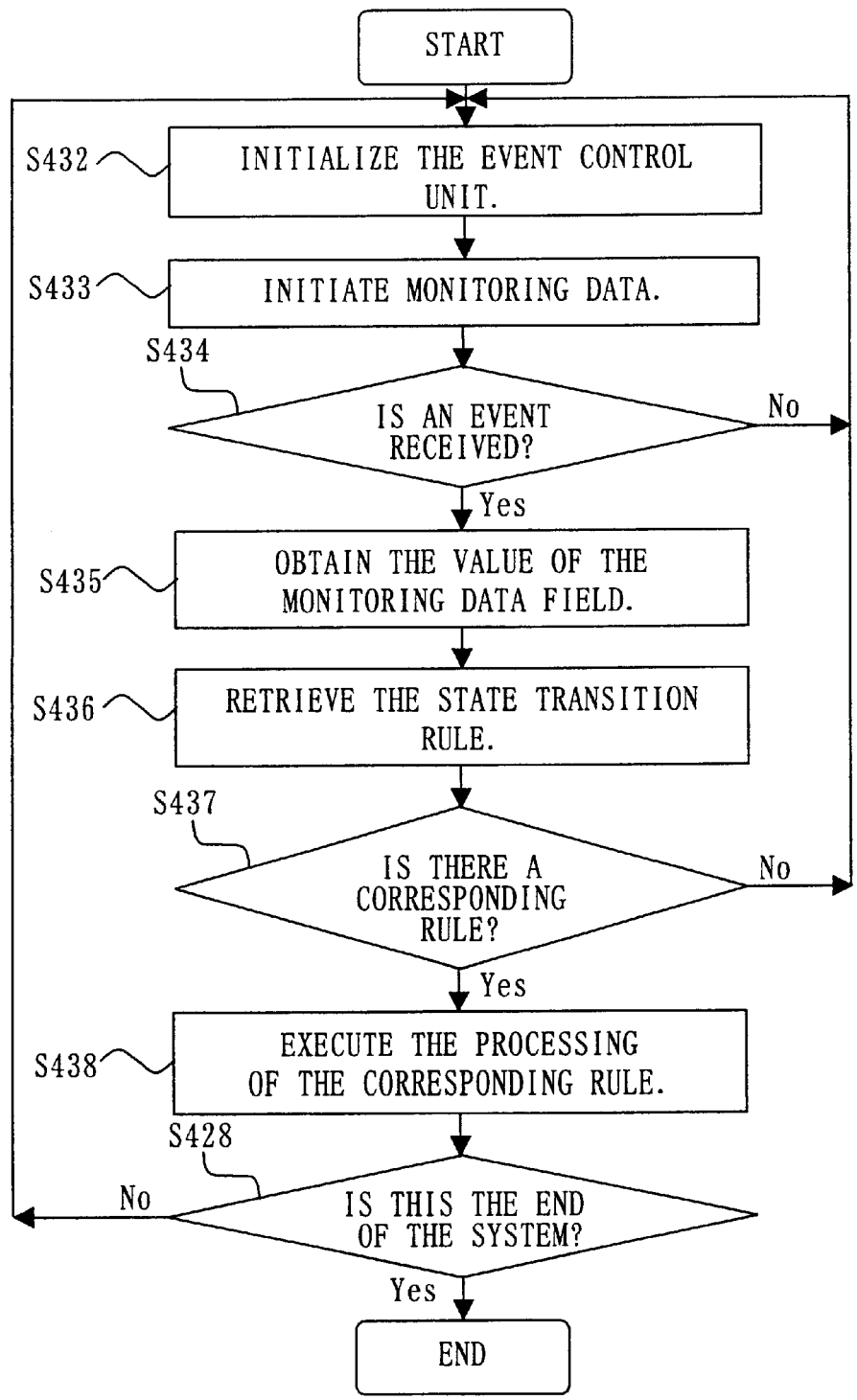
FIG. 40 shows a flow chart illustrating a series of operations of a state transition in the inter-application data transmitting system involving the state transition control.

FIG. 39 and FIG. 40 are flow charts illustrating a state transition control operation according to the fifth embodiment of the present invention.

Referring to FIG. 39, a reference numeral 429 denotes a step of setting a specific data field which is used as a trigger of a state transition operation and the value of the specific data field.

A reference numeral 430 denotes a step of defining an event for igniting the state transition rule and for establishing a correspondence between the defined event and a state transition operation. For example, as a timer event, a time interval for monitoring data is set.

A reference numeral 431 denotes a step of storing the defined state transition rule in the state transition rule memory (401).

Referring to FIG. 40, a reference numeral 432 denotes a step of initializing the event control unit (399). A reference numeral 433 denotes a step of initiating an operation for monitoring the data.

A reference numeral 434 denotes a step of judging whether an external event from the communication control unit (35) of FIG. 38 is notified or an internally generated event is notified.

A reference numeral 435 denotes a step of obtaining the value of a monitoring data field.

A reference numeral 436 denotes a step of retrieving the state transition rule.

A reference numeral 437 denotes a step of judging whether or not a candidate state transition rule for processing exists.

A reference numeral 438 denotes a step of executing the processing of the candidate state transition rule. A reference numeral 428 denotes a step of judging whether or not a termination operation of the system has been completed.

An operation of the inter-application data transmitting system of the fifteenth embodiment is now discussed with reference to FIG. 38, FIG. 39, FIG. 40 and FIG. 41.

Referring now to FIG. 38, operations except for those involving the event control unit (399), the state transition control unit (400), and the state transition rule memory (401), are performed in same manner as those of the inter-application data transmitting system discussed in the first embodiment. The flow chart of FIG. 39 including the step S429 through the step S431 illustrates a series of operations for defining and storing the state transition rule which are executed previously prior to executing the inter-application data transmitting system.

The flow chart of FIG. 40 including the step S429 and the step S433 through the step S438 illustrates a series of operations for starting to monitor a specific data field and for executing the system for performing a state transition operation.

The state transition rule is now described.

FIG. 41 shows an example of the state transition rule stored in the state transition rule memory (401).

A reference numeral 439 through a reference numeral 443 denote the conditional portions of the state transition rule.

The example of FIG. 41 shows various cases of the values of the data field identified with "sourcestat" being assigned such specific values as "CLOSE", "HOLD", "OPEN", and "initstate" (as an example), respectively. In addition to that, the received or detected event by the event control unit (399) is assigned the values identified with the "event".

A reference numeral 444 through a reference numeral 448 in FIG. 41 denote the body portions of the state transition rule.

According to the example of FIG. 41, the body portions are written by using functional names such as "func1( )", "func2( )", "func3( )", and "func4( )". The respective body portions are defined and stored as user defined functions in separate locations. The state transition unit (400) is to call those functions.

Alternatively, it is possible to define procedures in the body portions instead of calling the defined functions.

A series of operations for previously predefining and storing the state transition rule prior to executing the system is now discussed.

In step S429, a specific data field to be a trigger for starting a state transition operation and a specific value to be a trigger for starting a state transition operation are set.

For example, with a field called "escalation status", a value, "OPEN", selected from among the possible values that the field becomes is specified in the conditional portion of the state transition rule.

The conditional portion 441 of the state transition rule of FIG. 41 may exemplify the above case.

Next, in the step S430, an event for igniting the state transition rule is defined and established a correspondence with the state transition rule. This established correspondence is established in the event control unit (399).

The following is some concrete examples of a correspondence established between an event and the state transition rule.

(1) AS a time interval for monitoring data as a timer event, 60 seconds is set as an event name, "interval".

(2) As an event of updating the contents of the data base of the business application, an update event is set as an event name, "HOLDED".

(3) As an event of receiving new data through the communication control unit (35), a new arrival event is set an event name, "OPENED".

These event names are to be set in the event control unit (399) as the triggers for starting state transition operations.

In the example of FIG. 41, the event name is defined as "HOLDED" with the condition portion 441 of the state transition rule.

Then, in the step S431 of the flow chart of FIG. 39, a state transition operation is set in the body portion of the state transition rule memory. In FIG. 41, the user defining function call, "func3( )", is shown in the body portion 446 of the state transition rule. That is all required to be defined previously prior to executing the system.

An operation for processing the state transition is now discussed with reference to FIG. 40.

In the step S432 of FIG. 40, the event control unit (399) is initialized so as to clear the previously received event.

Next, in the step S433, the event control unit (399) starts to monitor the value of a specific data field which is predefined in the step S430. The specific data field to be monitored will be referred to hereinafter as a monitoring data field.

Then, in the step S434, it is judged whether or not the event control unit (399) has received an event. In the case that the event control unit (399) has received an event, it is indicated that the value of monitoring data field in the step 433 becomes a predetermined value. In the case that the event control unit (399) has not received an event, then the operation goes back to the step S432.

In the case that an event has been received, the value of the monitoring data field is obtained, when required, in the step S435. The event control unit (399) notifies the state transition control unit (400) of event information including the received event, the monitoring data field and the value of the monitoring data field.

Then, the state transition control unit (400) retrieves the conditional portion of the state transition rule in the step S436.

Now in the step S437, it is judged whether or not there is the state transition rule corresponding to the received event. With no state transition rule corresponding to the received event, the operation goes back to the step S432. With the state transition rule corresponding to the received event, the body portion of the corresponding state transition rule is executed.

In the step S428, it is judged whether or not the system is terminated as a result of executing the body portion of the corresponding state transition rule.

If the system is judged to have been terminated, then the processing is stopped. If the system is not judged to have been terminated, then the operation goes back to the step S432 to repeat the aforementioned series of operations.

As aforementioned, the inter-application data transmitting system of this embodiment is characterized with the state transition control unit for controlling the processing of state transition and the state transition rule memory for storing the state transition rule. Specifically, the state transition control unit sets the state transition rule which defines previously a specific monitoring data field and the corresponding state transition operation to be executed when the value of the specific monitoring data field is changed, monitors the value of the specific monitoring data field when the system is in operation, selects an appropriate state transition rule to be executed when the value of the specific monitoring data field becomes the preset value, and executes the state transition operation defined in the state transition rule.

As an effect of the inter-application data transmitting system of this embodiment, the state of the system may be changed in a prompt manner in response to a received event.

Embodiment 16

A sixteenth embodiment of the present invention introduces an inter-application data transmitting system which is provided with an application dependent rule generation unit. The application dependent rule generation unit automatically generates an application dependent rule prior to initiating the operation of the inter-application data transmitting system.

According to this embodiment, the application dependent rule includes the data format conversion rule, the state transition rule, and a component arrangement rule which will be described later in detail. However, the application dependent rule is not limited to the above mentioned rules. The application dependent rule may be anything that defines a rule which is dependent on business application. Therefore, the application dependent rule may include the access procedure rule, for example.

Figure 42:
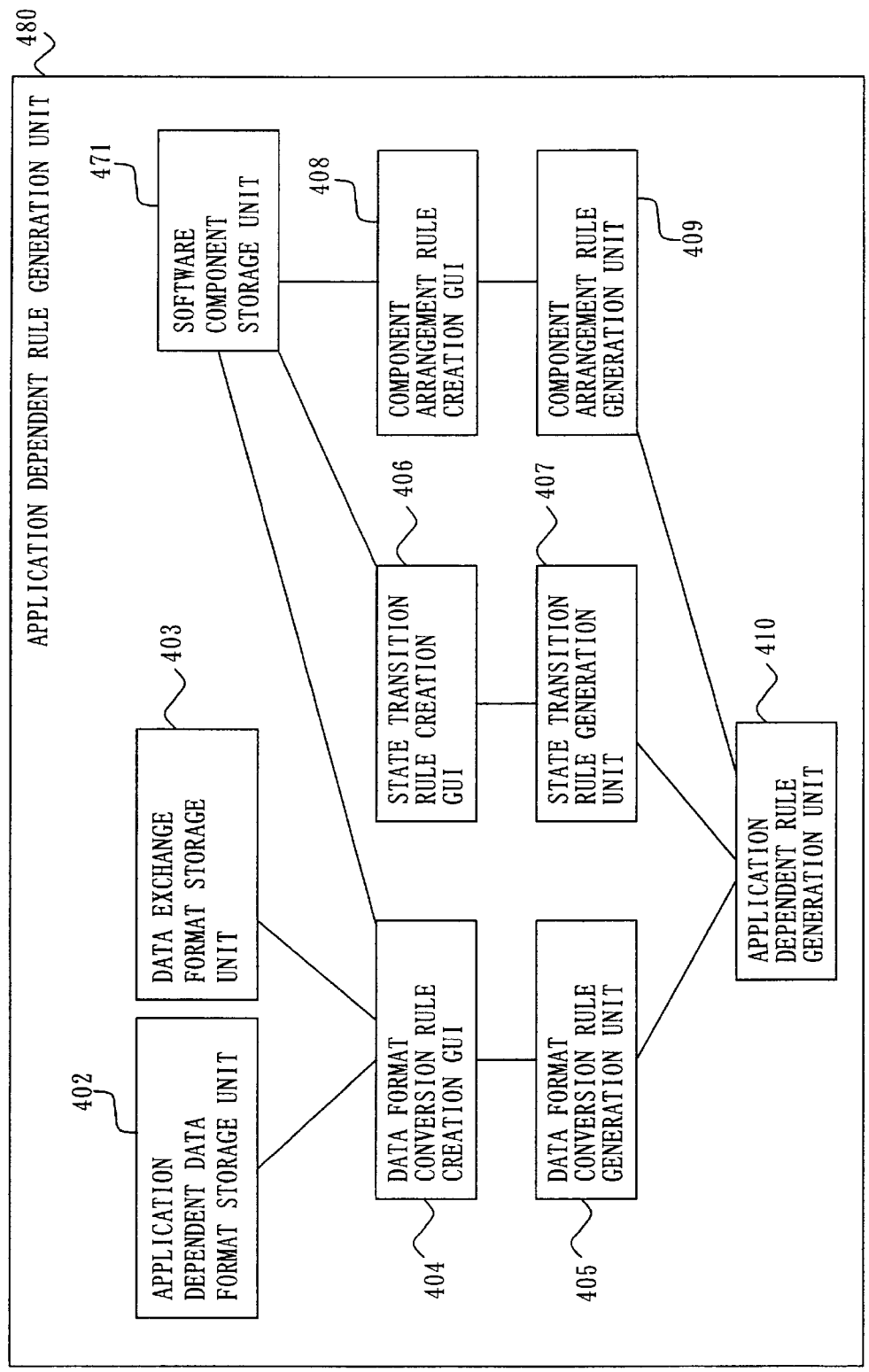
FIG. 42 shows a block diagram of an application dependent rule generation unit for automatically generating an application dependent rule according to the present invention.

FIG. 42 shows a block diagram of an example of the application dependent rule generation unit according to the sixteenth embodiment of the present invention.

Referring to FIG. 42, a reference numeral 480 denotes the application dependent rule generation unit.

A reference numeral 402 denotes an application dependent data format storage unit for storing the application dependent data format.

A reference numeral 403 denotes a data exchange format storage unit for storing the data exchange format.

In the following descriptions, the application dependent data format which is stored in the application dependent data format storage unit (402) is referred to as the application dependent data format (402). Similarly, the data exchange format which is stored in the data exchange format storage unit (403) is referred to as the data exchange format (403).

A reference numeral 404 denotes a data format conversion rule creation GUI (Graphical User Interface)(a data format conversion rule creation interface). The data format conversion rule creation GUI (404) establishes a correspondence between the application dependent data format (402) and the data exchange format (403) on a visualized model and creates a conversion rule model (conversion corresponding information) to be used for defining the data format conversion rule.

A reference numeral 405 denotes a data format conversion rule generation unit which generates a file in a format storable as the data format conversion rule based on the conversion rule model which is defined in the data format conversion rule creation GUI (404).

A reference numeral 406 denotes a state transition rule creation GUI (a state transition rule creation interface). The state transition rule creation GUI (406) defines the state transition rule on a screen on which a visualized state transition model is displayed, thereby creating the state transition model.

A reference numeral 407 denotes a state transition rule generation unit. The state transition rule generation unit (407) generates a file in a storable format as the state transition rule based on the state transition model created in the state transition rule generation GUI (406).

A reference numeral 471 denotes a software component storage unit. The software component storage unit (471) stores software components corresponding to the elements of the application intermediary unit such as the state transition control unit, the access procedure control unit, the data format conversion unit and the communication control unit.

The component arrangement rule defines the software components and the arrangement thereof.

A reference numeral 408 denotes a component arrangement rule creation GUI (a component arrangement rule creation interface). The component arrangement rule creation GUI (408) establishes a correspondence between the software components and the arrangement thereof on a visualized component arrangement model, thereby creating an arrangement rule model to be used for defining the component arrangement rule.

A reference numeral 409 denotes a component arrangement rule generation unit. The component arrangement rule generation unit (409) generates a file in a storable format as the component arrangement rule based on the arrangement rule model created in the component arrangement rule creation GUI (408).

A reference numeral 410 denotes an application dependent rule generation unit. The application dependent rule generation unit (410) receives files generated by the data format conversion rule generation unit (405), the state transition rule generation unit (407) and the component arrangement generation unit (409). The application dependent rule generation unit (410) then examines the formats of the respective files received, thereby generating the application dependent rule executable when the inter-application data transmitting system is in execution.

The application dependent rule is written, for example, in a script language which is interpreted and executed when the inter-application data transmitting system is in execution, or in a programming language which is compiled and executed. The written application dependent rule is stored as a source file. In the case of writing the application dependent rule in a programming language, the format of the application dependent rule is required to be converted into an executable format by means of a compiler applicable to the specific programming language among various compilers applicable to various types of programming languages.

Figure 43:
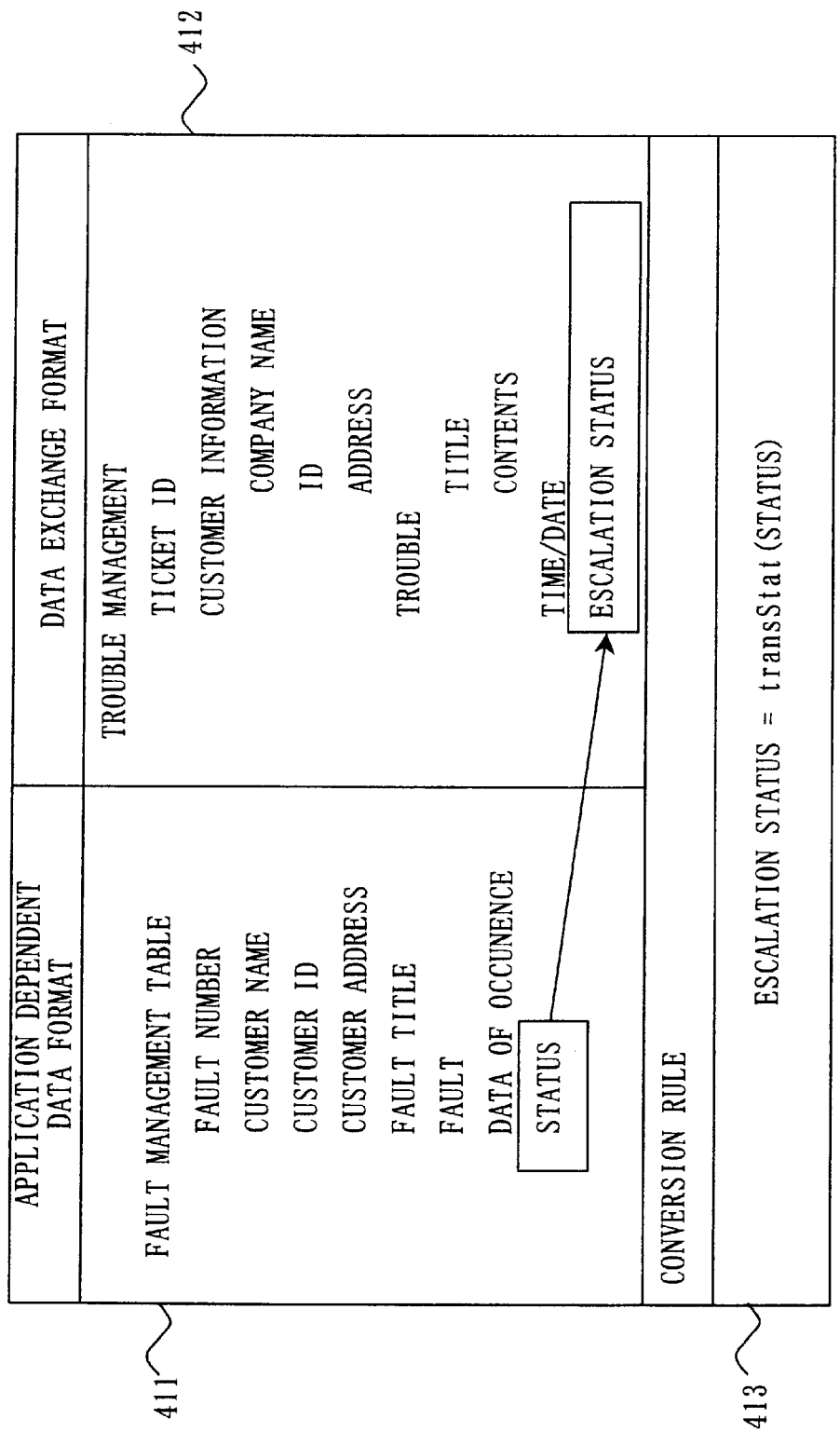
FIG. 43 shows diagram of a screen 1 of an application dependent rule generation according to the present invention.

FIG. 43 shows an example of the screen of the data format conversion rule creation GUI (404) of the sixteenth embodiment.

Referring to FIG. 43, a reference numeral 411 denotes an application data format display screen. A reference numeral 412 denotes a data exchange format display screen and a reference numeral 413 denotes a conversion rule definition screen.

Figure 44:
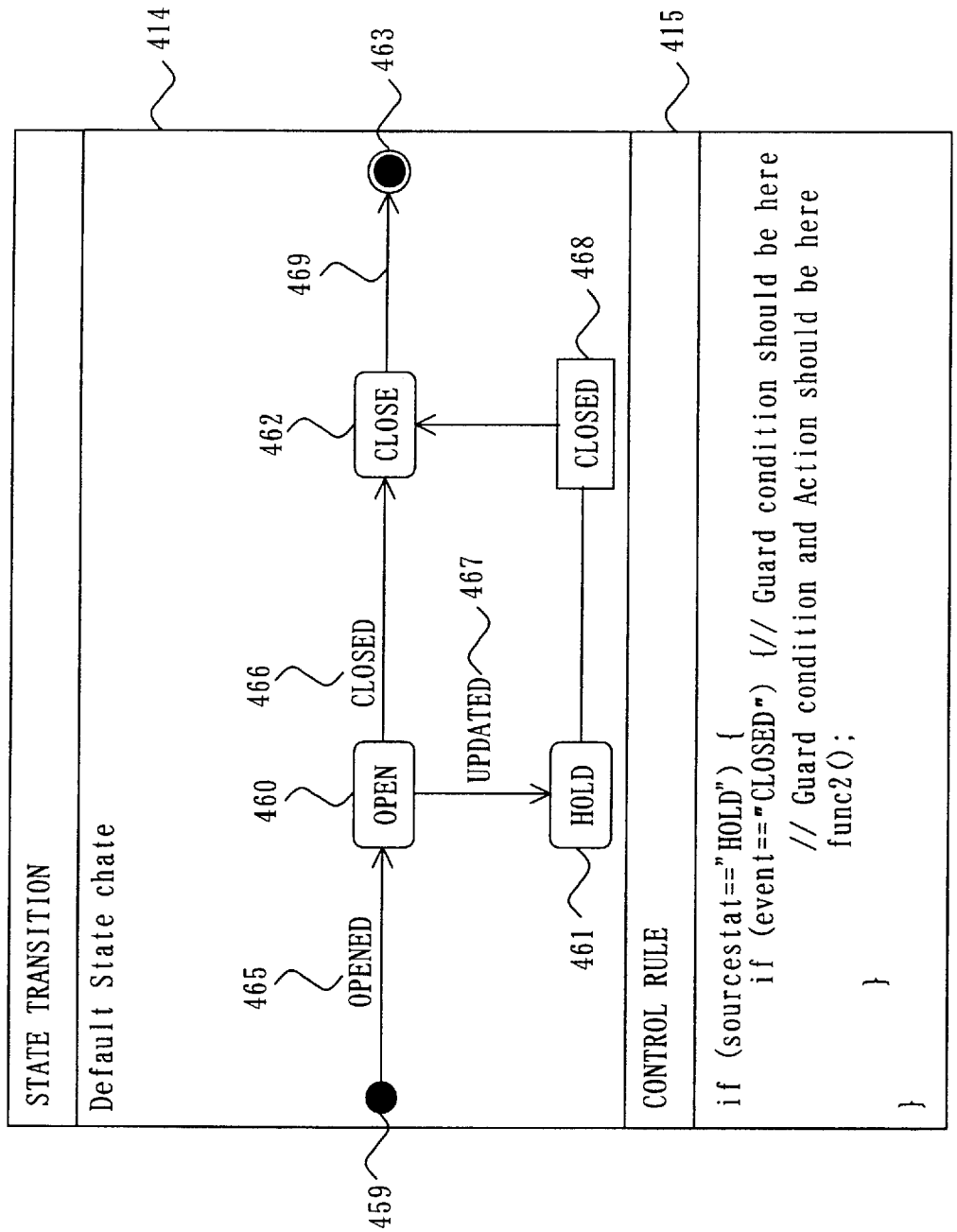
FIG. 44 shows a diagram of a screen 2 of the application dependent rule generation according to the present invention.

FIG. 44 shows an example of the screen of the state transition rule creation GUI (406) of the sixteenth embodiment of the present invention. A reference numeral 414 denotes a state transition definition screen and a reference numeral 415 denotes a state transition rule definition screen. A reference numeral 459 through a reference numeral 463 show state node symbols indicating various states. Specifically, the reference numeral 459 denotes an "initial state". A reference numeral 460 denotes an "OPEN state". A reference numeral 461 denotes a "HOLD state". A reference numeral 462 denotes a "CLOSE state". The reference numeral 463 denotes a "termination state".

A reference numeral 465 through a reference numeral 469 denote link symbols represented by a state transition line (a link line) with an arrow indicating the state transition for changing a status. In other words, a state node symbol at the root of the arrow of a line symbol indicates a state before a change in a state by a state transition operation and a state node symbol at the head of the arrow of the line symbol indicates a state after the change in the state by the state transition operation. For example, the link symbol 465 indicates that the state of the state node symbol 459 changes to the state of the state node symbol 460 upon reception of an event "OPENED".

The example of this diagram is based on a standard notation language UML (Unified Modeling Language)of an object oriented analysis design which is defined by the Object Management Group (OMG), an organization for standardization. Alternatively, however, any notation method may be applied to this embodiment as long as the notation method is designed for representing the change in state or state transition in the same manner as that mentioned above.

Figure 45:
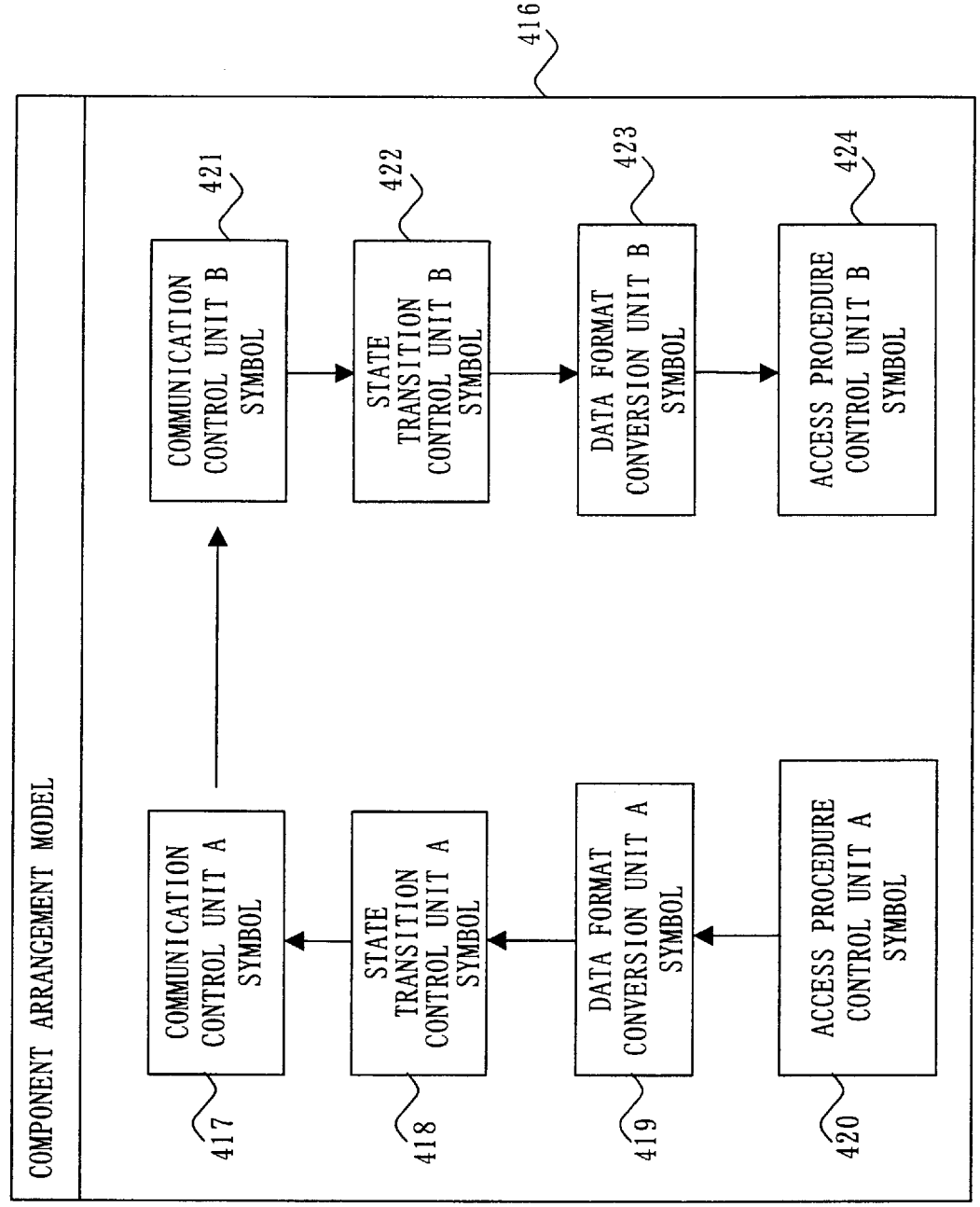
FIG. 45 shows a diagram of a screen 3 of the application dependent rule generation according to the present invention.

FIG. 45 shows an example of the display screen of the component arrangement rule creation GUI (408). Referring to FIG. 45, a reference numeral 416 denotes a component arrangement model display screen. A reference numeral 417 denotes a communication control unit A symbol. A reference numeral 418 denotes a state transition control unit A symbol. A reference numeral 419 denotes a data format conversion unit A symbol. A reference numeral 420 denotes an access procedure control unit A symbol. A reference numeral 421 denotes a communication control unit B symbol. A reference numeral 422 denotes a state transition control unit B symbol. A reference numeral 423 denotes a data format conversion unit B symbol. A reference numeral 424 denotes an access procedure control unit B symbol.

With reference to the above mentioned example of the display screen of the component arrangement rule creation GUI (408) of FIG. 45, the symbol 417 through the symbol 420 being labeled with "A" in their names represent the elements, respectively, of the business application system A of FIG. 1, for example. Similarly, the symbol 421 through the symbol 424 which are labeled with "B" represent the elements, respectively, of the business application system B of FIG. 2, for example.

Figure 46:
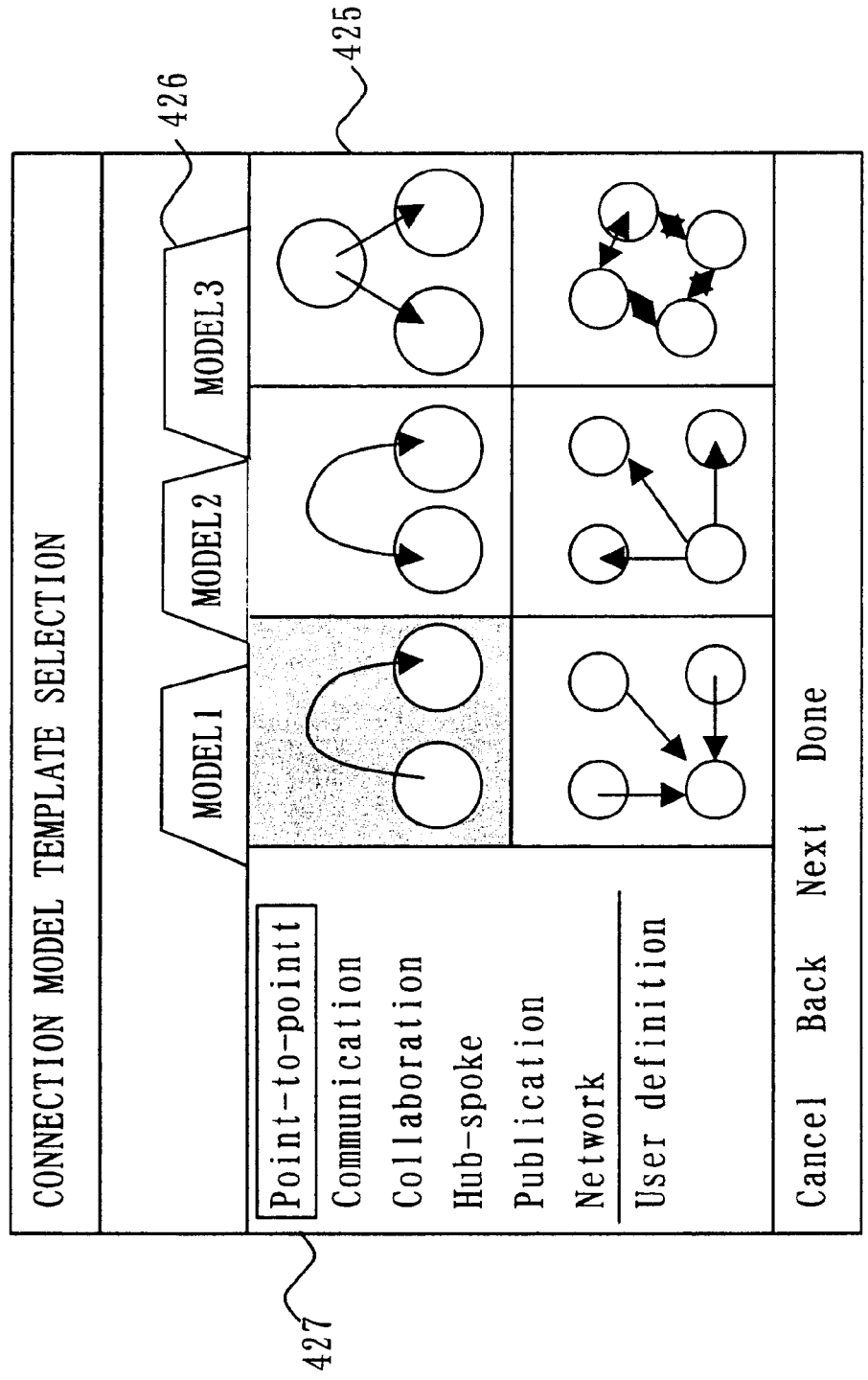
FIG. 46 shows a diagram of a screen 4 of the application dependent rule generation according to the present invention.

FIG. 46 shows an example of a menu and thumb-nail screen to be used for selecting the template of the connection model to be used for the inter-application data transmitting system. A reference numeral 425 denotes a connection model template selection display screen.

With the example of the connection model template selection display screen 425 of FIG. 46, typical connection models to be used for the inter-application data transmitting system such as a Point-to-point connection model and a Hub-spoke connection model may be registered previously as the templates so that those connection models are to be selected in an easy manner only by choosing the icons of the connection models which are displayed on the menu screen or on the thumb-nail screen.

Figure 47:
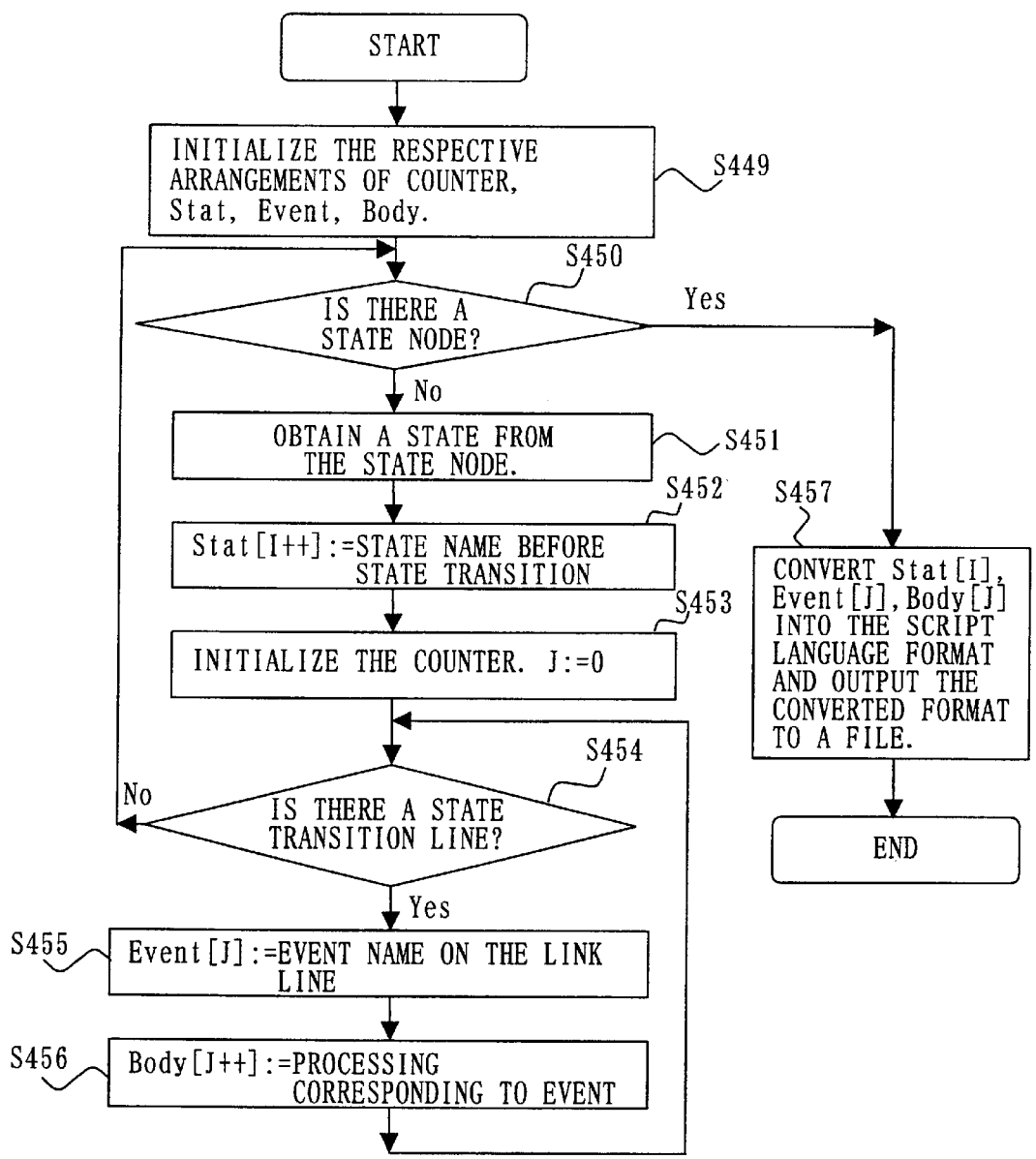
FIG. 47 shows a flow chart illustrating a series of operations for generating the application dependent rule according to the present invention.

FIG. 47 is a flow chart illustrating an operation for automatically generating the state transition rule of this embodiment.

Now, an operation of the application dependent rule generation unit of this embodiment is discussed with reference to FIG. 42, FIG. 43, FIG. 44, FIG. 45, FIG. 46 and FIG. 47.

Initially, a user specifies on the screen the arrangement of the software components of the inter-application data transmitting system desired based on the component arrangement rule creation GUI of FIG. 42.

The component arrangement rule differs from each other depending on the type of the business application to be connected. For that reason, connection types and the typical models of the component arrangement rule may be registered in advance so that a connection model is to be selected on the connection model template selection display screen of FIG. 46.

In the case that the type of the connection model is classified by the type of Run Time System such as OS (Operation System), the type of connection model may be registered in a folder with a tag (426) so as to be called out easily on the screen.

In the folder, such simplified symbols for identifying the connection models as those shown in the connection model template selection display screen 425 may be displayed in a pallet so as to be selected in an easy manner by means of an input device such as the mouse. In addition to that, a text menu screen 427 may be used for selecting the type of the connection model.

The component arrangement rule creation GUI (408) reads in a corresponding template of a connection model corresponding to the selected connection model and displays the template of the connection model on the screen as shown in FIG. 45 as an example.

The user edits the connection model of the displayed components, thereby determining the arrangement of the displayed components.

Subsequently, the user enters an instruction to generate the application dependent rule based on the determined arrangement of the components.

Upon reception of the instruction from the user, the component arrangement rule generation unit (409) converts the determined arrangement of the components into a script language format or a programming language format, thereby generating a file in an executable format or in a format which can be compiled.

The component arrangement rule generation unit (409) outputs the generated file to the application dependent rule generation unit (410).

Furthermore, the user specifies the data format conversion unit A symbol (419) on the component arrangement model display screen (416) of FIG. 45 by means of an input device such as the mouse, thereby initiating the generation of the data format conversion rule through the data format conversion rule generation GUI (404). In the same manner, an operation for generating the state transition rule is initiated.

Upon reception of the instruction from the user, the data format rule generation unit GUI (404) displays the application dependent data format (402) and the data exchange format (403) on the screen.

As for the display format on the screen, it is desirable to employ a simple structure such as a tree format for an easy understanding.

Then, a correspondence between fields is established on the screen of the data format conversion rule creation GUI (404). For example, as shown in FIG. 43, a correspondence is to be established between the field names of "status" of the application dependent data format (401) and "escalation status" of the data exchange format (402), in the case that the two field have the same meaning.

A shown in FIG. 43, the correspondence may be established between the field names by connecting the corresponding fields with a line by means of the mouse or the like. In the case that the value of the "status" used by the business application is required to be converted into the value of the "escalation status" explicitly as the data in the data exchange format, the conversion rule model is to be defined by specifying such a correspondence as "escalation status =transStat (status)" on the conversion rule definition screen (413).

This "transStat" indicates a function name to be used for converting a possible value of the "status" field of the data of the business application into the value of the "escalation status" having the same meaning as the data in the data exchange format. The type of function to be used for conversion depends on a function supported by a script language or a programming language supported by the data format conversion rule.

Additional functions may be provided as the library of script and programming languages. In that case, those functions may be specified in the conversion rule model.

This example indicates the case that a function "transStat( )" to be used for conversion is defined in advance.

Referring to FIG. 43, the arrow represents a direction of conversion which indicates the conversion rule to be used for converting data in the application dependent data format into the data in the data exchange format.

Similarly, with the inversion rule to be used for inverting data in the data exchange format into the data in the application dependent data format, the conversion rule model is to be defined.

As an example, an arrow may be drawn from the "escalation status" of data in the data exchange format to the "status" of the data in the application dependent data format for connection. On the conversion rule definition screen (413), such a specification as "status=revTransStat (escalation status)" is to be made.

The revTransStat is a function, like the transstat mentioned above, to be used for converting the possible value of the "escalation status" field of data in the data exchange format into the value of the "status" field of the data in the application dependent data format having the same meaning as that of the escalation status filed. The function, revTranssStat, is to be defined as an add-on function in advance.

Then, the data format conversion rule generation unit (405) converts the conversion rule model defined through the data format conversion rule creation GUI (404) into a script language format or a programming language format, thereby generating a file in an executable format or a format which can be compiled. The data format conversion rule generation unit (405) outputs the generated file to the application dependent rule generation unit (410).

Subsequently, the user creates the state transition model through the state transition rule creation GUI (406). As an example, a state transition diagram is defined and edited on the state transition definition screen (414) as shown in FIG. 44.

Then, a state transition name is selected on the screen by means of an input device such as the mouse.

The example of FIG. 44 shows a status in which the state transition name of "CLOSED" (468) has been selected. On the state transition rule definition screen (415), a logic, which is shown as an example in FIG. 48, may be displayed automatically.

The user edits this logic as required. For example, as shown in FIG. 44, "func2( )" may be added to the logic so that the logic is changed to a logic shown in FIG. 49.

With the example of FIG. 44, the control rule is defined based on a script language, but alternatively, another script language or a programming language may be used for defining the control rule.

In that manner, the user creates the state transition model through the state transition rule creating GUI (406).

Then, the state transition rule generation unit (407) converts the created state transition model into a script language format or a programming language format, thereby generating a file in an executable format or a format which can be compiled. The state transition rule generation unit (407) outputs the generated file to the application dependent rule generation unit (410).

Now, an operation for automatically generating the state transition rule based on the state transition model created through the state transition rule creation GUI (406) is discussed with reference to FIG. 47.

The diagram of state transition displayed on the state transition definition screen (414) of FIG. 44 is treated as a state transition model in a tree structure. The state transition model is processed by starting the tree structure from a root node, or normally, from the "initial state" 459.

To start with, in a step S449, a counter I is initialized, and the respective arrangements of Stat, Event, and Body are initialized. The Stat, Event, and Body are arrangement data areas to be used in the state transition rule.

Then, in a next step S450, it is judged whether or not there is any state node symbol in the tree structure without being processed. In the case of no state node symbol being left unprocessed, then the operation proceeds to a step S457 in which the values of the Stat arrangement, the Event arrangement, and the Body arrangement are converted into the state transition rule in the script language such as the example of FIG. 41 and outputted to a file. This terminates the operation. Alternatively, however, the state transition rule may be converted into the programming language instead of the script language.

In the case of a state node symbol being left unprocessed in the tree structure, the operation proceeds to a next step S451 in which the state node symbol is obtained and then a flag indicating that the state node symbol has been obtained is set. In a next step S452, the state name of the obtained state node symbol is set in Stat [I] as a previous state name of the obtained state node symbol before state transition, and then the counter I is incremented by 1 (one). Then, in a next step S453, a counter J is set to zero for initialization. In a next step S454, it is judged whether or not there is any state transition line extending from the state node symbol.

In the case of no state transition line extending from the state node symbol, the operation goes back to the step S450, in which the above mentioned series of operations are repeated with remaining state node symbols being left unprocessed in the tree structure.

In the case of a state transition line being left unprocessed, the event name of the unprocessed state transition line is set in the Event [J] in a next step S455. Then, in a next step S456, a state transition operation applied to an event when it occurs is set in Body [J]. The state transition operation to be set in the Body [J] has been defined on the state transition rule definition screen (415) of FIG. 44 such as "func2( )". In addition to that, the counter J is incremented by 1 and then a flag is set for indicating that this state transition line has been processed.

Then, the operation goes back to the step S454 and a series of the aforementioned operations of the step S455 to the step S456 are repeated until no state transition line is found unprocessed.

Subsequently, the application dependent rule generation unit (410) examines files outputted from the component arrangement rule generation unit (409), the data format conversion rule generation unit (405), and the state transition rule generation unit (407) to see if those files each are in a format applicable to the application dependent rule and executable or can be complied. As a result of the examination, if there is a problem, the application dependent rule generation unit (410) informs the user of the problem by indicating an alarm or error. Upon reception of the information, the user can correct a portion causing the problem based on the information, and in that case, the application dependent rule generation unit (410) examines those files again???. The problem may be removed through the same procedures as those of the data format conversion rule generation procedures or the state transition rule generation procedures discussed above.

A finally obtained application dependent rule after the problem is removed is used with no processing when the inter-application data transmitting system is in execution in the case of the application dependent rule created by using a script language. In the case, however, that the application dependent rule is created by using a programming language requiring compilation to the executable format, the application dependent rule is required to be converted into the executable format through compilation by using a compiler designed for the specific programming language.

As aforementioned, the application dependent rule generation unit of this embodiment defines an application dependent data format and application dependent procedures so as to be applicable to each different business application as the application dependent rule designed for a specific business application. The application dependent rule includes the state transition rule, the data format conversion rule, the application dependent rule, and the communication control rule. This allows for ease in customizing the application dependent rule depending on each different inter-application data transmitting system. In addition to that, this allows the application dependent rule to be used on the screen of a development tool which is provided with the visualized models??? of GUI (a Graphical User Interface). An executable program may be automatically generated based on a created visualized model.

Thus, as an effect of the inter-application data transmitting system of this embodiment, the application dependent rule may be generated in a easy manner.

Embodiment 17

Figure 50:
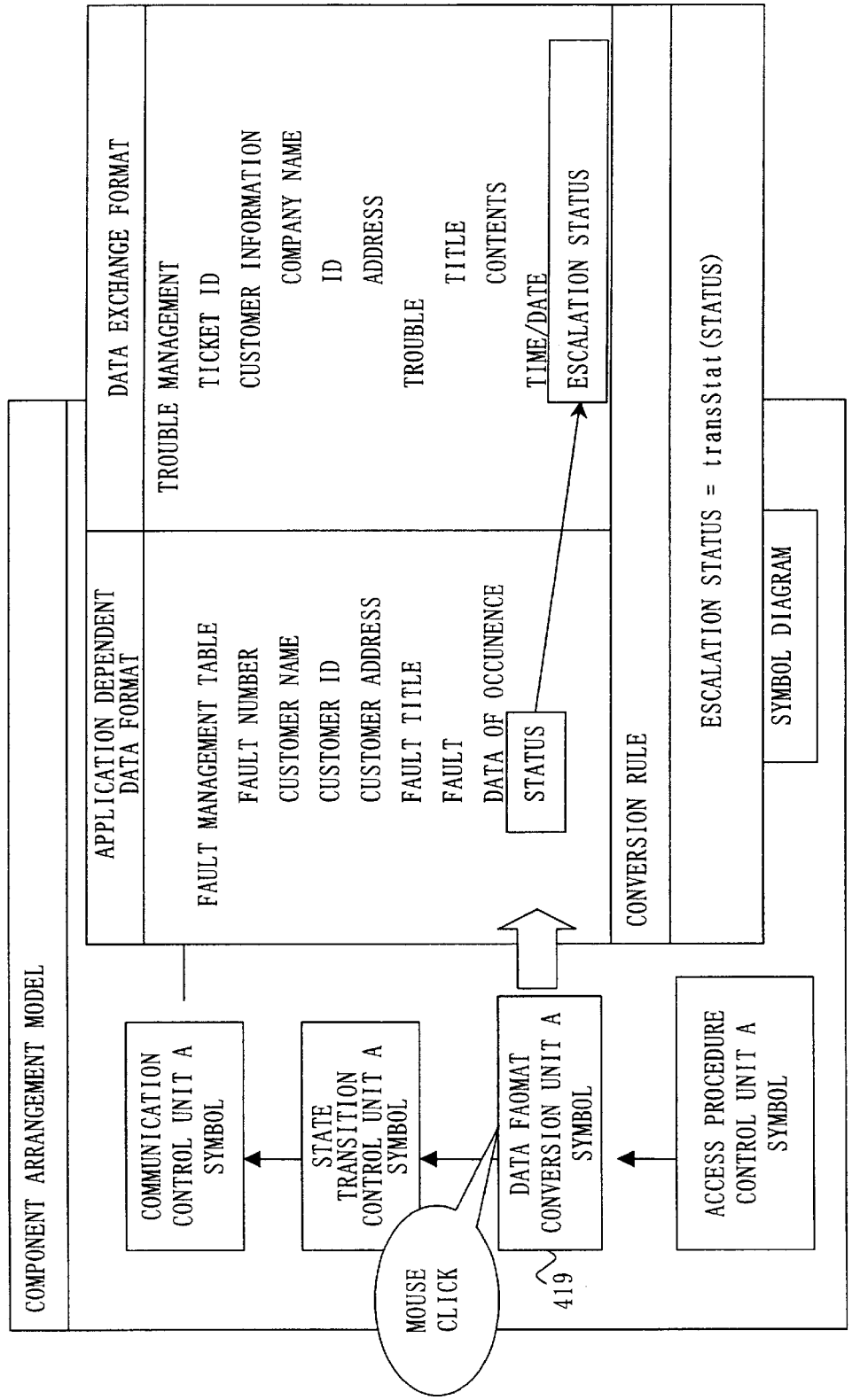
FIG. 50 shows a diagram of a screen on which a data format conversion rule creation GUI provided in a software component is called out of a component arrangement rule creation GUI.

FIG. 50 shows an example of a screen on which a customizing function of a software component itself is called out of an outside program.

FIG. 50 shows the example that the software component which is supplied through the component arrangement rule creation GUI (408) is provided with the function of customizing the application dependent rule which is to be used by the software component in an operation for automatically generating the application dependent rule which is discussed in the sixteenth embodiment.

The diagram of FIG. 50 exemplifies that the data format conversion A symbol (419) is provided with the data format conversion rule creation GUI (404).

For that reason, the data format conversion rule creation GUI (404) is to be called out of the component arrangement rule creation GUI (408).

According to the example of FIG. 50, the screen of the data format conversion rule creation GUI is displayed by specifying the data format conversion A symbol (419) being displayed on the component arrangement by clicking the mouse or the like.

Figure 51:
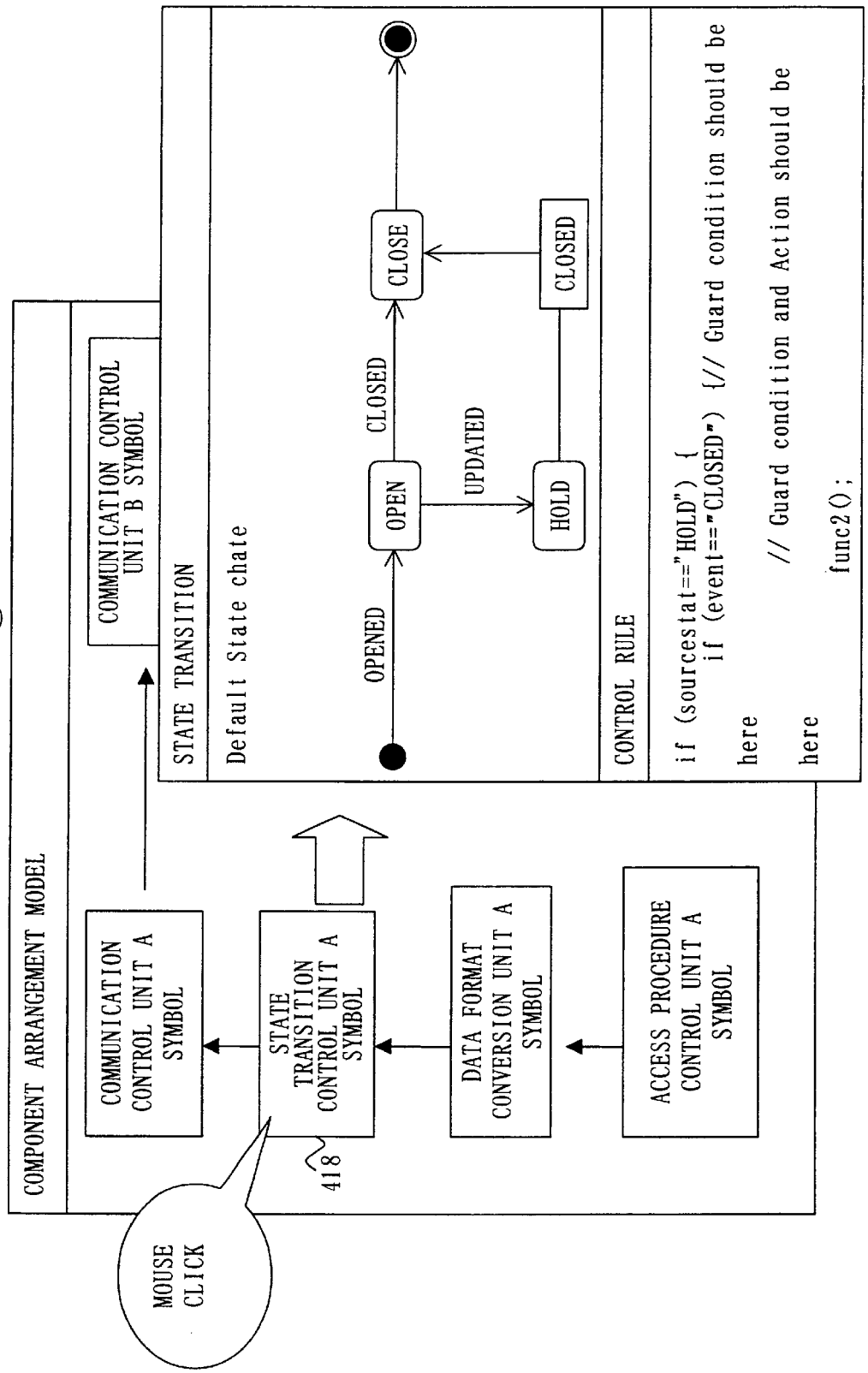
FIG. 51 shows a diagram of a screen on which a state transition rule creation GUI provided in the software component is called out of the component arrangement rule creation GUI.
Figure 52:
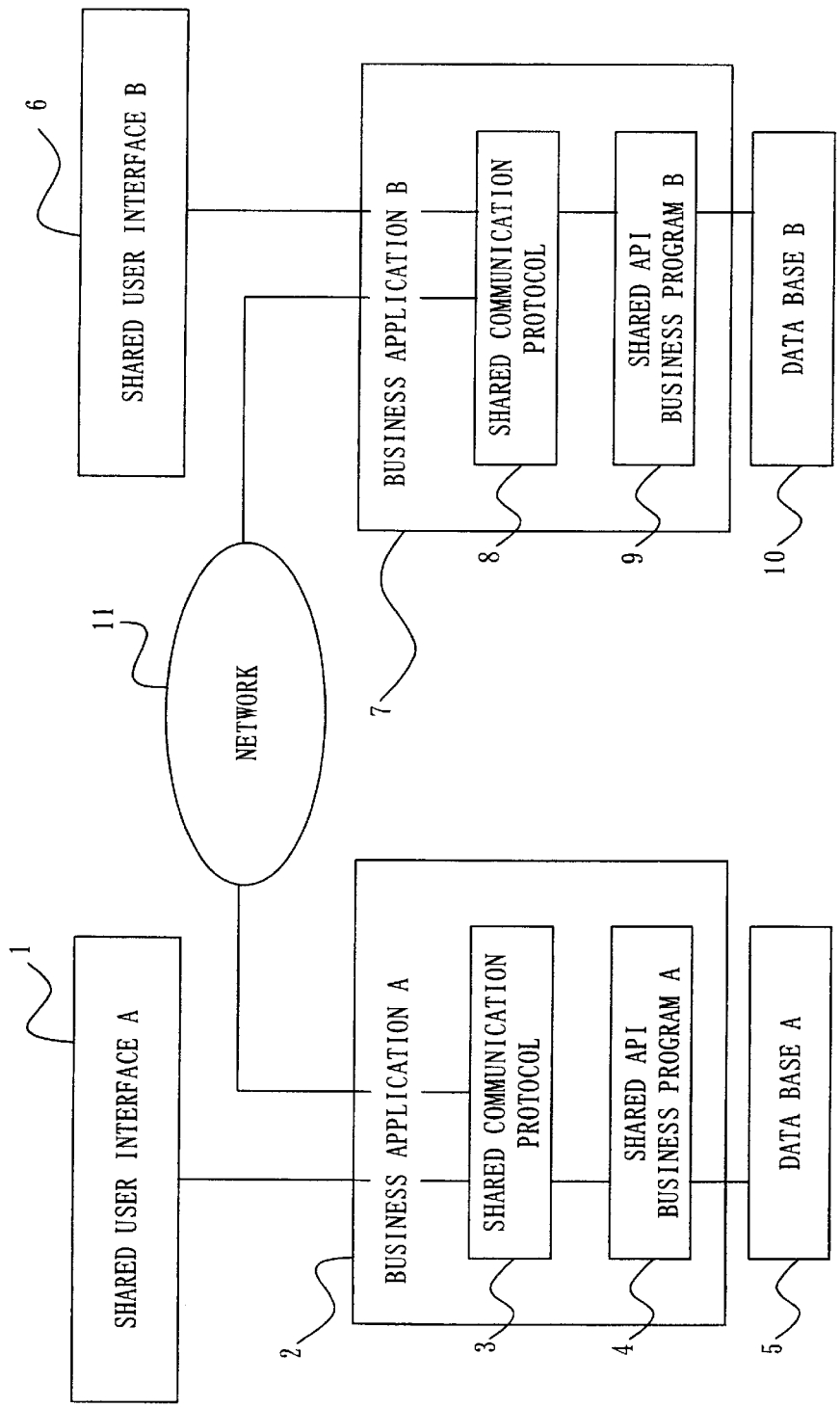
FIG. 52 shows a conventional system configuration for exchanging data among business applications.

FIG. 51 shows another screen similar to that of FIG. 50, on which the customizing function of a software component itself is called out of an external program.

The diagram of FIG. 51 exemplifying that the state transition control unit A symbol (418) is provided with the state transition rule creation GUI (406).

According to the example of FIG. 51, the screen of the state transition rule creation GUI is displayed by specifying the state transition control A symbol (418) being displayed on the component arrangement model by clicking the mouse or the like.

As aforementioned, according to the application dependent rule generation unit of this embodiment, the respective software components are provided each with the function for customizing the self in advance, and the customizing function is allowed to be called through an external program. The application dependent rule generation unit of this embodiment is characterized with the function that a required specification is specified through a Graphical User Interface (GUI) for designing the inter-application data transmitting system, and required components for the implementing inter-application data transmitting system are selected and arranged.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inter-application data transmitting system for exchanging data among a plurality of applications interconnected over a network, the plurality of applications each storing the data in a predetermined application dependent data format, the inter-application data transmitting system comprising an application intermediary unit for mediating the data to be transmitted between the network and one of the plurality of applications, wherein the application intermediary unit includes, an application control unit for controlling a transmission of the data between the one of the plurality of applications and the application intermediary unit, an access procedure rule memory for storing an access procedure rule which defines a procedure to be used for gaining access to the data stored in the one of the plurality of applications, an access procedure control unit, controlled by the application control unit, for gaining access to the data stored in the one of the plurality of applications in accordance with the access procedure rule stored in the access procedure rule memory, a data format conversion rule memory for storing a data exchange format which is a data format predefined to be used for exchanging the data among the plurality of applications interconnected over the network, and further storing a data format conversion rule to be used for converting at least one of an application dependent data format of the data stored in the one of the plurality of applications which is accessed by the access procedure control unit into the data exchange format and the data exchange format into the application dependent format of the data stored in the one of the plurality of applications, a data format conversion unit for converting the data from one data format to another based on the data format conversion rule stored in the data format conversion rule memory, a communication control rule memory for storing a communication control rule which defines a communication rule, and a communication control unit for controlling a transmission over the network of converted data in the data exchange format which is converted by the data format conversion unit based on the communication control rule stored in the communication control rule memory.

2. The inter-application data transmitting system of claim 1, wherein the application control unit includes a monitoring area table for setting data stored in the one of the plurality of applications which is required to be notified to another one of the plurality of applications as data to be notified, for setting a processing request status which indicates an occurrence of the data to be notified, and for setting a data area of data to be monitored stored in the one of the plurality of applications which is monitored by the application control unit and also setting a data value of the data area in response to the processing request status, and wherein the application control unit detects the processing request status being set in the monitoring area table, and outputs an instruction corresponding to a detected processing request status to the access procedure control unit.

3. The inter-application data transmitting system of claim 2, wherein the access procedure rule memory stores the access procedure rule corresponding to the processing request status, and wherein the access procedure control unit detects the access procedure rule corresponding to the processing request status stored in the access procedure rule memory based on the instruction received from the application control unit, and gains access to the data stored in the one of the plurality of applications in accordance with a detected access procedure rule.

4. The inter-application data transmitting system of claim 2, wherein the application control unit monitors the data area and the data value of the data area being set in the monitoring area table regularly and so as to detect the processing request status.

5. The inter-application data transmitting system of claim 3, wherein the application control unit sets the processing request status including a plurality of types of the processing request status, wherein the access procedure rule memory stores a plurality of access procedure rules corresponding to the plurality of processing request status types, and wherein the access procedure control unit selects an access procedure rule corresponding to one of the plurality of processing request status types from among the plurality of access procedure rules based on the instruction received from the application control unit, and gains access to the data stored in the one of the plurality of applications in accordance with a selected access procedure rule.

6. The inter-application data transmitting system of claim 2, wherein the plurality of applications includes a first application and a second application, wherein the first application is provided with a first application intermediary unit between the network and the first application, and the second application is provided with a second application intermediary unit between the network and the second application, wherein the application control unit of the first application intermediary unit detects the processing request status and transfers the data to the second application intermediary unit based on a detected processing request status, and wherein the second application intermediary unit writes a transferred data from the first application intermediary unit as data to be stored by the second application.

7. The inter-application data transmitting system of claim 1, wherein the communication control rule memory stores the communication control rule corresponding to each of the plurality of applications interconnected over the network which the one of the plurality of applications exchanges the data with.

8. The inter-application data transmitting system of claim 1, wherein the communication control rule memory stores the communication control rule having a rule based on data priority which defines a priority of the data to be transmitted from the one of the plurality of applications to another one of the plurality of applications.

9. The inter-application data transmitting system of claim 1, wherein the communication control rule memory stores the communication control rule including a rule for communication time defining a time for transmitting data from the one of the plurality of applications to another one of the plurality of applications.

10. The inter-application data transmitting system of claim 1, wherein the communication control rule memory stores the communication control rule including an authentication system for authenticating the application intermediary unit of another one of the plurality of applications with which the data of the one of the plurality of applications is exchanged.

11. The inter-application data transmitting system of claim 1, wherein the communication control rule memory store the communication control rule including a cryptographic system through which data is to be enciphered for transmission from the one of the plurality of applications to another one of the plurality of applications.

12. The inter-application data transmitting system of claim 2, wherein the application control unit, upon reception of a notification of the processing request status of the data stored in the one of the plurality of applications, outputs an instruction to gain access to the data stored in the one of the plurality of applications to the access procedure control unit in response to a notified processing request status from the one of the plurality of applications.

13. The inter-application data transmitting system of claim 1, wherein the plurality of interconnected applications each is provided with the application intermediary unit, and wherein the communication control unit includes, a mobile agent, including a program and the converted data in the data exchange format, for moving among the communication control units of the application intermediary units provided for the plurality of applications interconnected over the network, and a mobile agent platform for specifying the communication control unit which the mobile agent is to move towards.

14. The inter-application data transmitting system of claim 13, wherein the communication control unit determines whether the mobile agent is used for transmitting the data based on the communication control rule.

15. The inter-application data transmitting system of claim 1, wherein the application intermediary unit includes a communication control rule entry interface unit for entering the communication control rule to be stored in the communication control rule memory.

16. The inter-application data transmitting system of claim 2, wherein the data format conversion rule memory stores a plurality of data format conversion rules corresponding to the plurality of interconnected applications to which data is to be transmitted, and wherein the application control unit selects the plurality of data format conversion rules based on the processing request status stored in the monitoring area table.

17. The inter-application data transmitting system of claim 1, wherein the application intermediary unit further includes an external data output unit, being connected with an external data storage device for storing external data, for outputting data in the data exchange format which is converted in the data format conversion unit.

18. The inter-application data transmitting system of claim 1, wherein the communication control unit exchanges data with another one of the plurality of applications through a mail server for receiving an electronic mail, the mail server being connected with the network.

19. A method for transmitting data to be exchanged among a plurality of applications interconnected over the network, the plurality of applications each storing the data in a predetermined application dependent data format, the method for transmitting data comprising:

mediating the data to be transmitted between the network and one of the plurality of applications, wherein mediating the data to be transmitted between the network and one of the plurality of applications includes controlling a transfer of the data stored in the one of the plurality of applications, storing an access procedure rule which defines a procedure to be used for gaining access to the data stored in the one of the plurality of applications, gaining access to the data stored in the one of the plurality of applications controlled in the step of controlling the transfer of the data stored in the one of the applications based on the access procedure rule stored in the step of storing the access procedure rule to the data stored, storing a data exchange format which is a data format predefined to be used for transmitting the data to be exchanged with the plurality of applications, and further storing a data format conversion rule to be used for converting at least one of the application dependent format depending on the one of the plurality of applications into the data exchange format and the data exchange format into the application dependent format depending on the one of the plurality of applications, converting the data in one data format to another based on the data format conversion rule stored in the step of storing the data exchange format and the data format conversion rule, storing a communication control rule which defines a communication rule, and controlling a transmission of the data in the data exchange format over the network in accordance with the communication control rule stored in the step of storing the communication control rule.

20. A computer readable storage medium having a computer readable program code stored therein for causing data to be exchanged among a plurality of interconnected applications over a network, the computer readable program code comprising:

a mediate code segment for causing a computer to mediate the data to be transmitted between the network and one of the plurality of applications;

wherein the mediate code segment includes, a control code segment for causing the computer to control a transfer of the data stored in the one of the plurality of applications, a storing code segment for causing the computer to store an access procedure rule which defines a procedure to be used for gaining access to the data stored in the one of the plurality of applications, a gaining access code segment for causing the computer to gain access to the data stored in the one of the plurality of applications controlled by the control code segment for causing the computer to control the transfer of the data stored in the one of the applications based on the access procedure rule stored by the storing code segment for causing the computer to store the access procedure rule to the data stored, a storing code segment for causing the computer to store a data exchange format which is a data format predefined to be used for transmitting the data to be exchanged with the plurality of applications, and further store a data format conversion rule to be used for converting at least one of the application dependent format depending on the one of the plurality of applications into the data exchange format and the data exchange format into the application dependent format depending on the one of the plurality of applications in another case, a conversion code segment for causing the computer to convert the data from one data format to another based on the data format conversion rule stored by the store code segment for causing the computer to store the data exchange format and the data format conversion rule, a storing code segment for causing the computer to store a communication control rule which defines a communication rule, and a control code segment for causing the computer to control a transmission of the data in the data exchange format over the network in accordance with the communication control rule stored by the storing code segment for causing the computer to store the communication control rule.

21. The inter-application data transmitting system of claim 1, wherein the application intermediary unit further includes, an event control unit for receiving an event which requests the application intermediary unit to respond to and for outputting a received event, a state transition rule memory for storing a state transition rule which defines a condition for transition which defines a condition for state transition for changing a state in response to the event and a processing item for the state transition corresponding to the condition for transition, and a state transition control unit for receiving the event from the event control unit, retrieving the state transition rule stored in the state transition rule memory based on a received event, thereby extracting the state transition rule including the condition for transition corresponding to the received event, and executing the processing item of an extracted state transition rule.

22. The inter-application data transmitting system of claim 21, wherein the event control unit monitors a predetermined data field, thereby detecting the event indicating that the data field meets a predetermined value, and outputting a detected event to the state transition control unit.

23. The inter-application data transmitting system of claim 1, further comprising:

an application dependent rule generation unit for generating an application dependent rule which defines a rule depending on the one of the plurality of applications.

24. The inter-application data transmitting system of claim 23, wherein the application dependent rule generation unit includes, a component arrangement rule creation interface for receiving a plurality of software components which configure the application intermediary unit and for arranging the plurality of software components received so as to create an arrangement rule model, and a component arrangement rule generation unit for converting the arrangement rule model created by the component arrangement rule creation interface into the arrangement rule model in a predetermined file format, thereby generating a component arrangement rule.

25. The inter-application data transmitting system of claim 24, wherein the component arrangement rule creation interface selects one of the plurality of software components being arranged in the arrangement rule model, and calls an interface program for generating the application dependent rule corresponding to a selected one of the plurality of software components.

26. The inter-application data transmitting system of claim 23, wherein the application dependent rule generation unit includes, a data format conversion rule creation interface for receiving conversion corresponding information which is used for establishing a correspondence between the application dependent data format and the data exchange format and creating a conversion rule model based on the conversion corresponding information received, and a data format conversion rule generation unit for converting the conversion rule model created by the data format conversion rule creation interface into the conversion rule model in a predetermined file format, thereby generating a format conversion rule.

27. The inter-application data transmitting system of claim 21, further comprising:

an application dependent rule generation unit for generating an application dependent rule which defines a rule depending on the one of the plurality of applications, wherein the application dependent rule generation unit includes, a state transition rule creation interface for receiving the state transition and for creating a state transition model based on a received state transition, and a state transition rule generation unit for converting the state transition model created by the state transition rule creation interface into the state transition model in a predetermined file format, thereby generating the state transition rule.

28. The inter-application data transmitting system of claim 27, wherein the state transition rule creation interface displays a drawing of the state transition model, and wherein the state transition rule generation unit generates the state transition rule based on the drawing of the state transition model.

29. The inter-application data transmitting system of claim 24, wherein the component arrangement rule creation interface arranges the plurality of software components by using a symbol representing each of the plurality of software components, and displays on a screen a connection between the plurality of software components being arranged.

30. The inter-application data transmitting system of claim 24, wherein the component arrangement rule creation interface stores a plurality of connection models, each of which defines the connection between the plurality of software components, and displays one of the plurality of connection models being stored on a screen when a user selects the one of the plurality of connection models.

\* \* \* \* \*